United States Patent
Tan et al.

(10) Patent No.: US 10,038,224 B2
(45) Date of Patent: Jul. 31, 2018

(54) POWER SUPPLY DEVICE

(71) Applicant: Mitsubishi Electric Corporation, Chiyoda-ku (JP)

(72) Inventors: Yohei Tan, Chiyoda-ku (JP); Tatsuya Kitamura, Chiyoda-ku (JP); Takahiko Yamamuro, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/519,994

(22) PCT Filed: Jan. 21, 2016

(86) PCT No.: PCT/JP2016/051662
§ 371 (c)(1),
(2) Date: Apr. 18, 2017

(87) PCT Pub. No.: WO2016/125589
PCT Pub. Date: Aug. 11, 2016

(65) Prior Publication Data
US 2017/0373353 A1 Dec. 28, 2017

(30) Foreign Application Priority Data
Feb. 4, 2015 (JP) ................................ 2015-019909

(51) Int. Cl.
*H02J 7/00* (2006.01)
*H02J 7/14* (2006.01)
(Continued)

(52) U.S. Cl.
CPC .......... *H01M 10/441* (2013.01); *H01M 6/42* (2013.01); *H02J 7/0016* (2013.01); *H02J 7/0024* (2013.01); *H01M 2200/30* (2013.01)

(58) Field of Classification Search
CPC .................................................. H01M 10/441
(Continued)

(56) References Cited

U.S. PATENT DOCUMENTS

2008/0054870 A1   3/2008   Kosaka et al.
2014/0152262 A1*  6/2014   Nomoto ................ H02J 7/0063
                                                320/118
(Continued)

FOREIGN PATENT DOCUMENTS

JP   2000-184607 A   6/2000
JP   2007-6567 A     1/2007
(Continued)

OTHER PUBLICATIONS

International Search Report dated Apr. 19, 2016 to PCT/JP2016/061662 filed Jan. 21, 2016.

*Primary Examiner* — Edward Tso
*Assistant Examiner* — Ahmed Omar
(74) *Attorney, Agent, or Firm* — Oblon, McClelland, Maier & Neustadt, L.L.P.

(57) ABSTRACT

A plurality of required DC voltages are outputted. A power supply device includes: a first switch circuit corresponding to the plurality of battery devices, and that includes a switch for connecting a negative pole terminal, by which negative pole terminals of the battery devices are connected, and a first switch for connecting a positive pole terminal, by which positive pole terminals of the battery devices are connected, and a switch for bypassing, by which the battery devices are bypassed; and a second switch circuit corresponding to the plurality of battery devices, and that includes a second switch for connecting a positive pole terminal, by which positive pole terminals of the battery devices are connected, and a switch for connecting, by which the negative pole
(Continued)

terminals of the battery devices are connected to a positive pole terminal of the other battery device.

13 Claims, 40 Drawing Sheets

(51) Int. Cl.
*H01M 10/44* (2006.01)
*H01M 6/42* (2006.01)

(58) Field of Classification Search
USPC .......................................... 320/121
See application file for complete search history.

(56) References Cited

U.S. PATENT DOCUMENTS

2014/0184162 A1* 7/2014 Takahashi .............. H01G 11/06
320/128
2014/0225443 A1 8/2014 Nomoto

FOREIGN PATENT DOCUMENTS

| | | |
|---|---|---|
| JP | 2008-67432 A | 3/2008 |
| JP | 2010-81703 A | 4/2010 |
| JP | 2014-143903 A | 8/2014 |
| JP | 2014-193016 A | 10/2014 |
| WO | WO 2013/002120 A1 | 1/2013 |

* cited by examiner

POWER SUPPLY DEVICE

TECHNICAL FIELD

The present invention relates to a power supply device in which connections of a plurality of battery devices are switched and controlled by a switch, and a plurality of DC voltages are outputted from the plurality of battery devices.

BACKGROUND ART

In a conventional power supply device in which a plurality of battery devices are connected in series, taps are connected to the battery devices at both ends and the battery device at a middle position, whereby a plurality of DC voltages can be extracted (for example, refer to Patent Document 1).

CONVENTIONAL ART DOCUMENT

Patent Document

Patent Document 1: Japanese Laid-Open Patent Publication No. 2007-6567 (FIG. 1)

SUMMARY OF THE INVENTION

Problems to be Solved by the Invention

In the Patent Document 1, a plurality of battery devices are connected in series, and other hand, taps are connected to the battery devices at both ends and the battery device at a middle position, whereby a plurality of DC voltages are extracted. However, the battery device, which is connected to a ground, is fixed, so that when a DC voltage is extracted from the battery device at the middle position, there has been a problem in that a positive pole and a negative pole of the battery device, which is near to a ground with respect to the above-described battery device, are short-circuited, and it is caused that a circuit is broken or fired.

The present invention has been made to solve above-described problems, and an object of the invention is to obtain a power supply device in which a circuit is not easily broken.

Means for Solving Problems

A power supply device of the present invention includes a plurality of battery devices which include positive pole terminals and negative pole terminals; a first circuit for connecting battery device, which is configured between a first terminal positive pole and a terminal negative pole; a first switch circuit which is provided in such a way that the first switch circuit is corresponding to each of the battery devices in the plurality of battery devices, and includes a switch for connecting negative pole terminal, by which a negative pole terminal of the corresponded battery device is connected to the first circuit for connecting battery device, a first switch for connecting positive pole terminal, by which a positive pole terminal of the corresponded battery device is connected to the first circuit for connecting battery device, and a switch for bypassing, by which the corresponded battery device is bypassed; a second circuit for connecting battery device, which is configured between a second terminal positive pole and the terminal negative pole; a second switch circuit which is provided in such a way that the second switch circuit is corresponding to each of the battery devices in the plurality of battery devices, and includes a second switch for connecting positive pole terminal, by which a positive pole terminal of the corresponded battery device is connected to the second circuit for connecting battery device, and a switch for connecting, by which the negative pole terminal of the corresponded battery device is connected to the positive pole terminal of the other battery device; and a control circuit which controls an open/close operation of each of the switches of the first switch circuit and the second switch circuit; wherein open/close operations of the plurality of switches of the first switch circuit are controlled by the control circuit, and one or a plurality of required battery devices is connected between the first terminal positive pole and the terminal negative pole; and open/close operations of the plurality of switches of the second switch circuit are controlled by the control circuit, and one or a plurality of required battery devices is connected between the second terminal positive pole and the terminal negative pole.

Effects of the Invention

In a power supply device according to the present invention, a battery device, which is connected to a terminal negative pole, can be selected by a first switch circuit and a second switch circuit, so that the battery device is rarely short-circuited, and a DC voltage can be extracted from a battery device at a middle position.

An aim, a characteristic, a viewpoint, and an effect of the present invention, which are not described in the above explanations, will be cleared by the following detail explanations for the present invention in reference to drawings.

MODE FOR CARRYING OUT THE INVENTION

Embodiment 1

Figure 1:
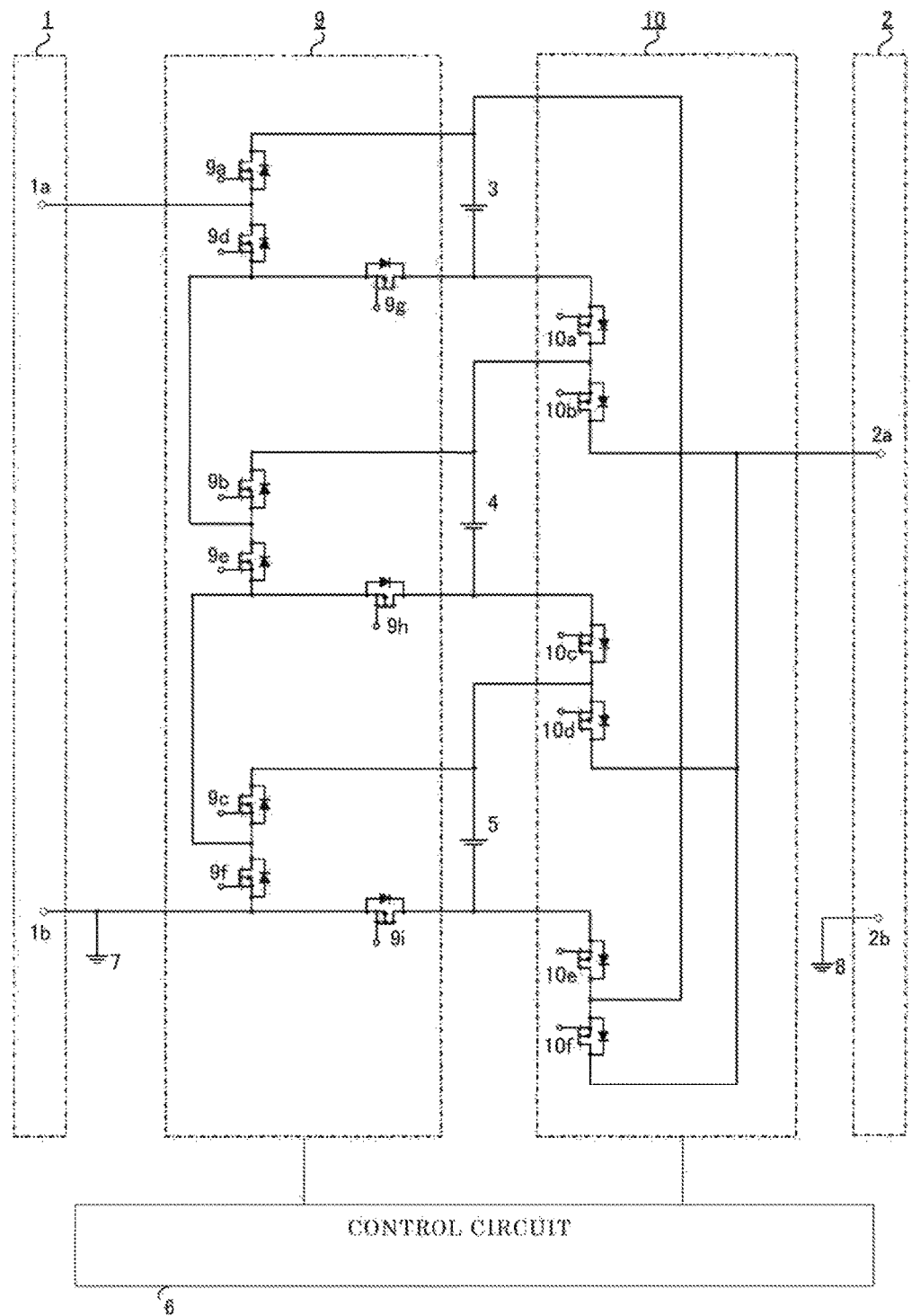
FIG. 1 is a circuit diagram illustrating a configuration of a power supply device according to Embodiment 1 of the present invention.

FIG. 1 is a circuit diagram illustrating a configuration of a power supply device according to Embodiment 1 of the present invention. In FIG. 1, for example, a nickel metal hydride battery or a lithium-ion battery is used as a battery device.

A first switch circuit 9 (first switch circuit) is configured by the following components. A drain terminal of a MOSFET9a (first switch for connecting positive pole terminal) is connected to a positive pole terminal of a battery device 3, and a source terminal of the MOSFET9a (first switch for connecting positive pole terminal) is connected to a drain terminal of a MOSFET9d (switch for bypassing), and a connection point of the source terminal of the MOSFET9a and the drain terminal of the MOSFET9d is connected to a positive pole 1a (first terminal positive pole) of a first extraction terminal 1. A drain terminal of a MOSFET9g (switch for connecting negative pole terminal) is connected to a negative pole terminal of the battery device 3, and a source terminal of the MOSFFT9g is connected to a source terminal of the MOSFET9d. A drain terminal of a MOSFET9b (first switch for connecting positive pole terminal) is connected to a positive pole terminal of a battery device 4, and a source terminal of the MOSFET9b is connected to a drain terminal of a MOSFET9e (switch for bypassing), and a connection point of the source terminal of the MOSFET9b and the drain terminal of the MOSFET9e is connected to the source terminal of the MOSFET9d.

A negative pole terminal of the battery device 4 is connected to a drain terminal of a MOSFET9h (switch for connecting negative pole terminal), and a source terminal of the MOSFET9h is connected to a source terminal of the MOSFET9e. A positive pole terminal of a battery device 5 is connected to a drain terminal of a MOSFET9c (first switch for connecting positive pole terminal), and a source terminal of the MOSFET9c is connected to a drain terminal of a MOSFET9f (switch for bypassing), and a connection point of the source terminal of the MOSFET9c and the drain terminal of the MOSFET9f is connected to the source terminal of the MOSFET9e. A negative pole terminal of the battery device 5 is connected to a drain terminal of a MOSFET9i (switch for connecting negative pole terminal), and a source terminal of the MOSFET9i is connected to a source terminal of the MOSFET9f, and a connection point of the source terminal of the MOSFET9i and the source terminal of the MOSFET9f is connected to a ground 7. The ground 7 is connected to a negative pole 1b (terminal negative pole) of the first extraction terminal 1.

A second switch circuit 10 (second switch circuit) is configured by the following components. The negative pole terminal of the battery device 3 is connected to a source terminal of a MOSFET10a (switch for connecting), and a drain terminal of the MOSFET10a is connected to a source terminal of a MOSFET10b (second switch for connecting positive pole terminal), and a connection point of the drain terminal of the MOSFET10a and the source terminal of the MOSFET10b is connected to the positive pole terminal of the battery device 4. The negative pole terminal of the battery device 4 is connected to a source terminal of a MOSFET10c (switch for connecting), and a drain terminal of the MOSFET10c is connected to a source terminal of a MOSFET10d (second switch for connecting positive pole terminal), and a connection point of the drain terminal of the MOSFET10c and the source terminal of the MOSFET10d is connected to the positive pole terminal of the battery device 5. The negative pole terminal of the device 5 is connected to a source terminal of a MOSFET10e (switch for connecting), and a drain terminal of the MOSFET10e is connected to a source terminal of a MOSFET10f (second switch for connecting positive pole terminal), and a connection point of the drain terminal of the MOSFET10e and the source terminal of the MOSFET10f is connected to the positive pole terminal of the battery device 3. A drain terminal of the MOSFET10b, a drain terminal of the MOSFET10d, and a drain terminal of the MOSFET10f are connected, and a connection point of the drain terminal of the MOSFET10b, the drain terminal of the MOSFET10d, and the drain terminal of the MOSFET10f is connected to a positive pole 2a (a second terminal positive pole) of a second extraction terminal 2. A ground 8 is connected to a negative pole 2b (terminal negative pole) of the second extraction terminal 2. The ground 7 and the ground 8 are set at an identical reference electric potential point.

A control circuit 6 performs turn-on/turn-off control of each of the MOSFETs which compose the first switch circuit 9 and the second switch circuit 10. The control circuit 6 is realized by using, for example, a process circuit, and the process circuit includes a CPU by which a program, which is stored in a memory, is performed.

Hereinafter, an operation, in which a DC voltage is extracted from the battery device 3, the battery device 4, and battery device 5 to the first extraction terminal 1 and the second extraction terminal 2, will be explained.

Figure 2:
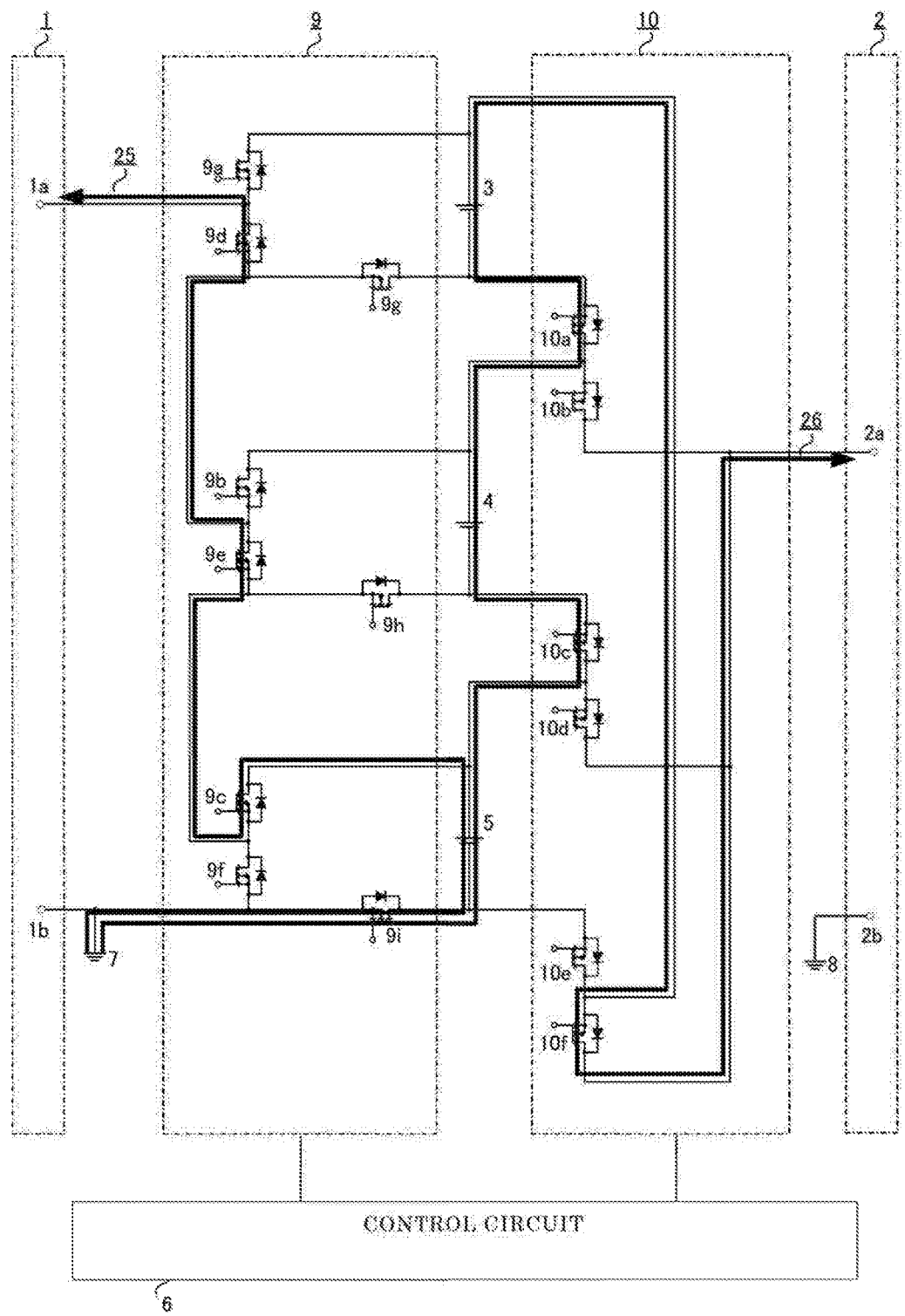
FIG. 2 is a diagram illustrating a circuit operation of the power supply device according to Embodiment 1.

In the first switch circuit 9, as indicated in FIG. 2, the MOSFET9c, the MOSFET9d, the MOSFET9e, and the MOSFET9i are turned on, and the other MOSFETs are turned off, whereby the ground 7 is connected to the negative pole terminal of the battery device 5, and a DC voltage of the battery device 5 is extracted to the positive pole 1a of the first extraction terminal 1. A first electric current 25 is flowed from the ground 7 to the source terminal of the MOSFET9i, the drain terminal of the MOSFET9i, a negative pole of the battery device 5, a positive pole of the battery device 5, the drain terminal of the MOSFET9c, the source terminal of the MOSFET9c, the source terminal of the MOSFET9e, the drain terminal of the MOSFET9e, the source terminal of the MOSFET9d, the drain terminal of the MOSFET9d, and the positive pole 1a of the first extraction terminal 1. In the second switch circuit 10, the MOSFET10a, the MOSFET10c, and the MOSFET10f are turned on, and the other MOSFETs are turned off, whereby a DC voltage, for which the battery device 3, the battery device 4, and the battery device 5 are connected in series, is extracted to the positive pole 2a of the second extraction terminal 2.

A second electric current 26 is flowed from the ground 7 to the source terminal of the MOSFET9i, the drain terminal of the MOSFET9i, the negative pole of the battery device 5, the positive pole of the battery device 5, the drain terminal of the MOSFET10c, the source terminal of the MOSFET10c, a negative pole of the battery device 4, a positive pole of the battery device 4, the drain terminal of the MOSFET10a, the source terminal of the MOSFET10a, a negative pole of the battery device 3, a positive pole of the battery device 3, the source terminal of the MOSFET10f, the drain terminal of the MOSFET10f, and the positive pole 2a of the second extraction terminal 2.

In this case, the second switch circuit 10, the MOSFET10d is turned on, and the other MOSFETs are turned off, wherein a DC voltage of only the battery device 5 can be extracted to the positive pole 2a of the second extraction terminal 2. Moreover, in the second switch circuit 10, the MOSFET10c and the MOSFET10b are turned on, and the other MOSFETs are turned off, whereby a DC voltage, for which the battery device 5 and the battery device 4 are connected in series, can be extracted to the positive pole 2a of the second extraction terminal 2.

Figure 3:
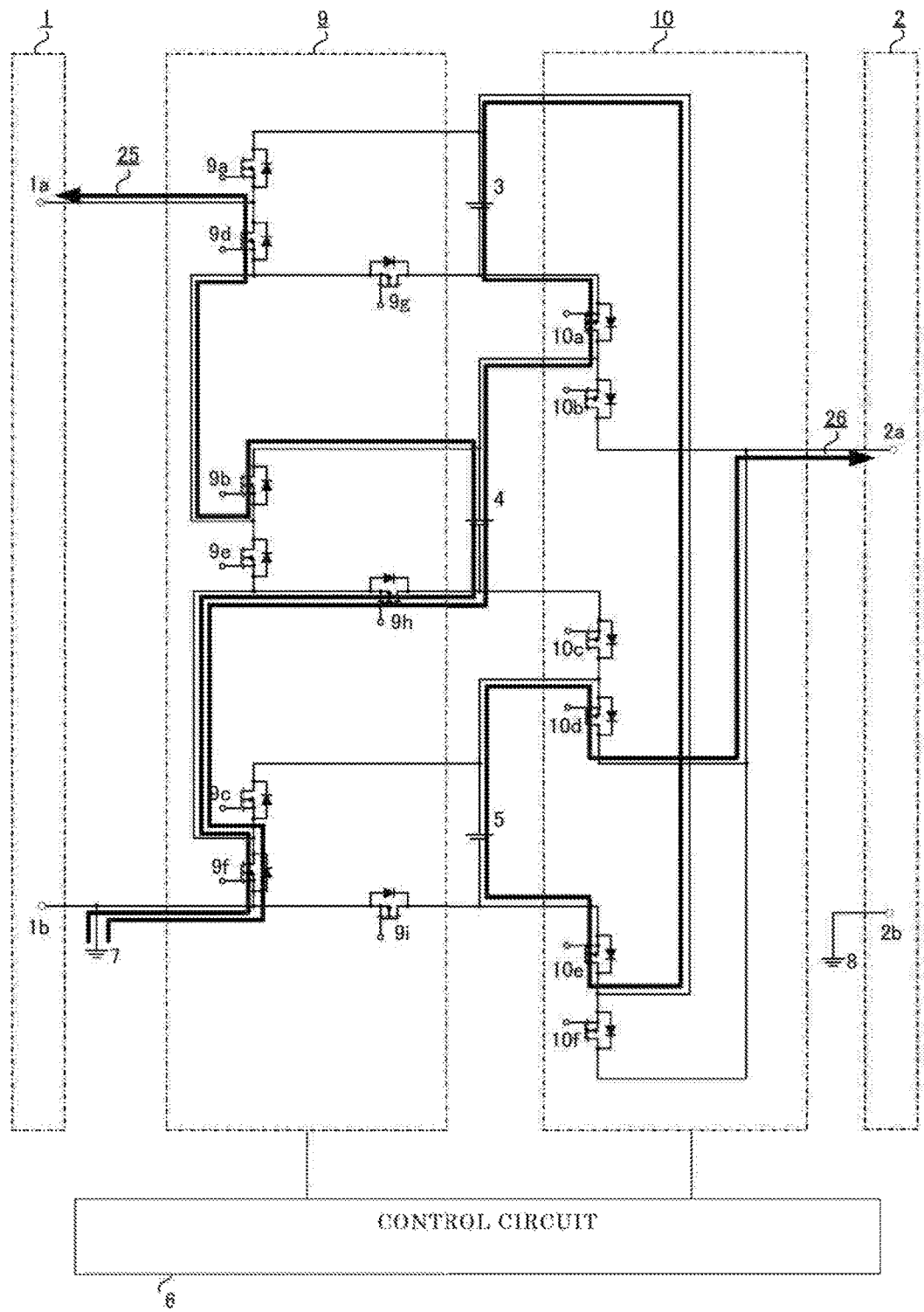
FIG. 3 is a diagram illustrating a circuit operation of the power supply device according to Embodiment 1.

Moreover, in the first switch circuit 9, as indicated in FIG. 3, the MOSFET9b, the MOSFET9d, the MOSFET9f, and the MOSFET9h are turned on, and the other MOSFETs are turned off, whereby the ground 7 is connected to the negative pole terminal of the battery device 4, and a DC voltage of the battery device 4 is extracted to the positive pole 1a of the first extraction terminal 1. The first electric current 25 is flowed from the ground 7 to the source terminal of the MOSFET9f, the drain terminal of the MOSFET9f, the source terminal of the MOSFET9h, the drain terminal of the MOSFET9h, the negative pole of the battery device 4, the positive pole of the battery device 4, the drain terminal of the MOSFET9b, the source terminal of the MOSFET9b, the source terminal of the MOSFET9d, the drain terminal of the MOSFET9d, and the positive pole 1a of the first extraction terminal 1. In the second switch circuit 10, the MOSFET10a, the MOSFET10d, and the MOSFET10e are turned on, and the other MOSFETs are turned off, whereby a DC voltage, for which the battery device 3, the battery device 4, and the battery device 5 are connected in series, is extracted to the positive pole 2a of the second extraction terminal 2.

The second electric current 26 is flowed from the ground 7 to the source terminal of the MOSFET9f, the drain terminal of the MOSFET9f, the source terminal of the MOSFET9h, the drain terminal of the MOSFET9h, the negative pole of the battery device 4, the positive pole of the battery device 4, the drain terminal of the MOSFET10a, the source terminal of the MOSFET10a, the negative pole of the battery device 3, the positive pole of the battery device 3, the drain terminal of the MOSFET19e, the source terminal of the MOSFET10e, the negative pole of the battery device 5, the positive pole of the battery device 5, the source terminal of the MOSFET10d, the drain terminal of the MOSFET10d, and the positive pole 2a of the second extraction terminal 2.

Figure 4:
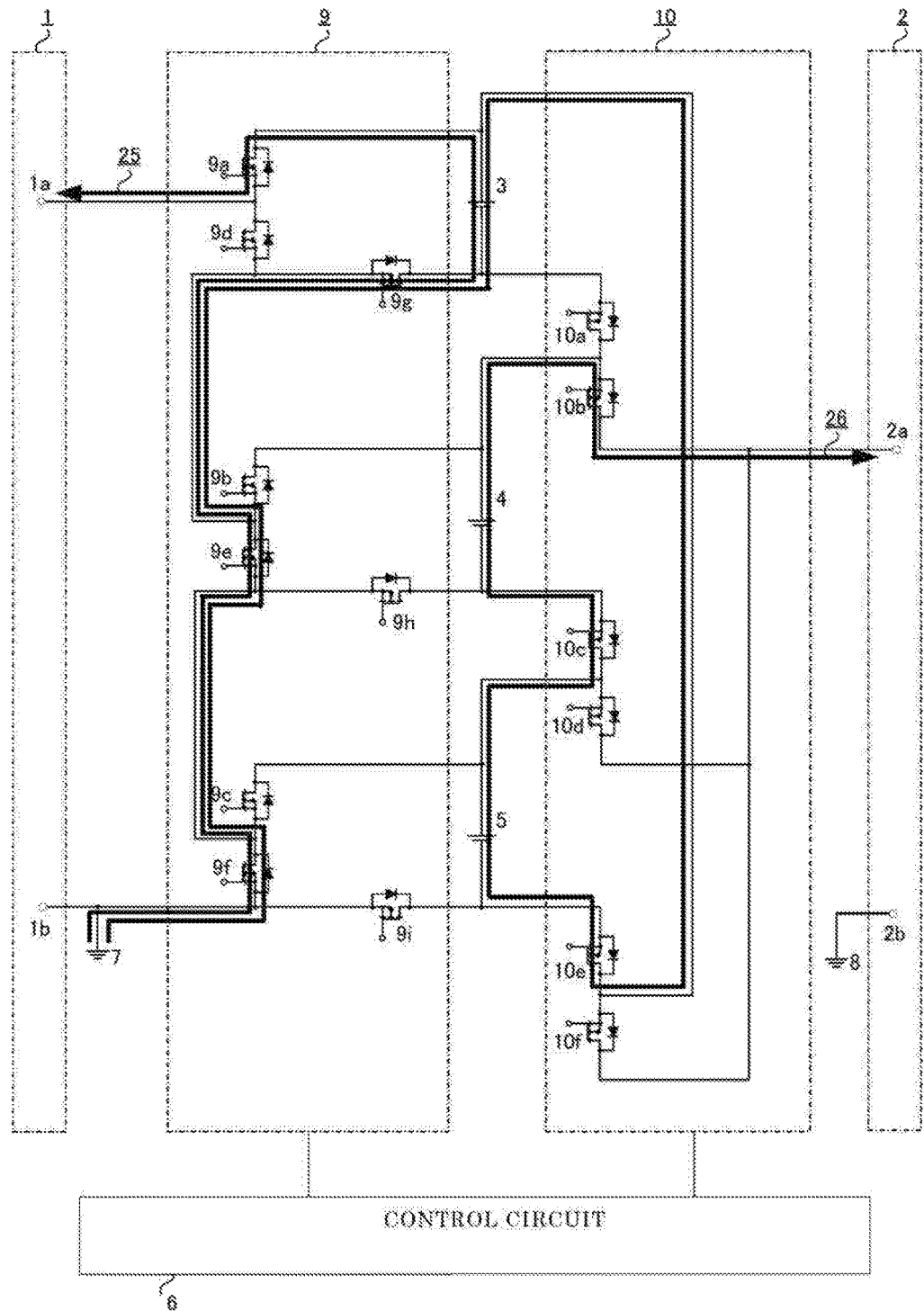
FIG. 4 is a diagram illustrating a circuit operation of the power supply device according to Embodiment 1.

Moreover, in the first switch circuit 9, as indicated in FIG. 4, the MOSFET9a, the MOSFET9e, the MOSFET9f, and the MOSFET9g are turned on, and the ether MOSFETs are turned off, whereby the ground 7 is connected to the negative pole terminal of the battery device 3, and a DC voltage of the battery device 3 is extracted to the positive pole 1a of the first extraction terminal 1. The first electric current 25 is flowed from the ground 7 to the source terminal of the MOSFET9f, the drain terminal of the MOSFET9f, the source terminal of the MOSFET9e, the drain terminal of the MOSFET9e, the source terminal of the MOSFET9g, the drain terminal of the MOSFET9g, the negative pole of the battery device 3, the positive pole of the battery device 3, the drain terminal of the MOSFET9a, the source terminal of the MOSFET9a, and the positive pole 1a of the first extraction terminal 1. In the second switch circuit 10, the MOSFET10b, the MOSFET10c, and the MOSFET10e are turned on, and the other MOSFETs are turned off, whereby a DC voltage, for which the battery device 3, the battery device 4, and the battery device 5 are connected in series, is extracted to the positive pole 2a of the second extraction terminal 2.

The second electric current 26 is flowed from the ground 7 to the source terminal of the MOSFET9f, the drain terminal of the MOSFET9f, the source terminal of the MOSFET9e, the drain terminal off the MOSFET9e, the source terminal of the MOSFET9g, the drain terminal of the MOSFET9g, the negative pole of the battery device 3, the positive pole of the battery device 3, the drain terminal of the MOSFET10e, the source terminal of the MOSFET10e, the negative pole of the battery device 5, the positive pole of the battery device 5, the drain terminal of the MOSFET10c, the source terminal of the MOSFET10c, the negative pole of the battery device 4, the positive pole of the battery device 4, the source terminal of the MOSFET10b, the drain terminal of the MOSFET10b, and the positive pole 2a of the second extraction terminal 2.

Figure 5:
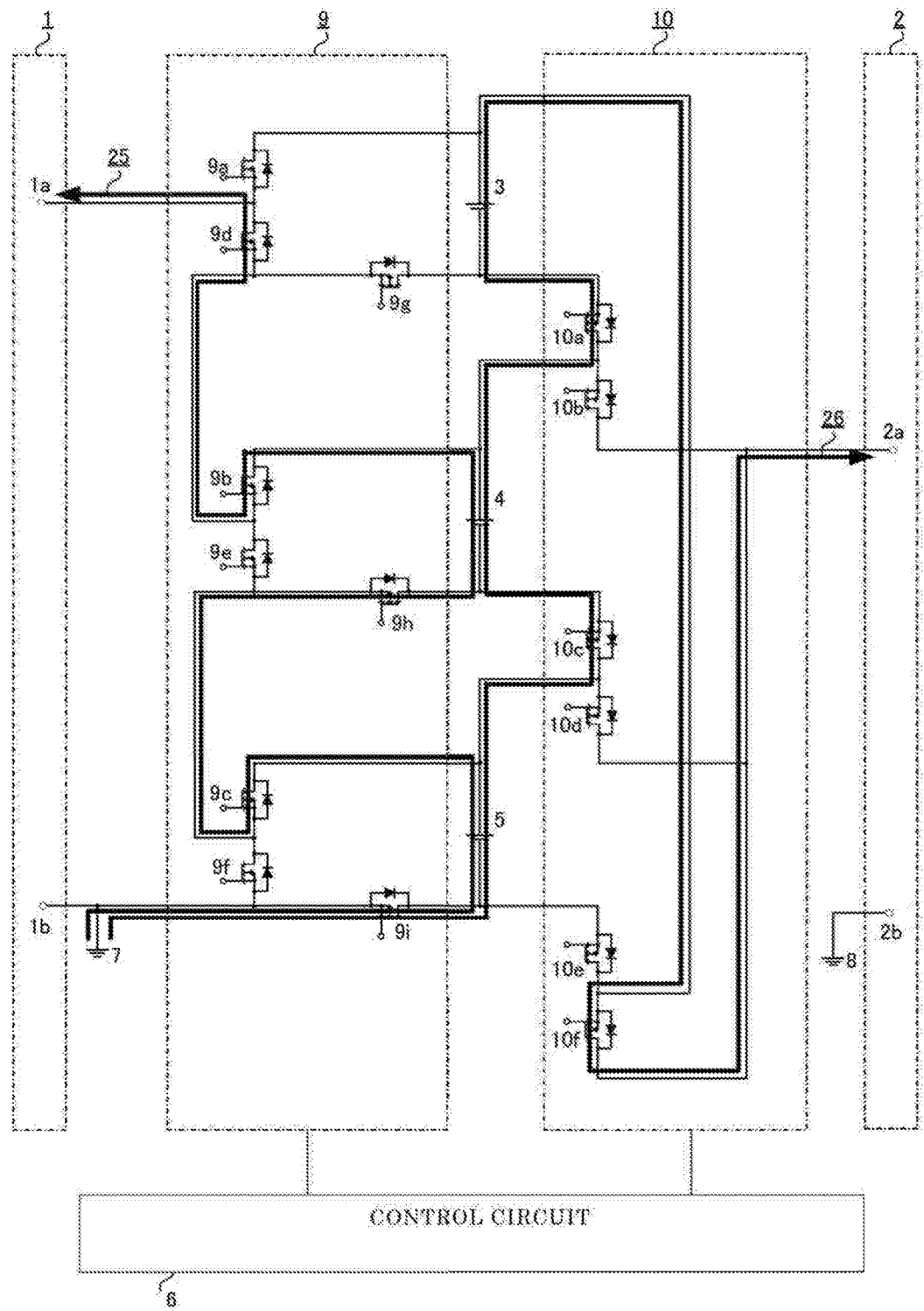
FIG. 5 is a diagram illustrating a circuit operation of the power supply device according to Embodiment 1.

Moreover, in the first switch circuit 9, as indicated in FIG. 5, the MOSFET9b, the MOSFET9c, the MOSFET9d, the MOSFET9h, and the MOSFET9i are turned on, and the other MOSFETs are turned off, whereby the ground 7 is connected to the negative pole terminal of the battery device 5, and a DC voltage, for which the battery device 4 and the battery device 5 are connected in series, is extracted to the positive pole 1a of the first extraction terminal 1. The first electric current 25 is flowed from the ground 7 to the source terminal of the MOSFET9i, the drain terminal of the MOSFET9i, the negative pole of the battery drive 5, the positive pole of the battery device 5, the drain terminal of the MOSFET9c, the source terminal of the MOSFET9c, the source terminal of the MOSFET9h, the drain terminal of the MOSFET9h, the negative pole of the battery device 4, the positive pole of the battery device 4, the drain terminal of the MOSFET9b, the source terminal of the MOSFET9b, the source terminal of the MOSFET9d, the drain terminal of the MOSFET9d, and the positive pole 1a of the first extraction terminal 1. In the second switch circuit 10, the MOSFET10a, the MOSFET10c, and the MOSFET10f are turned on, and the other MOSFETs are turned off, whereby a DC voltage, for which the battery device 3, the battery device 4, and the battery device 5 are connected in series, is extracted to the positive pole 2a of the second extraction terminal 2.

The second electric current 26 is flowed from the ground 7 to the source terminal of the MOSFET9i, the drain terminal of the MOSFET9i, the negative pole of the battery device 5, the positive pole of the battery device 5, the drain terminal of the MOSFET10c, the source terminal of the MOSFET10c, the negative pole of the battery device 4, the positive pole of the battery device 4, the drain terminal of the MOSFET10a, the source terminal of the MOSFET10a, the negative pole of the battery device 3, the positive pole of the battery device 3, the source terminal of the MOSFET10f, the drain terminal of the MOSFET10f, and the positive pole 2a of the second extraction terminal 2.

Figure 6:
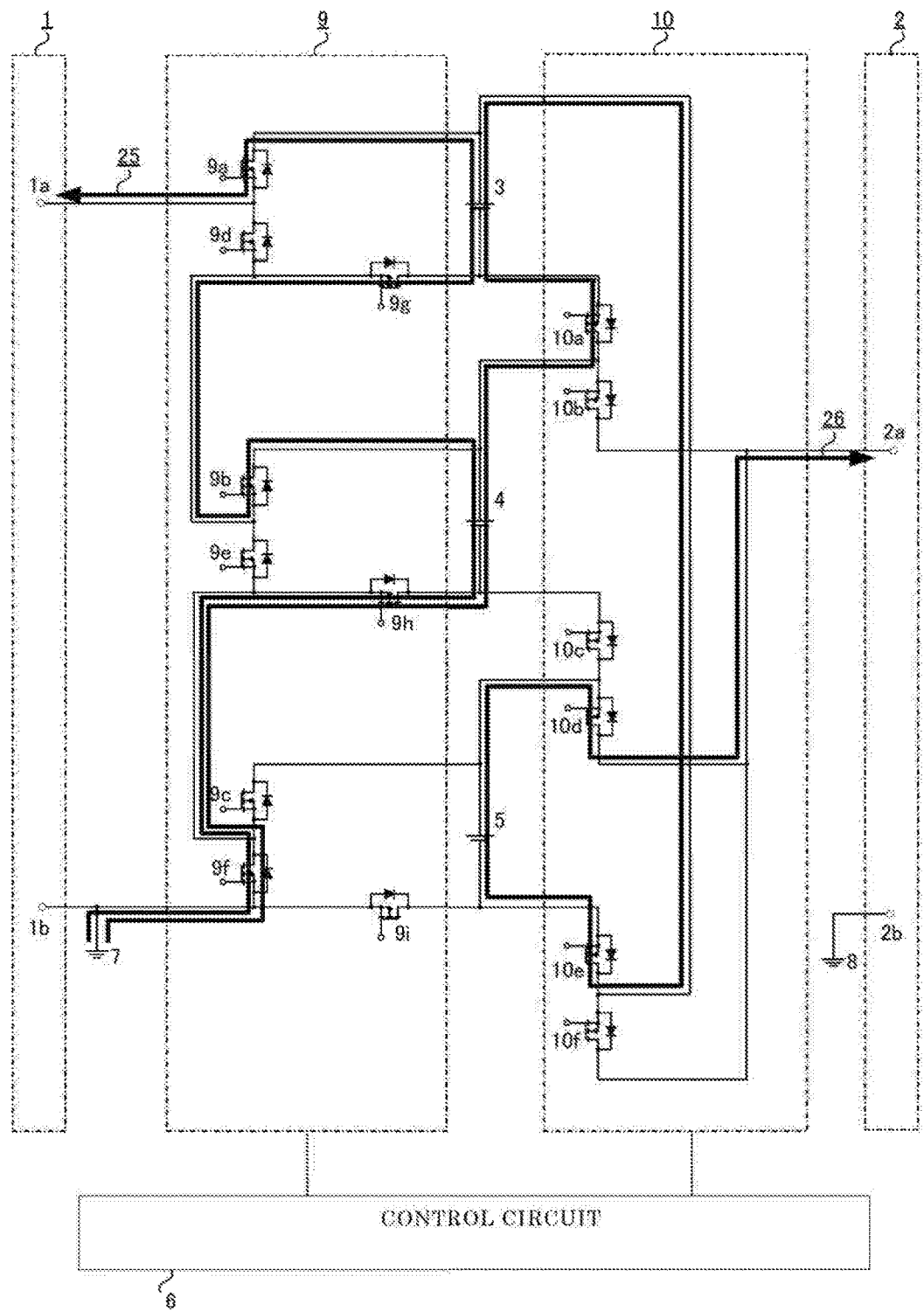
FIG. 6 is a diagram illustrating a circuit operation of the power supply device according to Embodiment 1.

Moreover, in the first switch circuit 9, as indicated in FIG. 6, the MOSFET9a, the MOSFET9b, the MOSFET9f, the MOSFET9g, and the MOSFET9h are turned on, and the other MOSFETs are turned off, whereby the ground 7 is connected to the negative pole terminal of the battery device 4, and a DC voltage, for which the battery device 3 and the battery device 4 are connected in series, is extracted to the positive pole 1a of the first extraction terminal 1. The first electric current 25 is flowed from the ground 7 to the source terminal of the MOSFET9f, the drain terminal of the MOSFET9f, the source terminal of the MOSFET9h, the drain terminal of the MOSFET9h, the negative pole of the battery device 4, the positive pole of the battery device 4, the drain terminal of the MOSFET9b, the source terminal of the MOSFET9b, the source terminal of the MOSFET9g, the drain terminal of the MOSFET9g, the negative pole of the battery device 3, the positive pole of the battery device 3, the drain terminal of the MOSFET9a, the source terminal of the MOSFET9a, and the positive pole 1a of the first extraction terminal 1. In the second switch circuit 10, the MOSFET10a, the MOSFET10d, and the MOSFET10e are turned on, and the other MOSFETs are turned off, whereby a DC voltage, for which the battery device 3, the battery device 4, and the battery device 5 are connected in series, is extracted to the positive pole 2a of the second extraction terminal 2.

The second electric current is flowed from the ground 7 to the source terminal of the MOSFET9f, the drain terminal of the MOSFET9f, the source terminal of the MOSFET9h, the drain terminal of the MOSFET9h, the negative pole of the battery device 4, the positive pole of the battery device 4, the drain terminal of the MOSFET10a, the source terminal of the MOSFET10a, the negative pole of the battery device 3, the positive pole of the battery device 3, the drain terminal of the MOSFET10e, the source terminal of the MOSFET10e, the negative pole of the battery device 5, the positive pole of the battery device 5, the source terminal of the MOSFET10d, the drain terminal of the MOSFET10d, and the positive pole 2a of the second extraction terminal 2.

Figure 7:
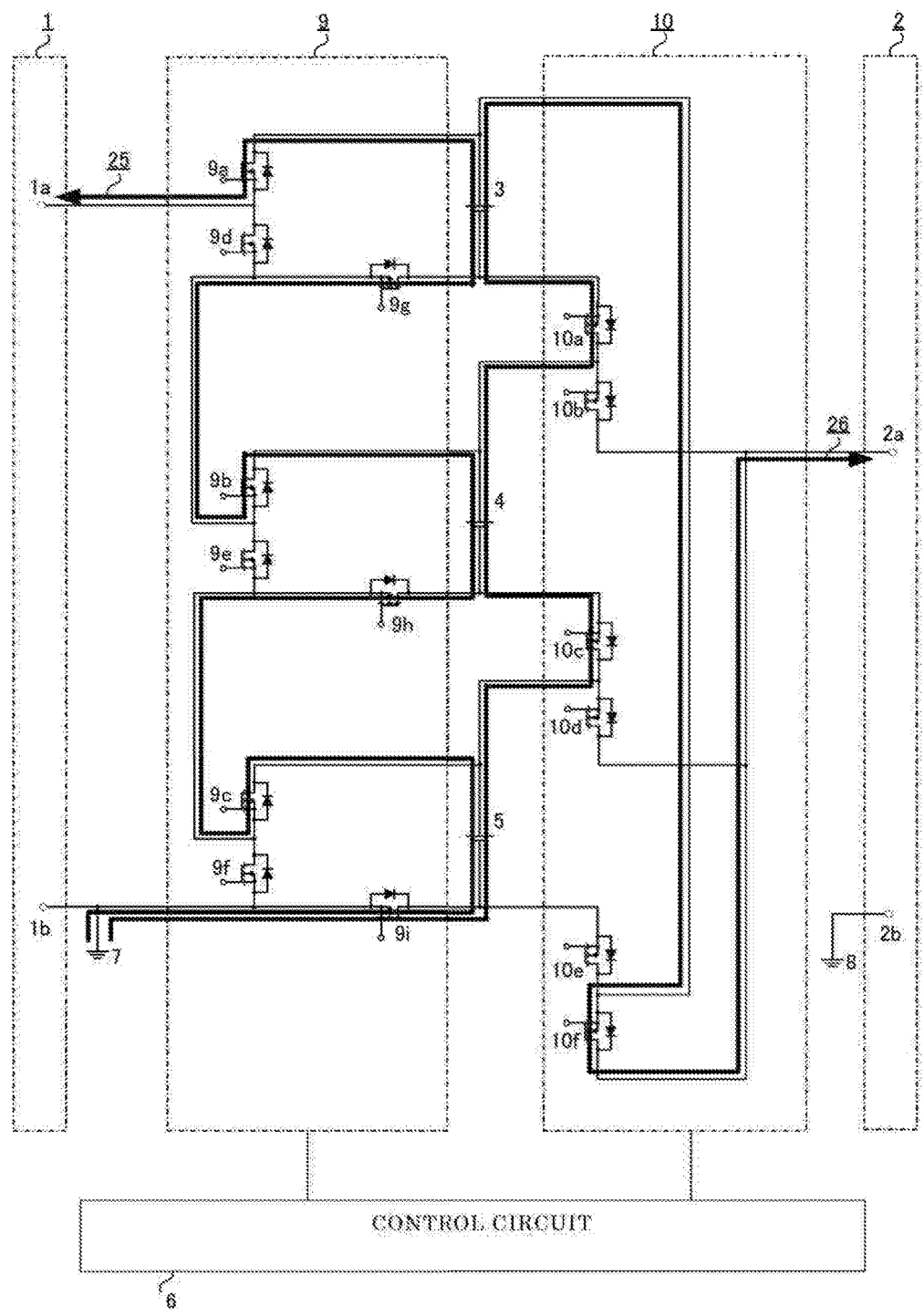
FIG. 7 is a diagram illustrating a circuit operation of the power supply device according to Embodiment 1.

Moreover, in the first switch circuit 9, as indicated in FIG. 7, the MOSFET9a, the MOSFET9b, the MOSFET9c, the MOSFET9g, the MOSFET9h, and the MOSFET9i are turned on, and the other MOSFETs are turned off, whereby the ground 7 is connected to the negative pole terminal of the battery device 5, and a DC voltage, for which the battery device 3, the battery device 4, and the battery device 5 are connected in series, extracted to the positive pole 1a of the first extraction terminal 1. The first electric current 25 is flowed from the ground 7 to the source terminal of the MOSFET9i, the drain terminal of the MOSFET9i, the negative pole of the battery device 5, the positive pole of the battery device 5, the drain terminal of the MOSFET9c, the source terminal of the MOSFET9c, the source terminal of the MOSFET9h, the drain terminal of the MOSFET9h, the negative pole of the battery device 4, the positive pole of the battery device 4, the drain terminal of the MOSFET9b, the source terminal of the MOSFET9b, the source terminal of the MOSFET9g, the drain terminal of the MOSFET9g, the negative pole of the battery device 3, the positive pole of the battery device 3, the drain terminal of the MOSFET9a, the source terminal of the MOSFET9a, and the positive pole 1a of the first extraction terminal 1. In the second switch circuit 10, the MOSFET10a, the MOSFET10c, and the MOSFET10f are turned on, and the other MOSFETs are turned off, whereby a DC voltage, for which the battery device 3, the battery device 4, and the battery device 5 are connected in series, is extracted to the positive pole 2a of the second extraction terminal 2.

The second electric current 26 is flowed from the ground 7 to the source terminal of the MOSFET9i, the drain terminal of the MOSFET9i, the negative pole of the battery device 5, the positive pole of the battery device 5, the drain terminal of the MOSFET10c, the source terminal of the MOSFET10c, the negative pole of the battery device 4, the positive pole of the battery device 4, the drain terminal of the MOSFET10a, the source terminal of the MOSFET10a, the negative pole of the battery device 3, the positive pole of the battery device 3, the source terminal of the MOSFET10f, the drain terminal of the MOSFET10f, and the positive pole 2a of the second extraction terminal 2.

In a first circuit for connecting battery device, which is provided between the first terminal positive pole 1a and the terminal negative pole 1b, when any one of the MOSFET9a through the MOSFET9i is turned on, the turned on MOSFET is extracted, and when any one of the battery device 3 through the battery device 5 is energized, the energized battery device is extracted, whereby the first circuit for connecting battery device is configured. However, electric current passages, which are constantly extracted to the first circuit for connecting battery device, are an electric current passage 1c, an electric current passage 1d, an electric current passage 1e, and an electric current passage 1f, which are indicated in the following description. In addition, the electric current passage 1c is extended from the positive pole 1a to a connection point of the MOSFET9a and the MOSFET9d, and the electric current passage 1d is extended from a connection point of the MOSFET9d and the MOSFET9g to a connection point of the MOSFET9b and the MOSFET9e, and the electric current passage 1e is extended from a connection point of the MOSFET9e and the MOSFET9h to a connection point of the MOSFET9c and the MOSFET9f and the electric current passage 1f is extended from a connection point of the MOSFET9f and the MOSFET9i to the negative pole 1b. In addition, in the first switch circuit 9, as indicated in FIG. 7, the MOSFET9a, the MOSFET9c, the MOSFET9e, the MOSFET9g, and the MOSFET9i are turned on, and the other MOSFETs are turned off, whereby the ground 7 is connected to the negative pole terminal of the battery device 5, and a DC voltage, for which the battery device 3 and the battery device 5 are connected in series, is extracted to the positive pole 1a of the first extraction terminal 1. In other words, the switch MOSFET9e for bypassing is turned on, whereby the battery device 4 is bypassed, and a DC voltage, for which the battery device 3 and the battery device 5 are connected in series, can be extracted.

In a second circuit for connecting battery device, which is provided between the second terminal positive pole 2a and the terminal negative pole 2b, when any one of the MOSFET10a through the MOSFET10f is turned on, the turned on MOSFET is extracted, and when any one of the battery device 3 through the battery device 5 is energized, the energized battery device is extracted, whereby the second circuit for connecting battery device is configured. However, electric current passages, which are constantly extracted to the second circuit for connecting battery device, are an electric current passage 2c and an electric current passage 2d, which are indicated in the following description. In addition, the electric current passage 2c is extended from the positive pole 2a to a connection point of the MOSFET10b, the MOSFET10d, and the MOSFET10f, and the electric current passage 2d is extended from the negative pole 2b to the ground 8.

As a result, a battery device, which is connected to a ground, can be selected by the first switch circuit 9, so that the battery device is not short-circuited, and a DC voltage can be extracted from a battery device at some midpoint. In addition, in Embodiment 1 of the present invention, although the power supply device is explained by using a MOSFET (a field-effect transistor) as a switch, a similar effect is obtained even when a bipolar transistor, an insulation-type bipolar transistor (IGBT), a silicon carbide transistor, or a silicon carbide MOSFET is used.

Embodiment 2

Figure 8:
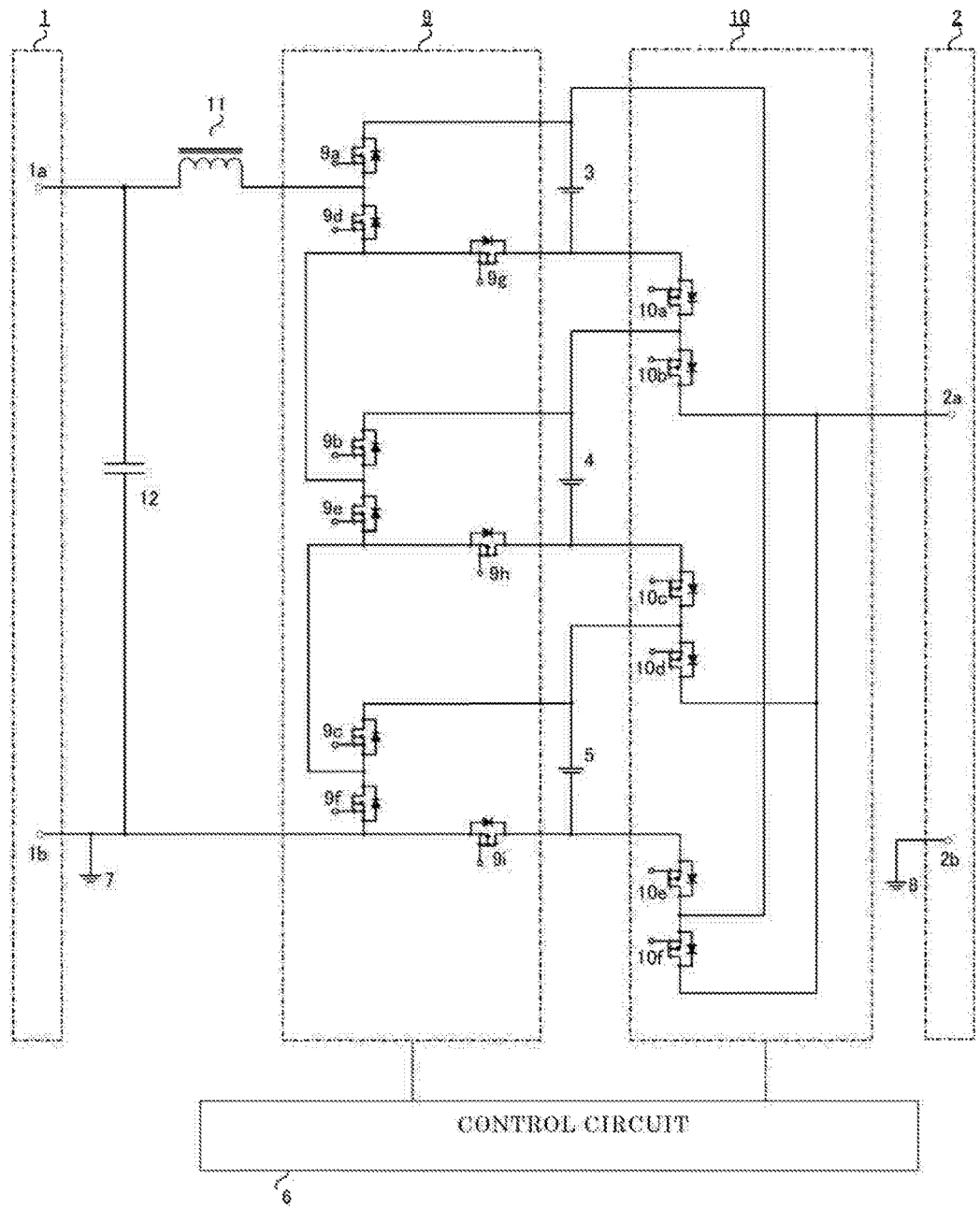
FIG. 8 is a circuit diagram illustrating a configuration of a power supply device according to Embodiment 2.

A circuit diagram of a power supply device according to Embodiment 2 of the present invention is illustrated in FIG. 8. The power supply device according to Embodiment 2, in which a smoothing reactor 11 and a smoothing capacitor 12 are added, is different from the power supply device according to Embodiment 1. In particular, the smoothing reactor 11 is connected between a connection point of a source terminal of a MOSFET9a and a drain terminal of a MOSFET9d and a positive pole 1a of a first extraction terminal 1, and the smoothing capacitor 12 is connected between the positive polo 1a of the first extraction terminal 1 and a negative pole 1b. In addition, the smoothing reactor 11 may be provided at an electric current passage between a required battery device, which is connected to the negative pole 1b, and the positive pole 1a of the first extraction terminal 1.

Figure 9:
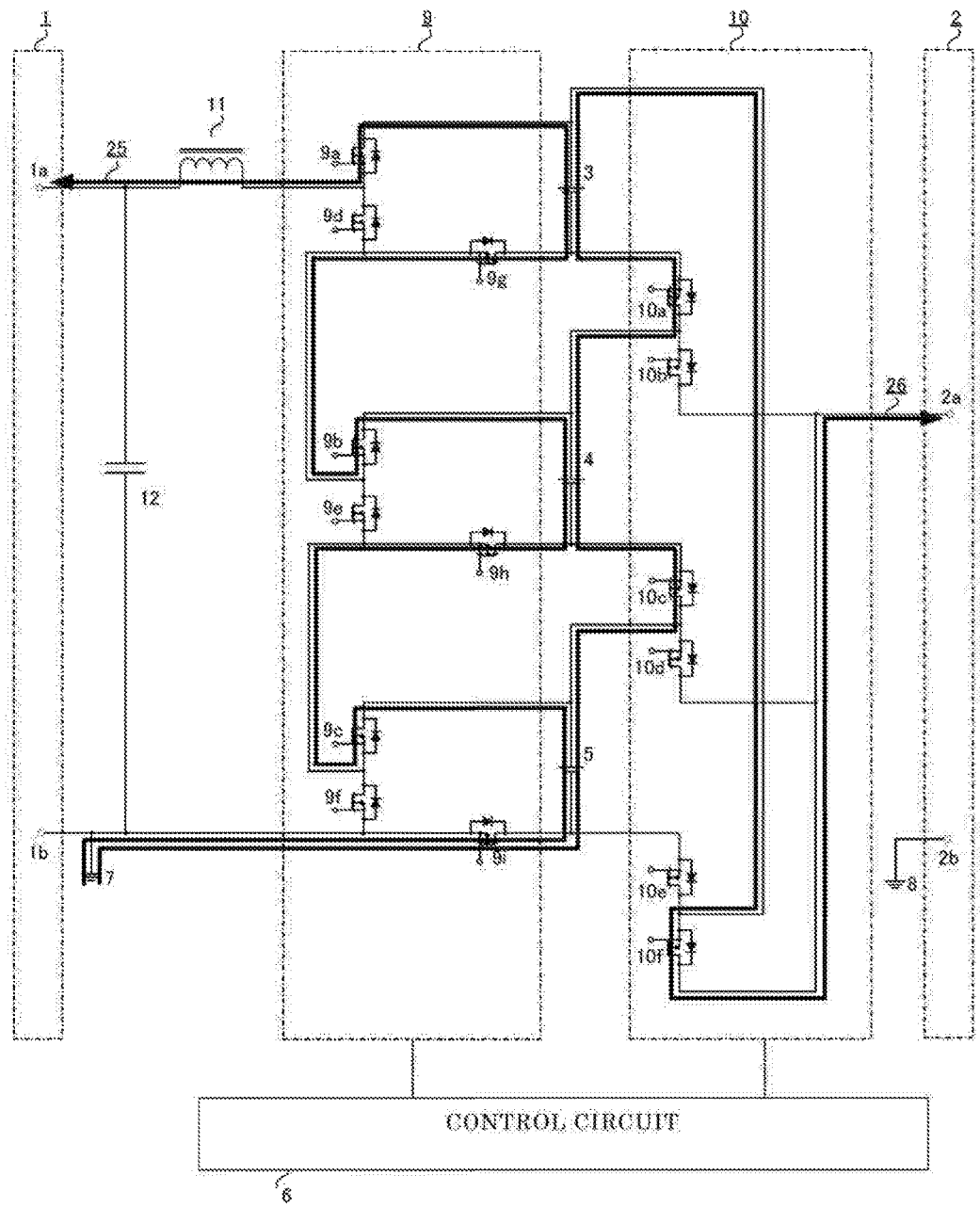
FIG. 9 is a diagram illustrating a circuit operation of the power supply device according to Embodiment 2.

Hereinafter, an operation, in which a voltage is extracted from a battery device 3, a battery device 4, and a battery device 5 to the first extraction terminal 1 and a second extraction terminal 2, will be explained. In a first switch circuit 9, as indicated in FIG. 9, the MOSFET9a, a MOSFET9b, a MOSFET9c, a MOSFET9g, a MOSFET9h, and a MOSFET9i are turned on, and the other MOSFETs are tuned off, whereby energy is supplied to the first extraction terminal 1. A first electric current 25 is flowed from a ground 7 to a source terminal of the MOSFET9i, a drain terminal of the MOSFET9i, a negative pole of the battery device 5, a positive pole of the battery device 5, a drain terminal of the MOSFET9c, a source terminal of the MOSFET9c, a source terminal of the MOSFET9h, a drain terminal of the MOSFET9h, a negative pole of the battery device 4, a positive pole of the battery device 4, a drain terminal of the MOSFET9b, a source terminal of the MOSFET9b, a source terminal of the MOSFET9g, a drain terminal of the MOSFET9g, a negative pole of the battery device 3, a positive pole of the battery device 3, a drain terminal of the MOSFET9a, the source terminal of the MOSFET9a, and the positive pole 1a of the first extraction terminal 1. In this case, the smoothing reactor 11 is excited, and energy is accumulated in the smoothing reactor 11. Hereinafter, a state, in which the smoothing reactor 11 is excited, is defined as an excitation state.

In a second switch circuit 10, a MOSFET10a, a MOSFET10c, and a MOSFET10f are turned on, and the other MOSFETs are turned off, whereby a DC voltage, for which the battery device 3, the battery device 4, and the battery device 5 are connected in series, is extracted to the second extraction terminal 2. A second electric current 26 is flowed from the ground 7 to the source terminal of the MOSFET9i, the drain terminal of the MOSFET9i, the negative pole of the battery device 5, the positive pole of the battery device 5, a drain terminal of the MOSFET10c, a source terminal of the MOSFET10c, the negative pole of the battery device 4, the positive pole of the battery device 4, a drain terminal of the MOSFET10a, a source terminal of the MOSFET10a, the negative pole of the battery device 3, the positive pole of the battery device 3, a source terminal of the MOSFET10f, a drain terminal of the MOSFET10f, and a positive pole 2a of the second extraction terminal 2.

Figure 10:
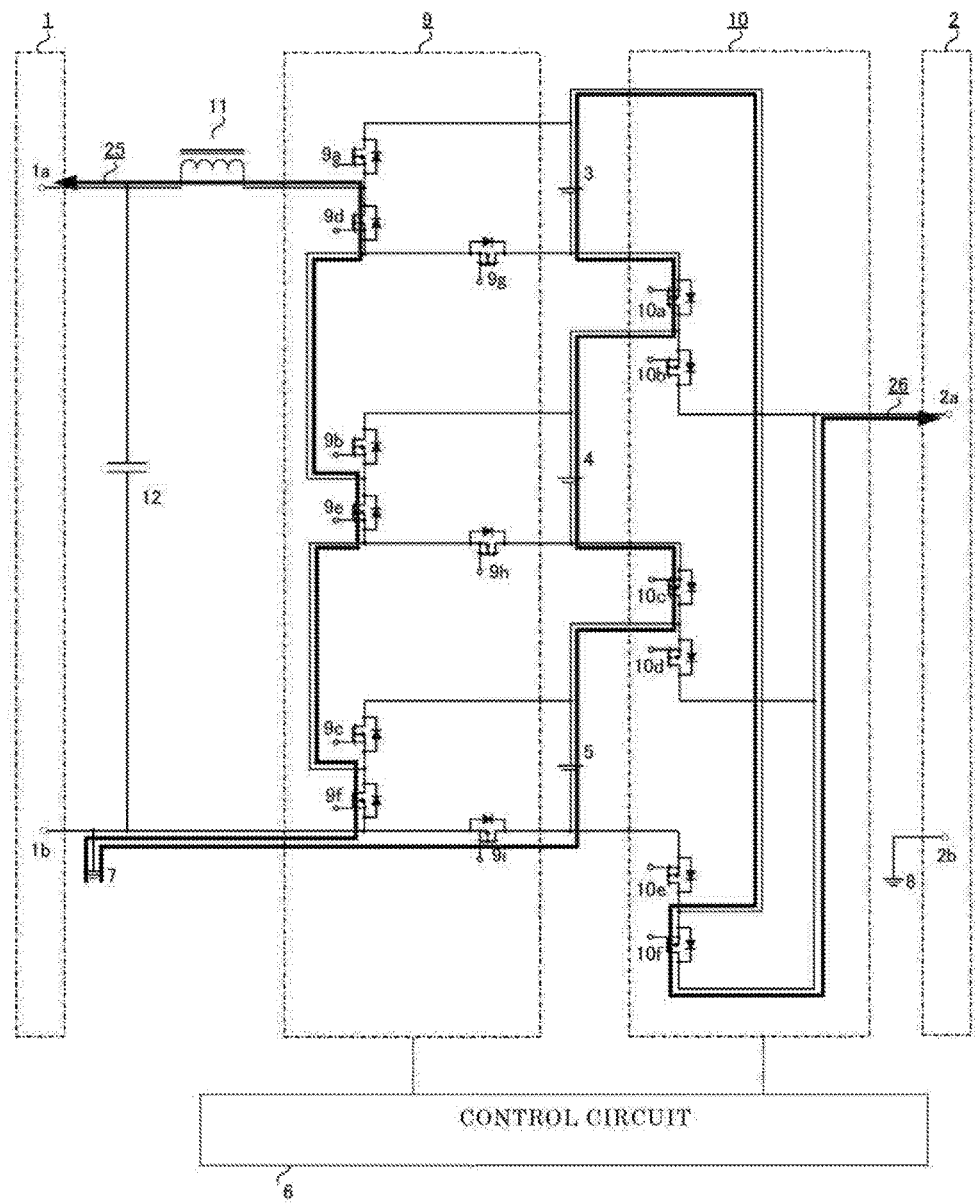
FIG. 10 is a diagram illustrating a circuit operation of the power supply device according to Embodiment 2.

After an operation, which is indicated in FIG. 9, is performed, in the first switch circuit 9, as indicated in FIG. 10, the MOSFET9d, a MOSFET9e, and a MOSFET9f are turned on, and the other MOSFETs are turned off, whereby energy is flowed back by the smoothing reactor 11 by using the accumulated energy in order to continue that the energy is supplied to the first extraction terminal 1. Hereinafter, a state, in which energy is flowed back by the smoothing reactor 11 by using the accumulated energy, is defined as a flowed-back state. Elapsed time, in which the smoothing reactor 11 is set at an excitation state, and the smoothing reactor 11 is sifted from the excitation state to a flowed-back state, and the smoothing reactor 11 is sifted from the flowed-back state to the excitation state again, is defined as one cycle. In FIG. 10, the first electric current 25 is flowed from the ground 7 to a source terminal of the MOSFET9f, a drain terminal of the MOSFET9f, a source terminal of the MOSFET9e, a drain terminal of the MOSFET9e, a source terminal of the MOSFET9d, the drain terminal of the MOSFET9d, and the positive pole 1a of the first extraction terminal 1. The second electric current 26 is flowed from the ground 7 to the source terminal of the MOSFET9i, the drain terminal of the MOSFET9i, the negative pole of the battery device 5, the positive pole of the battery device 5, the drain terminal of the MOSFET10c, the source terminal of the MOSFET10c, the negative pole of the battery device 4, the positive pole of the battery device 4, the drain terminal of the MOSFET10a, the source terminal of the MOSFET10a, the negative pole of the battery device 3, the positive pole of the battery device 3, the source terminal of the MOSFET10f, the drain terminal of the MOSFET10*f*, and the positive pole 2*a* of the second extraction terminal 2.

The MOSFETs in the first switch circuit 9 are switched by the control circuit 6 in such a way that an operation (excitation state), which is indicated in FIG. 9, and an operation (flowed-back state), which is indicated in FIG. 10, are repeated. In this case, a ratio of the operation (excitation state), which is indicated in FIG. 9, during one cycle is increased, whereby a ramp-state voltage, which is varied form 0 V to a DC voltage, for which the battery device 3, the battery device 4, and the battery device 5 are connected in series, can be extracted to the first extraction terminal 1.

Figure 11:
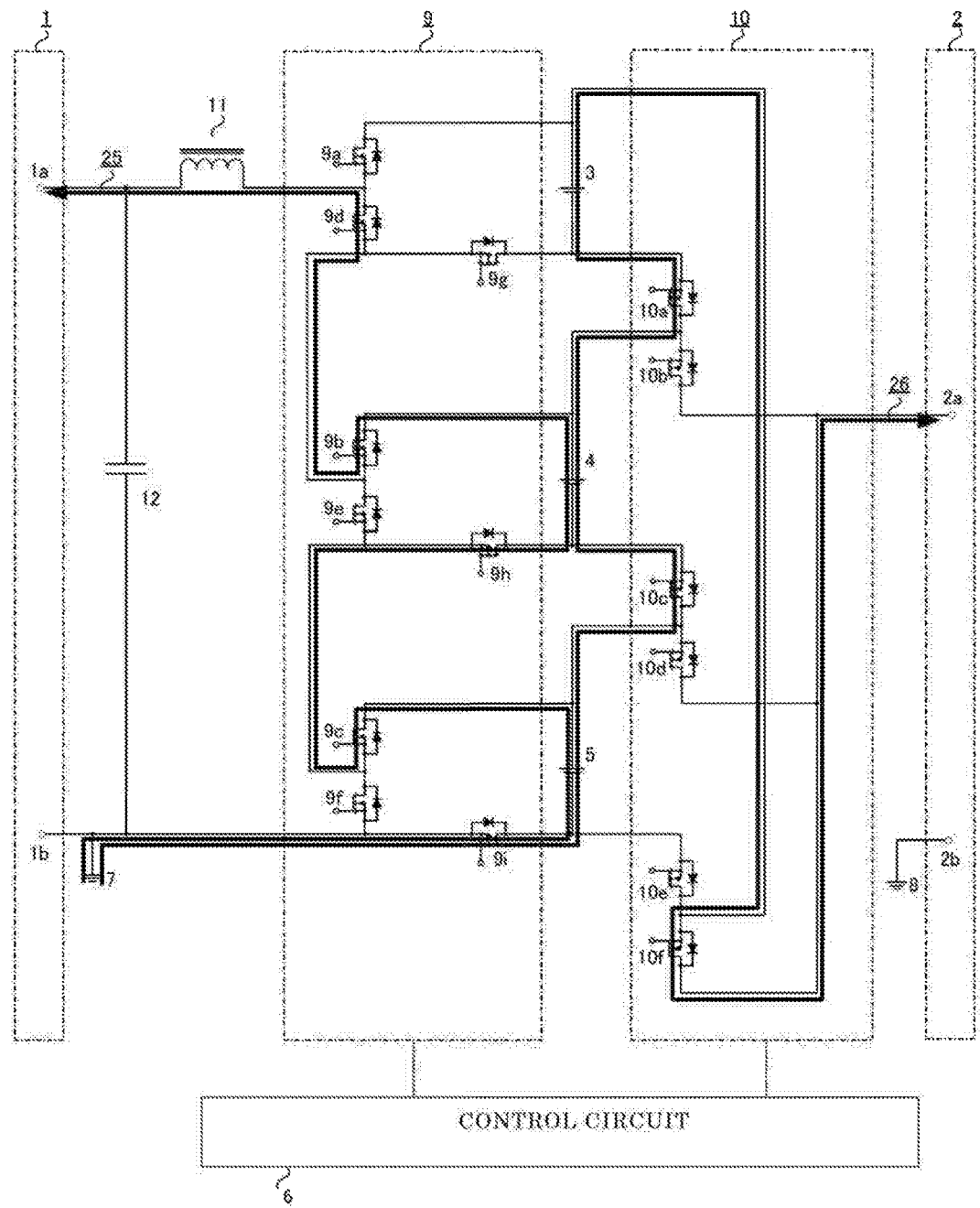
FIG. 11 is a diagram illustrating a circuit operation of the power supply device according to Embodiment 2.

Moreover, in the first switch circuit 9, as indicated in FIG. 11, the MOSFET9*b*, the MOSFET9*c*, the MOSFET9*d*, the MOSFET9*h*, and the MOSFET9*i* are turned on, and the other MOSFETs are turned off, whereby energy is supped to the first extraction terminal 1. In this case, the smoothing reactor 11 is excited, and the energy is accumulated in the smoothing reactor 11. The first electric current 25 is flowed from the ground 7 to the source terminal of the MOSFET9*i*, the drain terminal of the MOSFET9*i*, the negative pole of the battery device 5, the positive pole of the battery device 5, the drain terminal of the MOSFET9*c*, the source terminal of the MOSFET9*c*, the source terminal of the MOSFET9*h*, the drain terminal of the MOSFET9*h*, the negative pole of the battery device 4, the positive pole of the battery device 4, the drain terminal of the MOSFET9*b*, the source terminal of the MOSFET9*b*, the source terminal of the MOSFET9*d*, the drain terminal of the MOSFET9*d*, and the positive pole 1*a* of the first extraction terminal 1. In the second witch circuit 10, the MOSFET10*a*, the MOSFET10*c*, and the MOSFET10*f* are turned on, and the other MOSFETs are turned off, whereby a DC voltage, for which the battery device 3, the battery device 4, and the battery device 5 are connected in series, is extracted to the second extraction terminal 2.

The second electric current 26 is flowed from the ground 7 to the source terminal of the MOSFET9*i*, the drain terminal of the MOSFET9*i*, the negative pole of the battery device 5, the positive pole of the battery device 5, the drain terminal of the MOSFET10*c*, the source terminal of the MOSFET10*c*, the negative pole of the battery device 4, the positive pole of the battery device 4, the drain terminal of the MOSFET10*a*, the source terminal of the MOSFET10*a*, the negative pole of the battery device 3, the positive pole of the battery device 3, the source terminal of the MOSFET10*f*, the drain terminal of the MOSFET10*f*, and the positive pole 2*a* of the second extraction terminal 2.

In one cycle in which an operation (excitation state), winch is indicated in FIG. 11, and an operation (flowed-back state), which is indicated in FIG. 10, are included, an operation, which is similar to the above-described operation, is performed, whereby a ramp-state voltage, which is varied from 0 V to a DC voltage, for which the battery device 4 and the battery device 5 are connected in series, can be extracted to the first extraction terminal 1.

Figure 12:
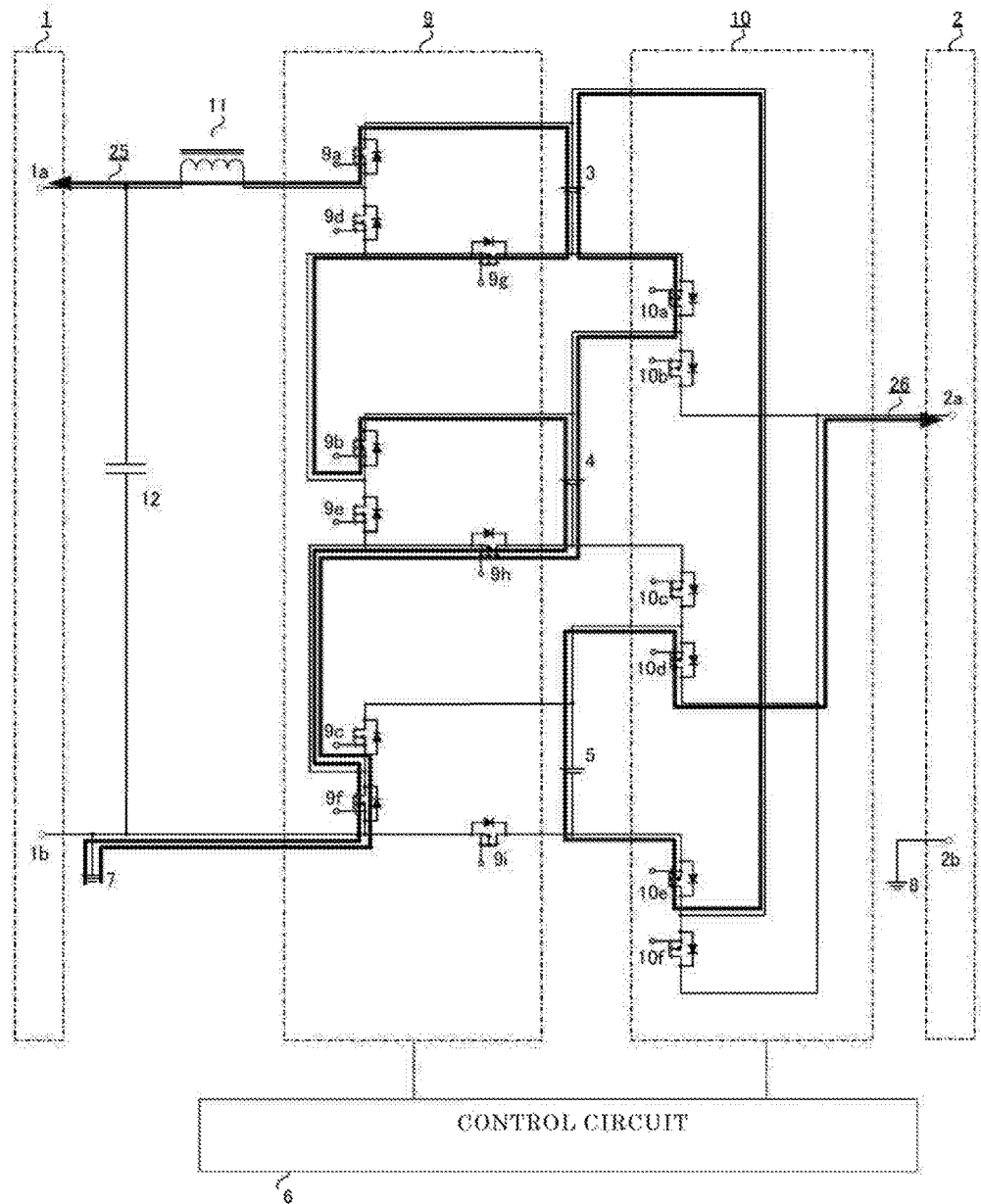
FIG. 12 is a diagram illustrating a circuit operation of the power supply device according to Embodiment 2.

Moreover, in the first switch circuit 9, as indicated in FIG. 12, the MOSFET9*a*, the MOSFET9*b*, the MOSFET9*f*, the MOSFET9*g*, and the MOSFET9*h* are turned on, and the other MOSFETs are turned off, whereby energy is supplied to the first extraction terminal 1. The first electric current 25 is flowed from the ground 7 to the source terminal of the MOSFET9*f*, the drain terminal of the MOSFET9*f*, the source terminal at the MOSFET9*h*, the drain terminal of the MOSFET9*h*, the negative pole of the battery device 4, the positive pole of the battery device 4, the drain terminal of the MOSFET9*b*, the source terminal of the MOSFET9*b*, the source terminal of the MOSFET9*g*, the drain terminal of the MOSFET9*g*, the negative pole of the battery device 3, the positive pole of the battery device 3, the drain terminal of the MOSFET9*a*, the source terminal of the MOSFET9*a*, and the positive pole 1*a* of the first extraction terminal 1. In this case, the smoothing reactor 11. is excited, and the energy is accumulated in the smoothing reactor 11. In the second switch circuit 10, the MOSFET10*a*, the MOSFET10*d*, and the MOSFET10*e* are turned on, and the other MOSFETs are turned off, whereby a DC voltage, for which the battery device 3, the battery device 4, and the battery device 5 are connected in series, is extracted to the second extraction terminal 2.

The second electric current 26 is flowed from the ground 7 to the source terminal of the MOSFET9*f*, the drain terminal of the MOSFET9*f*, the source terminal of the MOSFET9*h*, the drain terminal of the MOSFET9*h*, the negative pole of the battery device 4, the positive pole of the battery device 4, the drain terminal of the MOSFET10*a*, the source terminal of the MOSFET10*a*, the negative pole of the battery device 3, the positive pole of the battery device 3, the drain terminal of the MOSFET10*e*, the source terminal of the MOSFET10*e*, the negative pole of the battery device 5, the positive pole of the battery device 5, the source terminal of the MOSFET10*d*, the drain terminal of the MOSFET10*d*, and the positive pole 2*a* of the second extraction terminal 2.

In one cycle in which an operation (excitation state), which is indicated in FIG. 12, and an operation (flowed-back state), which is indicated in FIG. 10, are included, an operation, which is similar to the above-described operation, is performed, whereby a ramp-state voltage, which is varied from 0 V to a DC voltage, for which the battery device 3 and the battery device 4 are connected in series, can be extracted to the first extraction terminal 1.

Figure 13:
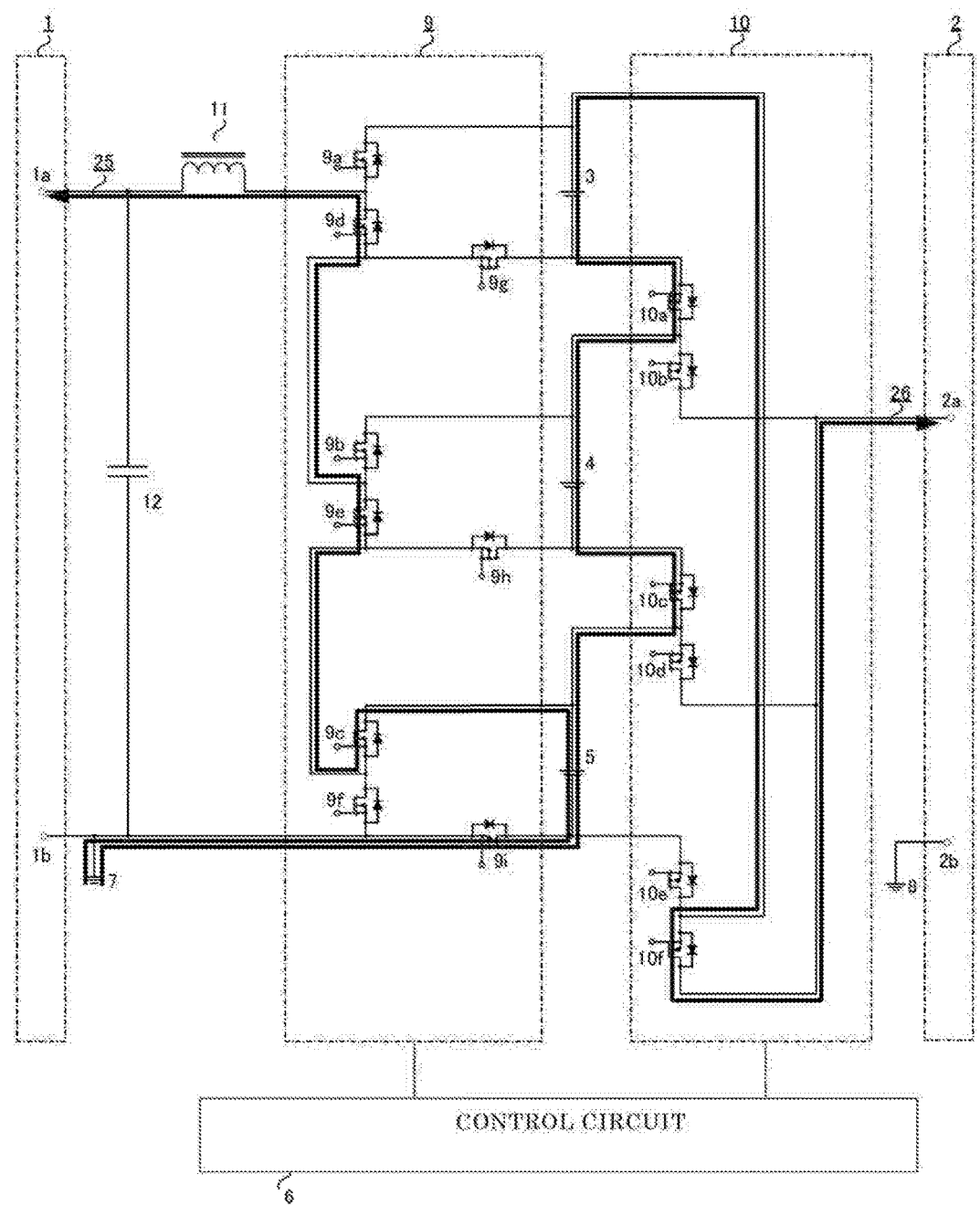
FIG. 13 is a diagram illustrating a circuit operation of the power supply device according to Embodiment 2.

Moreover, in the first switch circuit 9, as indicated in FIG. 13, the MOSFET9*c*, the MOSFET9*d*, the MOSFET9*e*, and the MOSFET9*i* are turned on, and the other MOSFETs are turned off, whereby energy is supplied to the first extraction terminal 1. In this case, the smoothing reactor 11 is excited, and the energy is accumulated in the smoothing reactor 11. The first electric current 25 is flowed from the ground 7 to the source terminal of the MOSFET9*i*, the drain terminal of the MOSFET9*i*, the negative pole of the battery device 5, the positive pole of the battery device 5, the drain terminal of the MOSFET9*c*, the source terminal of the MOSFET9*c*, the source terminal of the MOSFET9*e*, the drain terminal of the MOSFET9*e*, the source terminal of the MOSFET9*d*, the drain terminal of the MOSFET9*d*, the smoothing reactor 11, and the positive pole 1*a* of the first extraction terminal 1. In the second switch circuit 10, the MOSFET10*a*, the MOSFET10*c*, and the MOSFET10*f* are turned on, and the other MOSFETs are turned off, whereby a DC voltage, for which the battery device 3, the battery device 4, and the battery device 5 are connected in series, is extracted to the second extraction terminal 2.

The second electric current 26 is flowed from the ground 7 to the source terminal of the MOSFET9*i*, the drain terminal of the MOSFET9*i*, the negative pole of the battery device 5, the positive pole of the battery device 5, the drain terminal of the MOSFET10*c*, the source terminal of the MOSFET10*c*, the negative pole of the battery device 4, the positive pole of the battery device 4, the drain terminal of the MOSFET10*a*, the source terminal of the MOSFET10*a*, the negative pole of the battery device 3, the positive pole of the battery device 3, the source terminal of the MOSFET10*f*, the drain terminal of the MOSFET10*f*, and the positive pole 2*a* of the second extraction terminal 2.

In one cycle in which an operation (excitation state), which is indicated in FIG. 13, and an operation (flowed-back state), which is indicated in FIG. 10, are included, an operation, which is similar to the above-described operation, is performed, whereby a ramp-state voltage, which is varied from 0 V to a DC voltage of the battery device 5, can be extracted to the first extraction terminal 1.

Figure 14:
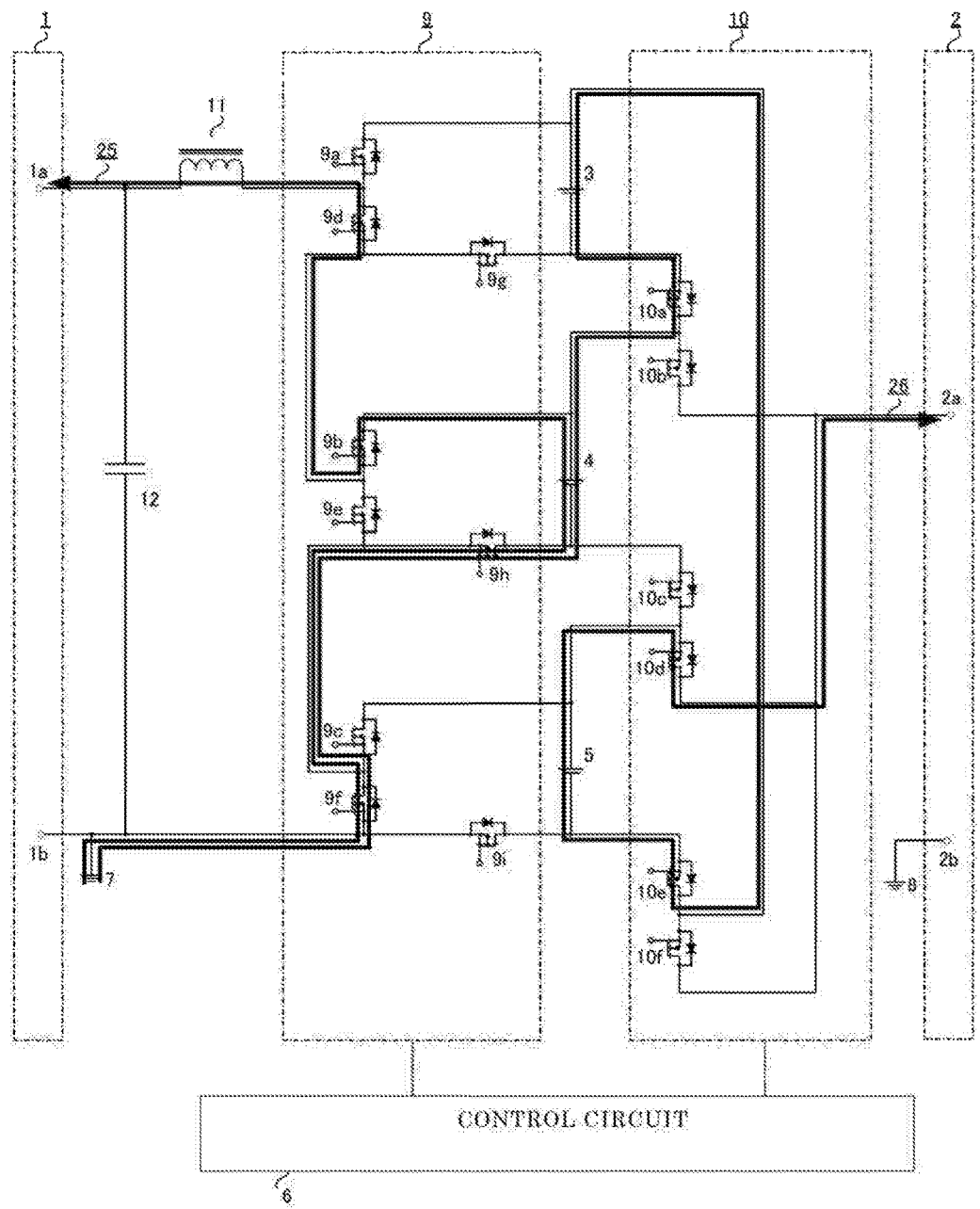
FIG. 14 is a diagram illustrating a circuit operation of the power supply device according to Embodiment 2.

Moreover, in the first switch circuit 9, as indicated in FIG. 14, the MOSFET9*b*, the MOSFET9*d*, the MOSFET9*f*, and the MOSFET9*h* are turned on, and the other MOSFETs are turned off, whereby energy is supplied to the first extraction terminal 1. In this case, the smoothing reactor 11 is excited, and the energy is accumulated in the smoothing reactor 11. The first electric current 25 is flowed from the ground 7 to the source terminal of the MOSFET9*f*, the drain terminal of the MOSFET9*f*, the source terminal of the MOSFET9*h*, the drain terminal of the MOSFET9*h*, the negative pole of the battery device 4, the positive pole of the battery device 4, the drain terminal of the MOSFET9*b*, the source terminal of the MOSFET9*b*, the source terminal of the MOSFET9*d*, the drain terminal of the MOSFET9*d*, the smoothing reactor 11, and the positive pole 1*a* of the first extraction terminal 1. In the second switch circuit 10, the MOSFET10*a*, the MOSFET10*d*, and the MOSFET10*e* are turned on, and the other MOSFETs are turned off, whereby a DC voltage, for which the battery device 3, the battery device 4, and the battery device 5 are connected in series, is extracted to the second extraction terminal 2.

The second electric current 26 is flowed from the ground 7 to the source terminal of the MOSFET9*f*, the drain terminal of the MOSFET9*f*, the source terminal of the MOSFET9*h*, the drain terminal of the MOSFET9*h*, the negative pole of the battery device 4, the positive pole of the battery device 4, the drain terminal of the MOSFET10*a*, the source terminal of the MOSFET10*a*, the negative pole of the battery device 3, the positive pole of the battery device 3, the drain terminal of the MOSFET10*e*, the source terminal of the MOSFET10*e*, the negative pole of the battery device 5, the positive pole of the battery device 5, the source terminal of the MOSFET10*d*, the drain terminal of the MOSFET10*d*, and the positive pole 2*a* of the second extraction terminal 2.

In one cycle in which an operation (excitation state), which is indicated in FIG. 14, and an operation (flowed-back state), which is indicated in FIG. 10, are included, an operation, which is similar to the above-described operation, is performed, whereby a ramp-state voltage, which is varied from 0 V to a DC voltage of the battery device 4, can be extracted to the first extraction terminal 1.

Figure 15:
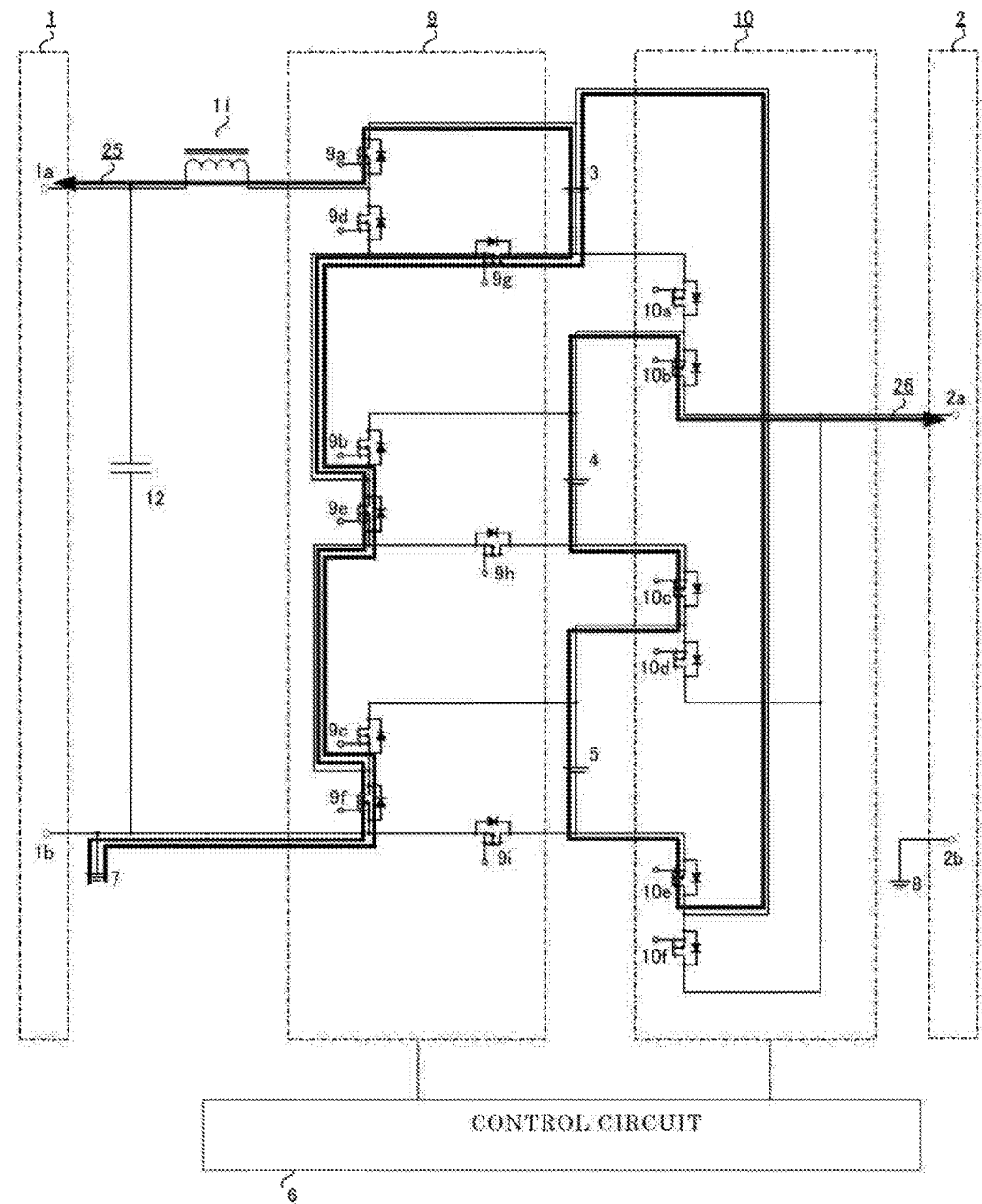
FIG. 15 is a diagram illustrating a circuit operation of the power supply device according to Embodiment 2.

Moreover, in the first switch circuit 9, as indicated in FIG. 15, the MOSFET9*a*, the MOSFET9*e*, the MOSFET9*f*, and the MOSFET9*g* are turned on, and the other MOSFETs are turned off, whereby energy is supplied to the first extraction terminal 1. In this case, the smoothing reactor 11 is excited, and the energy is accumulated in the smoothing reactor 11. The first electric current 25 is flowed from the ground 7 to the source terminal of the MOSFET9*f*, the drain terminal of the MOSFET9*f*, the source terminal of the MOSFET9*e*, the drain terminal of the MOSFET9*e*, the source terminal of the MOSFET9*g*, the drain terminal of the MOSFET9*g*, the negative pole of the battery device 3, the positive pole of the battery device 3, the drain terminal of the MOSFET9*a*, the source terminal of the MOSFET9*ac*, the smoothing reactor 11, and the positive pole 1*a* of the first extraction terminal 1. In the second switch circuit 10, the MOSFET10*b*, MOSFET10*c*, and the MOSFET10*e* are turned on, and the other MOSFETs are turned off, whereby a DC voltage, for which the battery device 3, the battery device 4, and the battery device 5 are connected in series, is extracted to the second extraction terminal 2.

The second electric current 26 is flowed from the ground 7 to the source terminal of the MOSFET9*f*, the drain terminal of the MOSFET9*f*, the source terminal of the MOSFET9*e*, the drain terminal of the MOSFET9*e*, the source terminal of the MOSFET9*g*, the drain terminal of the MOSFET9*g*, the negative pole of the battery device 3, the positive pole of the battery device 3, the drain terminal of the MOSFET10*e*, the source terminal of the MOSFET10*e*, the negative pole of the battery device 5, the positive pole of the battery device 5, the drain terminal of the MOSFET10*e*, the source terminal of the MOSFET10*c*, the negative pole of the battery device 4, the positive pole of the battery device 4, the source terminal of the MOSFET10*b*, the drain terminal of the MOSFET10*b*, and the positive pole 2*a* of the second extraction terminal 2.

In one cycle in which an operation (excitation state), which is indicated in FIG. 15, and an operation (flowed-back state), which is indicated in FIG. 10, are included, an operation, which is similar to the above-described operation, is performed, whereby a ramp-state voltage, which is varied from 0 V to a DC voltage of the battery device 3, can be extracted to the first extraction terminal 1.

As a result, the MOSFETs, which compose the first switch circuit 9, are switched, whereby a ramp-state voltage can be extracted to the first extraction terminal 1, so that an inrush electric current to the first extraction terminal 1 can be suppressed. In addition, in Embodiment 2 of the present invention, although the power supply device is explained by using a MOSFET (a field-effect transistor) as a switch, a similar effect is obtained even when a bipolar transistor, an insulation-type bipolar transistor (IGBT), a silicon carbide transistor, or a silicon carbide MOSFET is used.

Embodiment 3

Figure 16:
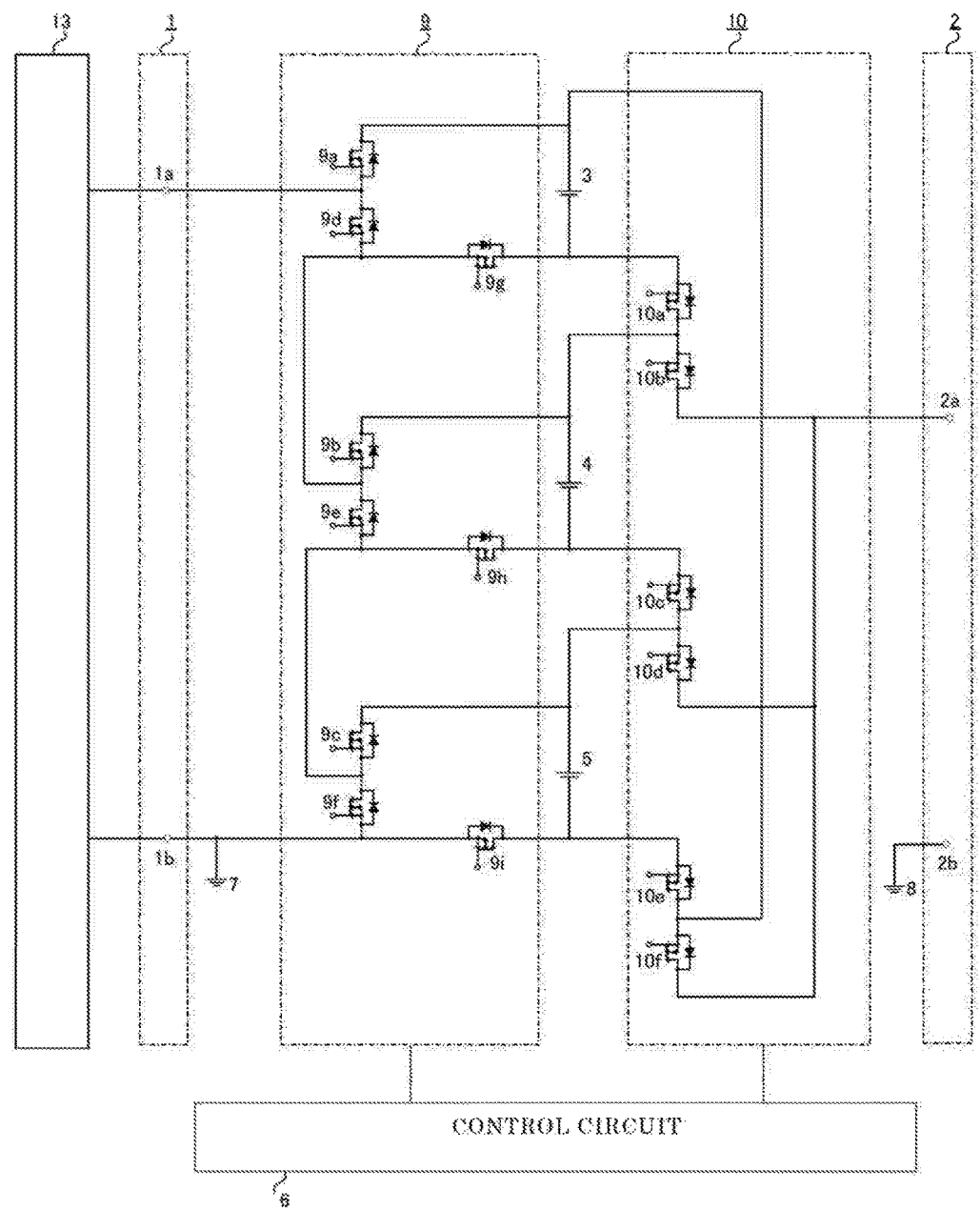
FIG. 16 is a circuit diagram illustrating a configuration of a power supply device according to Embodiment 3.
Figure 17:
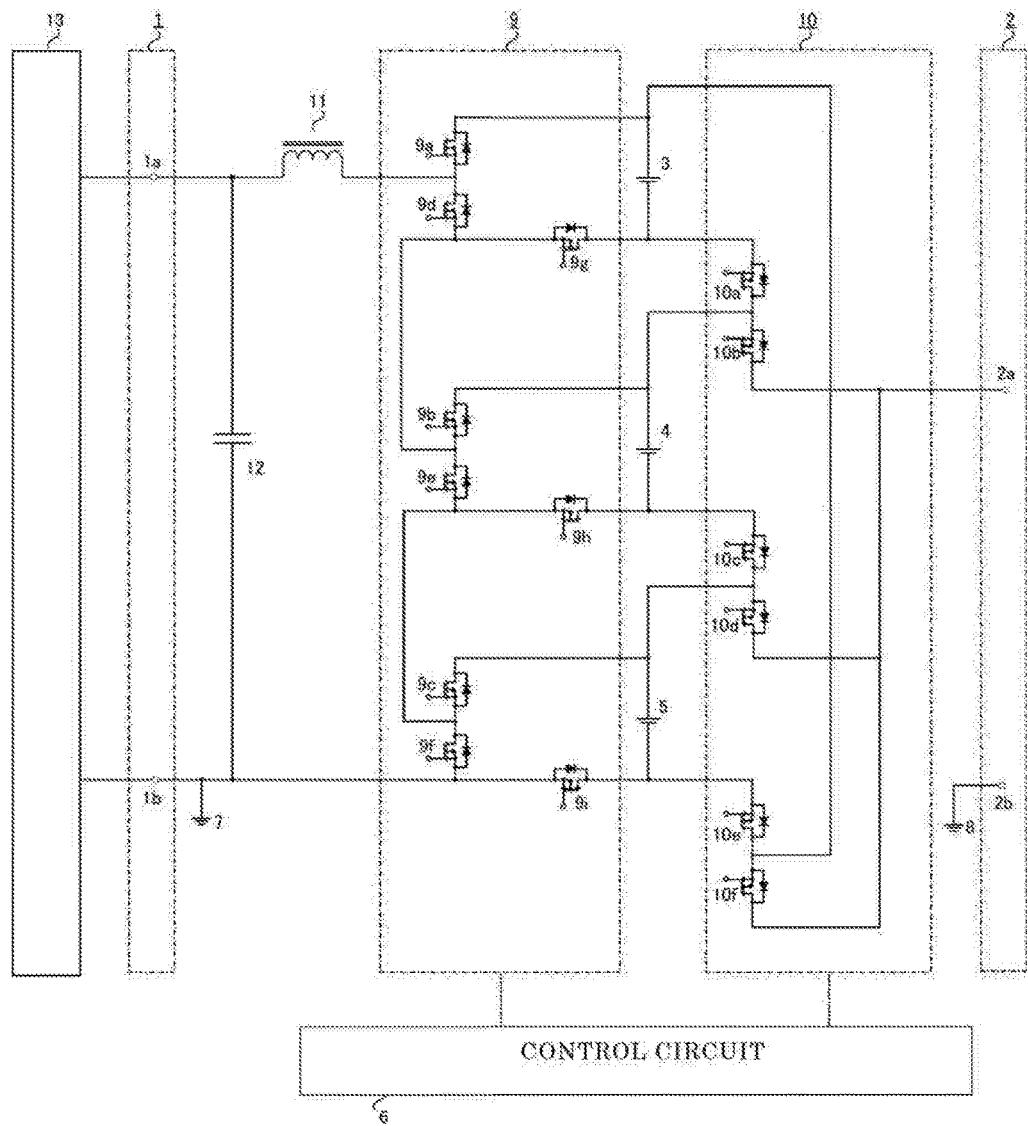
FIG. 17 is a circuit diagram illustrating the other configuration of the power supply device according to Embodiment 3.

Circuit diagrams of a power supply device according to Embodiment 3 of the present invention are illustrated in FIG. 16 and FIG. 17. Operations of a first switch circuit 9 and a second switch circuit 10 in Embodiment 3 of the present invention are similar to operations which are indicated in Embodiment 1, so that an explanation is omitted. The power supply device according to Embodiment 3, in which a charging device 13, which is used as a variable power supply device which is configured in such a way that a DC output voltage can be regulated, is added, is different from the power supply device according to Embodiment 1. In particular, a positive pole of the charging device 13 is connected to a positive pole 1*a* of a first extraction terminal 1, and a negative pole of the charging device 13 is connected to a negative pole 1*b* of the first extraction terminal 1.

The charging device 13 outputs a DC voltage in such a way that the outputted DC voltage is higher than a DC voltage which is extracted to the first extraction terminal 1. As a result, an electric power can be supplied from the charging device 13 to a battery device 3, a battery device 4, and a battery device 5, so that the battery devices can be charged. In particular, for example, in a connection state which is indicated in FIG. 2, FIG. 3, FIG. 4, FIG. 5, FIG. 6, FIG. 7, FIG. 9, FIG. 11, FIG. 12, FIG. 13, FIG. 14, or FIG. 15, a DC voltage is outputted from the charging device 13 in such a way that the outputted DC voltage is higher than a DC voltage which is extracted to the first extraction terminal 1, whereby one or a plurality of the battery device 3, the battery device 4, and the battery device 5, which are connected, can be charged.

Embodiment 4

Figure 18:
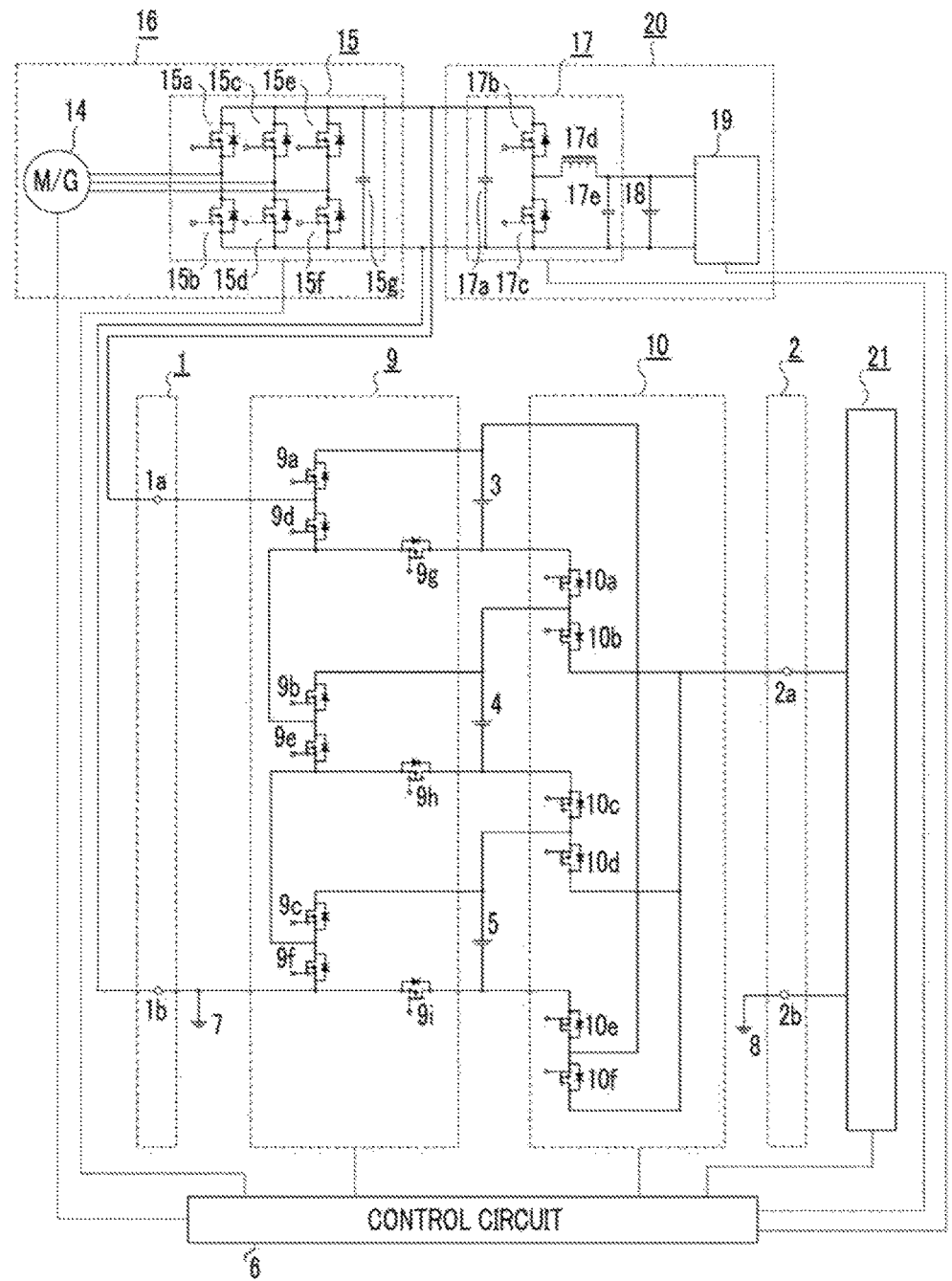
FIG. 18 is a circuit diagram illustrating a configuration of a power supply device according to Embodiment 4.
Figure 19:
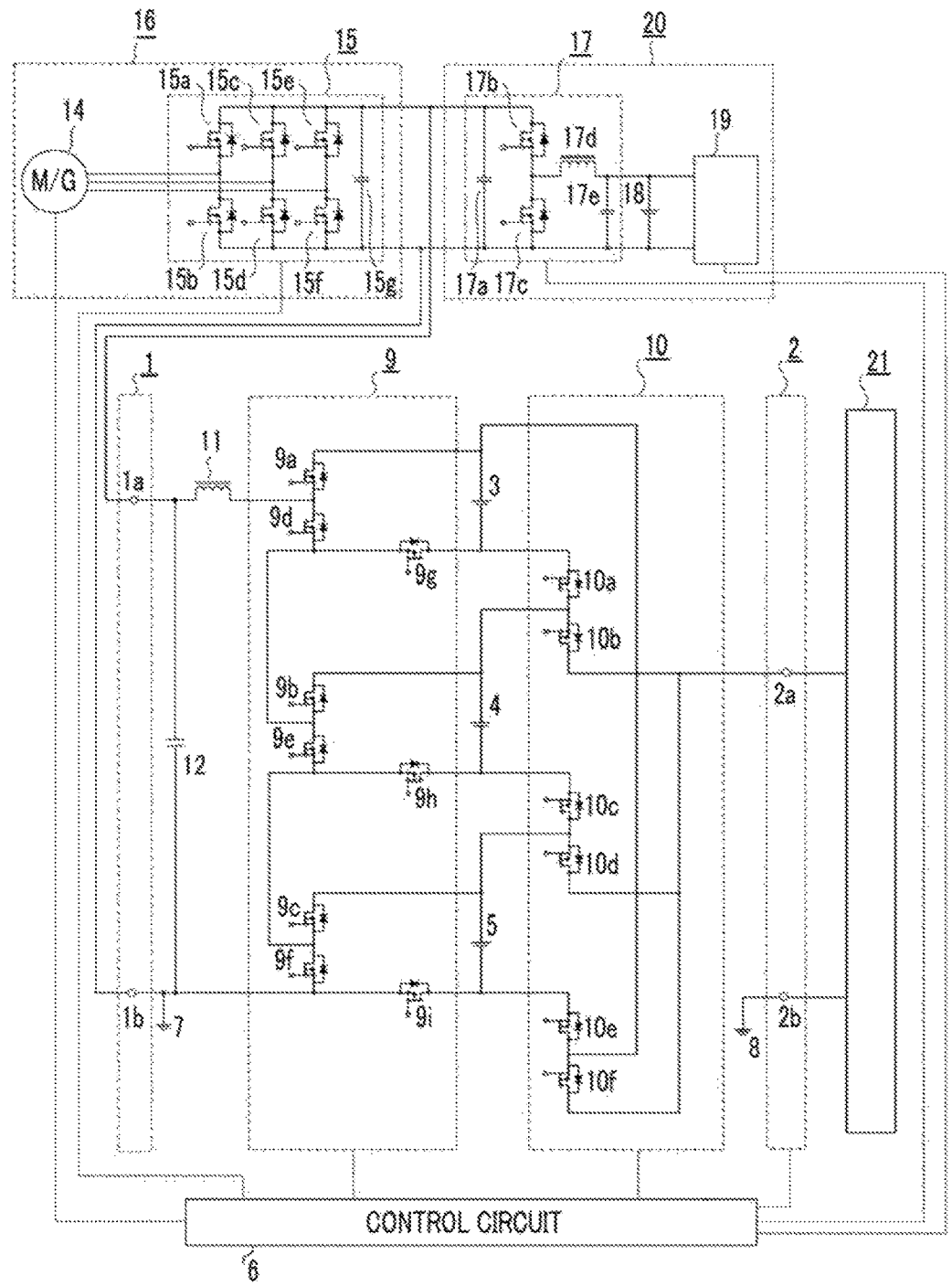
FIG. 19 is a circuit diagram illustrating the other configuration of the power supply device according to Embodiment 4.

Circuit diagrams of a power supply device according to Embodiment 4 of the present invention are illustrated in FIG. 18 and FIG. 19. Operations of a first switch circuit 9 and a second switch circuit 10 in Embodiment 4 of the present invention are similar to operations which are indicated in Embodiment 1 and Embodiment 2, so that an explanation is omitted. The power supply device according to Embodiment 4, in which a first load 16 which is composed of an electric generator 14 and an inverter 15 for driving the electric generator 14, a DC/DC converter 17, by which a DC bus of the inverter 15 is connected to a low-voltage battery device 18, a second load 20 which is composed of a low-voltage electrical component 19 which is connected to the low voltage battery device 18, and a third load 21 which is composed of an electric load, are added, is different from the power supply devices according to Embodiment 1 and Embodiment 2.

A connection condition between each of configuration elements in FIG. 18 will be explained. A positive pole 1*a* of a first extraction terminal 1, a DC voltage bus-side positive pole of the inverter 15, and a DC voltage bus-side positive pole of the DC/DC converter 17 are connected, and a negative pole 1*b* of the first extraction terminal 1, a DC voltage bus-side negative pole of the inverter 15, and a DC voltage bus-side negative pole of the DC/DC converter 17 are connected. A connection point of a source terminal of a MOSFET15*a* and a drain terminal of a MOSFET15*b*, and a connection point of a source terminal of a MOSFET15*c* and a drain terminal of a MOSFET15*d*, and a connection point of a source terminal of a MOSFET15*e* and a drain terminal of a MOSFET15*f*, which compose the inverter 15, are connected to the electric generator 14. The low-voltage battery device 18 and the low-voltage electrical component 19 are connected in parallel to a smoothing capacitor 17*e* which composes the DC/DC converter 17. A positive pole 2*a* of a second extraction terminal 2 and a positive pole of the third load 21 are connected, and a negative pole 2*b* of the second extraction terminal 2 and a negative pole of the third load 21 are connected. Although each of the inverter 15 and the DC/DC converter 17 has a function for controlling the inverter 15 and the DC/DC converter 17 are connected to a control circuit 6 in order to command an operation state to each of the configuration elements.

Hereinafter, a circuit configuration of each of the configuration elements will be explained. In the inverter 15, the source terminal of the MOSFET15*a* and the drain terminal of the MOSFET15*b* are connected, and the source terminal of the MOSFET15*c* and the drain terminal of the MOSFET15*d* are connected, and the source terminal of the MOSFET15*e* and the drain terminal of the MOSFET15*f* are respectively connected. A drain terminal of the MOSFET15*a*, a drain terminal of the MOSFET15*c*, and a drain terminal of the MOSFET15*e* are connected, and a source terminal of the MOSFET15*b*, a source terminal of the MOSFET15*d*, and a source terminal of the MOSFET15*f* are connected. The drain terminal of the MOSFET15*a* and one terminal of ta smoothing capacitor 15*g* are connected, and the source terminal of the MOSFET15*b* and the other terminal of the smoothing capacitor 15*g* are connected.

In the DC/DC converter 17, a source terminal of a MOSFET17*b* and a drain terminal of a MOSFET17*c* are connected, and a connection point of the source terminal of the MOSFET17*b* and the drain terminal of the MOSFET17*c* is connected to one terminal of a smoothing reactor 17*d*. The other terminal of the smoothing reactor 17*d* is connected to one terminal of a smoothing capacitor 17*e*, and a source terminal of the MOSFET17*c* is connected to the other terminal of the smoothing capacitor 17*e*. A drain terminal of the MOSFET17*b* is connected to one terminal of a smoothing capacitor 17*a*, and a source terminal of a MOSFET17*c* is connected to the other terminal of the smoothing capacitor 17*a*. The above-described circuit is configured, whereby the control circuit 6 controls each of the configuration elements while the control circuit 6 monitors an operation state of each of the configuration elements.

For example, the first switch circuit 9, and second switch circuit 10 are operated in such a way that a DC voltage, which is extracted to the first extraction terminal 1, is lowered when the electric generator 14 is started. As a result, it can be prevented that an excessive electric current is flowed to the electric generator 14 and the inverter 15, and it can be avoided that the electric generator 14 and the inverter 15 are broken. Moreover, the DC voltage, which is extracted to the first extraction terminal 1, is lowered, whereby a generation loss of the MOSFETs, which compose the inverter 15, can be reduced, and a cooler of the inverter 15 can be simplified, and the inverter 15 can be downsized.

Moreover, for example, when the low-voltage electrical component 19 is a heavy load, the first switch circuit 9 and the second switch circuit 10 are similarly operated as described above. As a result, an input voltage of the DC/DC converter 17 is lowered, and a generation loss of the DC/DC converter 17 can be reduced, and a cooler of the DC/DC converter 17 can be simplified, and the DC/DC converter 17 can be downsized.

Moreover, for example, the first switch circuit 9 and the second switch circuit 10 are operated in such a way that a DC voltage, which is extracted to the first extraction terminal 1, is raised when the electric generator 14 generates an electric power. As a result, a DC bus voltage is raised, and electric power generation energy of the electric generator 14 can be aggressively retrieved to the battery device 3, the battery device 4, and battery device 5, and the battery device 3, the battery device 4, and battery device 5 can be charged.

In addition, in Embodiment 4 of the present invention, although the power supply device is explained by using a MOSFET (a field-effect transistor) as a switch, a similar effect is obtained even when a bipolar transistor, an insulation-type bipolar transistor (IGBT), a silicon carbide transistor, or a silicon carbide MOSFET is used. Moreover, in Embodiment 4, although a circuit configuration of the DC/DC converter 17 is explained by using a non-insulation type step-down chopper circuit, it is suitable that the DC/DC converter 17 can be step-downed, and a non-insulation type or insulation type circuit method is not particularly required.

Embodiment 5

Figure 20:
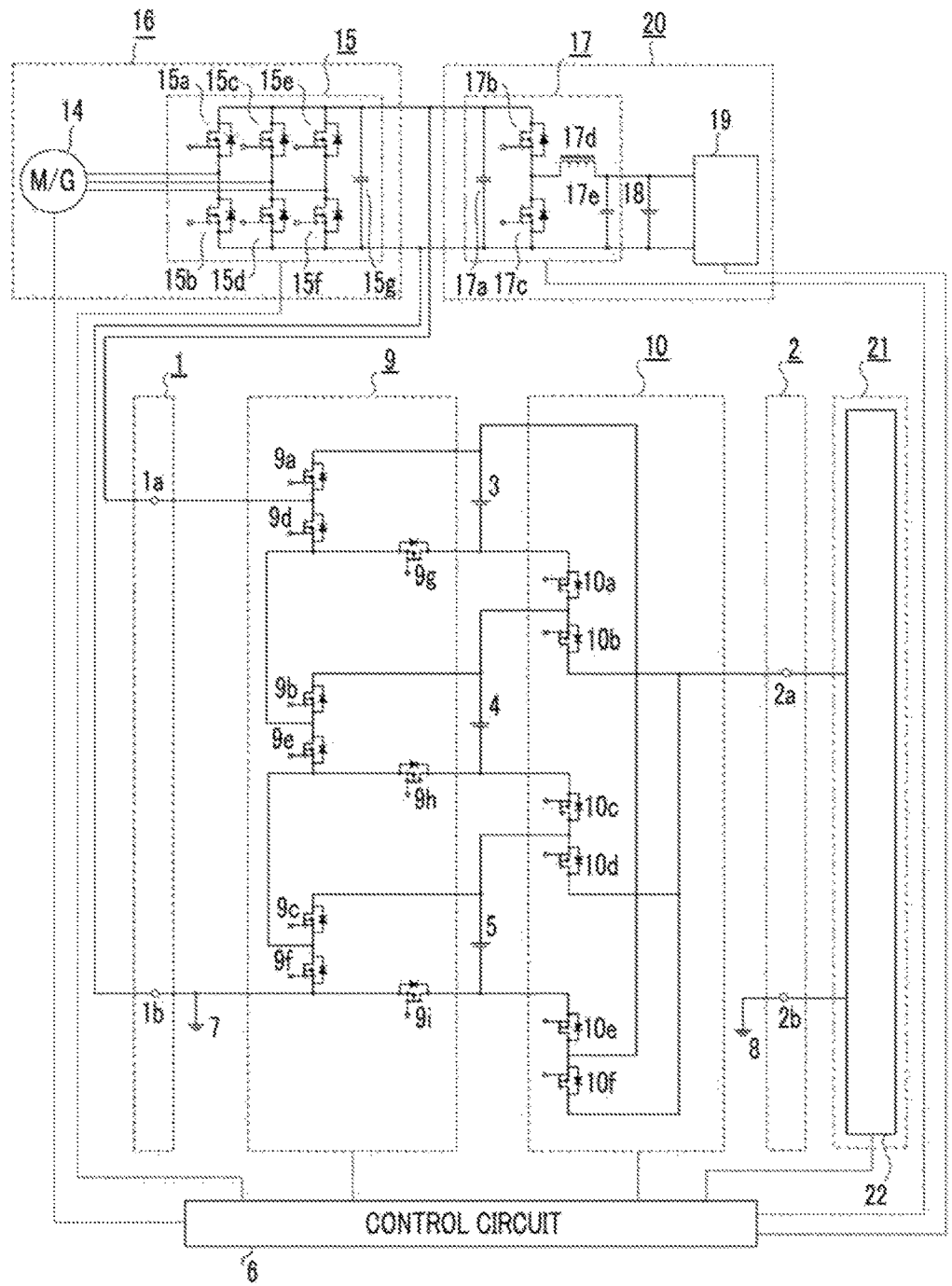
FIG. 20 is a circuit diagram illustrating a configuration of a power supply device according to Embodiment 5.
Figure 21:
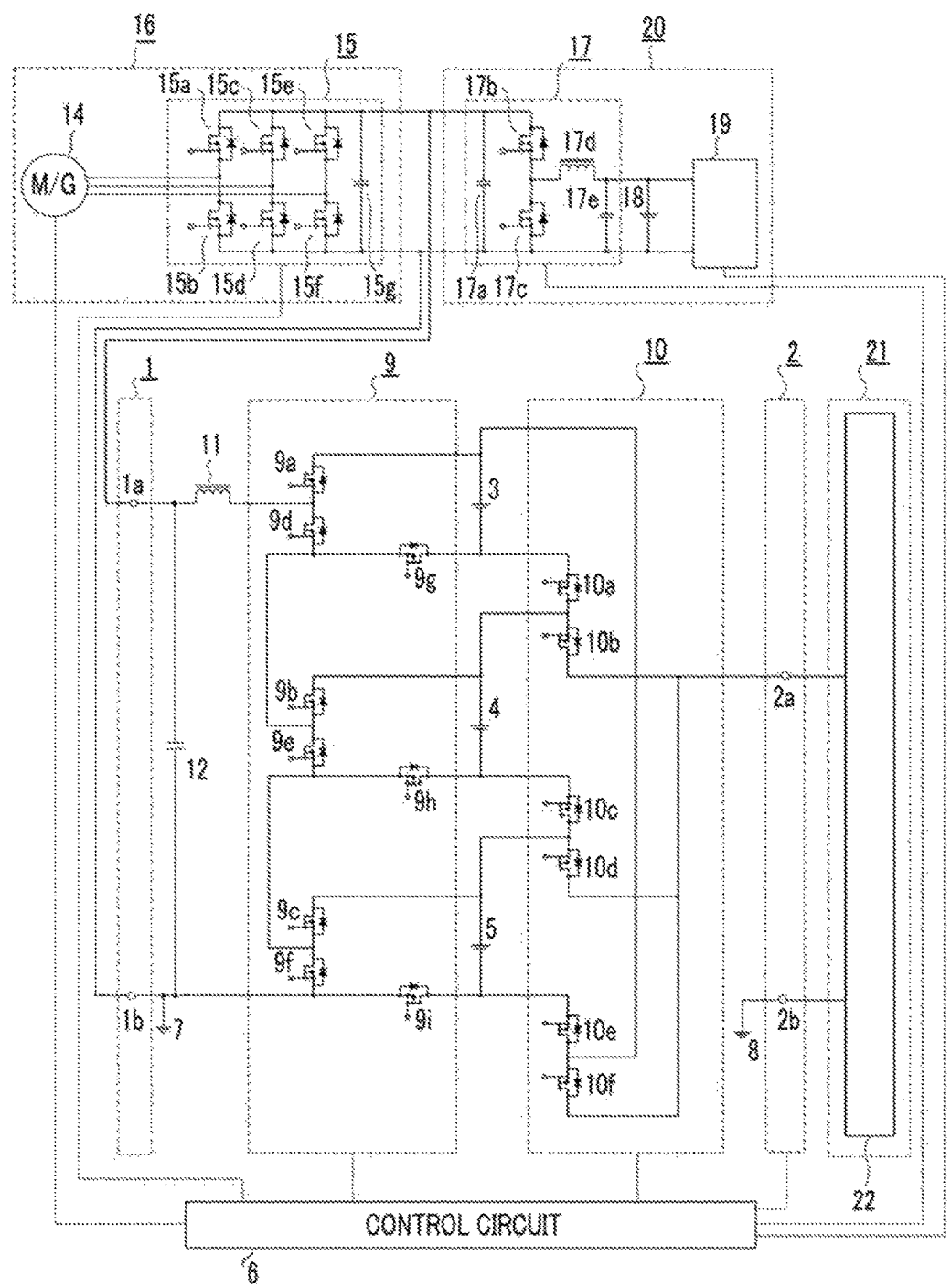
FIG. 21 is a circuit diagram illustrating the other configuration of the power supply device according to Embodiment 5.

Circuit diagrams of a power supply device according to Embodiment 5 are illustrated in FIG. 20 and FIG. 21. Operations of a first switch circuit 9 and a second switch circuit 10 in Embodiment 5 are similar to operations which are indicated in Embodiment 1 and Embodiment 2, so that an explanation is omitted. The power supply device according to Embodiment 5, in which a third load 21 is composed of a high-voltage electrical component 22 which needs an input voltage which is higher than an input voltage of a low-voltage battery device 18, is different from the power supply devices according to Embodiment 1 and Embodiment 2. As a result, an input voltage of the high-voltage electrical component 22 is set as a voltage, for which a battery device 3, a battery device 4, and a battery device 5 are connected in series, and the high-voltage electrical component 22 can be used without adding a DC/DC converter.

Embodiment 6

Figure 22:
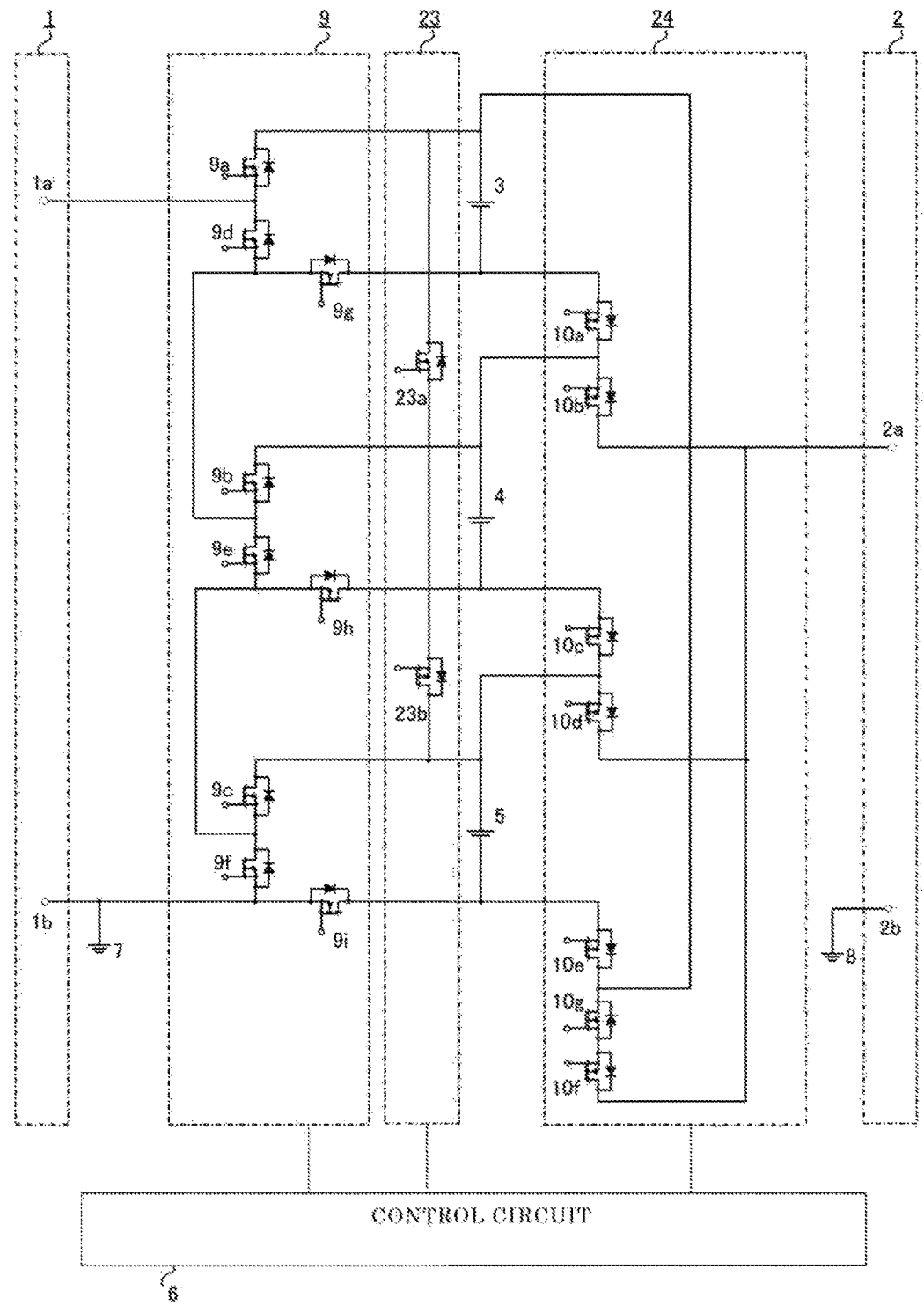
FIG. 22 is a circuit diagram illustrating a configuration of a power supply device according to Embodiment 6.

A circuit diagram of a power supply device according to Embodiment 6 of the present invention is illustrated in FIG. 22. The power supply device according to Embodiment 6, in which a third switch circuit 23 (third switch circuit) is added, and a MOSFET10g, by which a short circuit is prevented, is added in a second switch circuit 24, is different from the power supply device according to Embodiment 1. In particular, the third switch circuit 23 is composed of a MOSFET23a and a MOSFET23b, which are connected in reverse series, and a drain terminal of the MOSFET23a is connected to a positive pole terminal of a battery device 3, and a drain terminal of the MOSFET23b is connected to a positive pole terminal of a battery device 5. Moreover, a drain terminal of the MOSFET10g in the second switch circuit 24 is connected to a drain terminal of a MOSFET10e and the positive pole terminal of the battery device 3, and a source terminal of the MOSFET10g is connected to a source terminal of a MOSFET10f.

Figure 23:
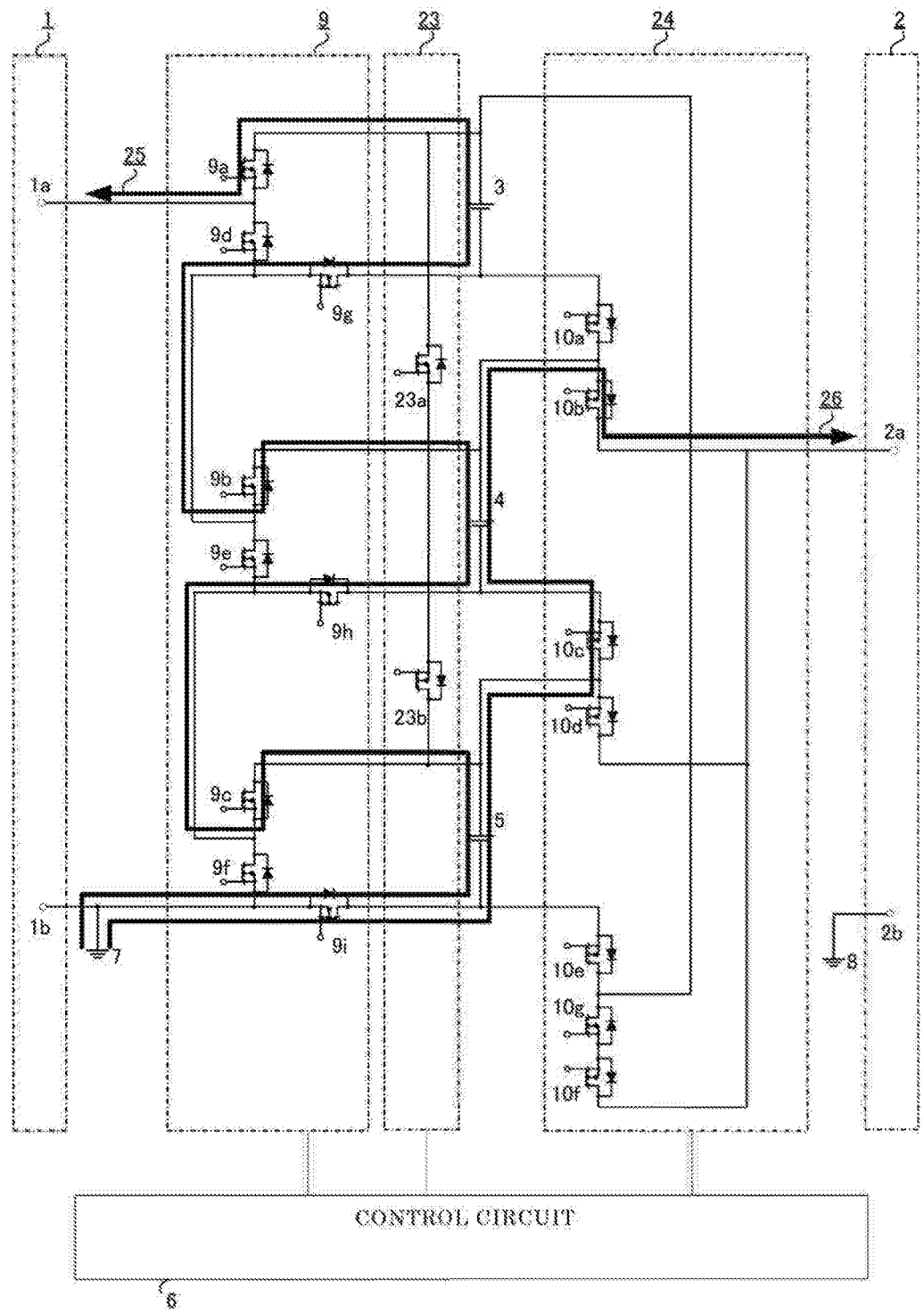
FIG. 23 is a diagram illustrating a circuit operation of the power supply device according to Embodiment 6.

Hereinafter an operation, in which a voltage is extracted from the battery device 3, a battery device 4, and the battery device 5 to a first extraction terminal 1 and a second extraction terminal 2, will be explained. In the first switch circuit 9, as indicated FIG. 23, a MOSFET9a, a MOSFET9b, a MOSFET9c, a MOSFET9g, a MOSFET9h, and a MOSFET9i are turned on, and the other MOSFETs are turned off, and the MOSFET23a and the MOSFET23b are turned off in the third switch circuit 23, whereby a ground 7 is connected to a negative pole terminal of the battery device 5, and a DC voltage, for which the battery device 3, the battery device 4, and the battery 5 are connected in series, is extracted to a positive pole 1a of a first extraction terminal 1. A first electric current 2d is flowed from the ground 7 to a source terminal of the MOSFET9i, drain terminal of the MOSFET9i, a negative pole of the battery device 5, a positive pole of the battery device 5, a drain terminal of the MOSFET9c, a source terminal of the MOSFET9c, a source terminal of the MOSFET9h, a drain terminal of the MOSFET9h, a negative pole of the battery device 4, a positive pole of the battery device 4, a drain terminal of the MOSFET9b, a source terminal of the MOSFET9b, a source terminal of the MOSFET9g, a drain terminal of the MOSFET9g, a negative pole of the battery device 3, a positive pole of the battery device 3, a drain terminal of the MOSFET9a, a source terminal of the MOSFET9a, and the positive pole 1a of the first extraction terminal 1.

In this case, in the second switch circuit 24, a MOSFET10b and a MOSFET10c are turned on, and the other MOSFETs are turned off, whereby a DC voltage, for which the battery device 4 and the battery device 5 are connected in series, is extracted to a positive pole 2a of the second extraction terminal 2. A second electric current 26 is flowed from the ground 7 to the source terminal of the MOSFET9i, the drain terminal of the MOSFET9i, the negative pole of the battery device 5, the positive pole of the battery device 5, a drain terminal of the MOSFET10c, a source terminal of the MOSFET10c, the negative pole of the battery device 4, the positive pole of the battery device 4, a source terminal of the MOSFET10b, a drain terminal of the MOSFET10b, and the positive pole 2a of the second extraction terminal 2.

Figure 24:
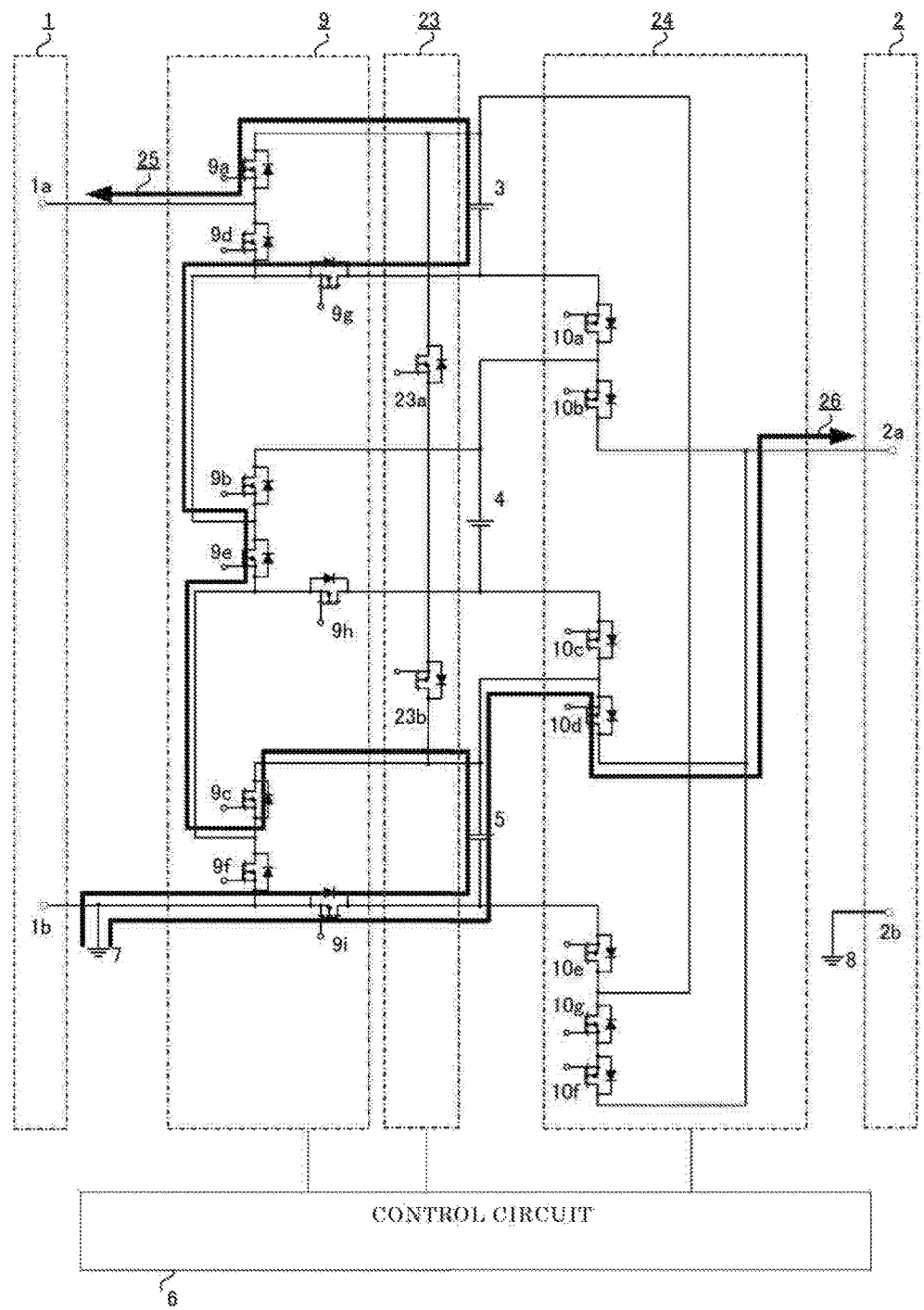
FIG. 24 is a diagram illustrating a circuit operation of the power supply device according to Embodiment 6.

In addition, in the second switch circuit 24, as indicated in FIG. 24, a MOSFET10d is turned on, and the other MOSFETs are turned off, whereby a DC voltage of the battery device 5 can be extracted to the positive pole 2a of the second extraction terminal 2. The second electric current 26 is flowed from the ground 7 to the source terminal of the MOSFET9i, the drain terminal of the MOSFET9i, the negative pole of the battery device 5, the positive pole of the battery device 5, a source terminal of the MOSFET10d and a drain terminal of the MOSFET10d, and the positive pole 2a of the second extraction terminal 2. Moreover, in the first switch circuit 9, the MOSFET9a, the MOSFET9c, the MOSFET9e, the MOSFET9g, and the MOSFET9i are turned on, and the other MOSFETs are turned off, whereby the ground 7 is connected to the negative pole of the battery device 5, and a DC voltage, for which the battery device 3 and the battery device 5 are connected in series, is extracted to the positive pole 1a of the first extraction terminal 1.

The first electric current 25 is flowed from the ground 7 to the source terminal of the MOSFET9i, the drain terminal of the MOSFET9i, the negative pole of the battery device 5, the positive pole of the battery device 5, the drain terminal of the MOSFET9c, the source terminal of the MOSFET9c, the source terminal of the MOSFET9e, the drain terminal of the MOSFET9e, the source terminal of the MOSFET9g, the drain terminal of the MOSFET9g, the negative pole of the battery device 3, the positive pole of the battery device 3, the drain terminal of the MOSFET9a, the source terminal of the MOSFET9a, and the positive pole 1a of the first extraction terminal 1.

Figure 25:
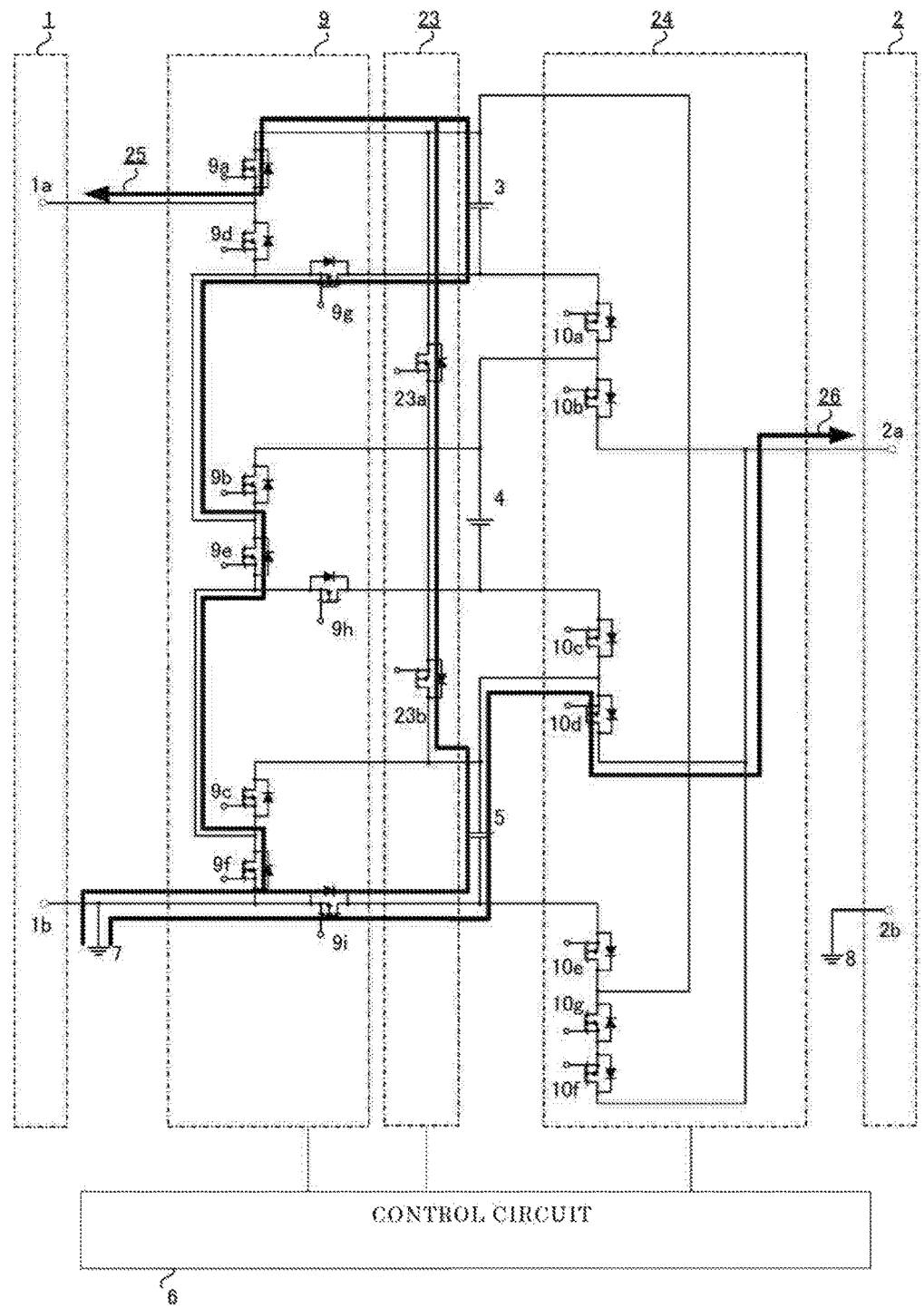
FIG. 25 is a diagram illustrating a circuit operation of the power supply device according to Embodiment 6.

In this case, in the first switch circuit 9, as indicated in FIG. 25, the MOSFET9a, the MOSFET9e, the MOSFET9f, the MOSFET9g, and the MOSFET9i are turned on, and the other MOSFETs are turned off, and the MOSFET23a and the MOSFET23b are turned on in the third switch circuit 23, whereby the ground 7 is connected to the negative pole terminals of the battery device 3 and the battery device 5, and the positive pole terminal of the battery device 3 is connected to the positive pole terminal of the battery device 5.

As a result, a DC voltage, for which the battery device 3 and the battery device 5 are connected in parallel, is extracted to the positive pole 1a of the first extraction terminal 1, and an allowable electric current can be expanded in accordance with the parallel connection of the battery device 3 and the battery device 5. One electric current of the first electric current 25 is flowed from the ground 7 to the source terminal of the MOSFET9f, the drain terminal of the MOSFET9f, the source terminal of the MOSFET9e, the drain terminal of the MOSFET9e, the source terminal of the MOSFET9g, the drain terminal of the MOSFET9g, the negative pole of the battery device 3, the positive pole of the battery device 3, the drain terminal of the MOSFET9a, the source terminal of the MOSFET9a, and the positive pole 1a of the first extraction terminal 1. The other electric current of the first electric current 25 is flowed from the ground 7 to the source terminal of the MOSFET9i, the drain terminal of the MOSFET9i, the negative pole of the battery device 5, the positive pole of the battery device 5, the drain terminal of the MOSFET23b, the source terminal of the MOSFET23b, the source terminal of the MOSFET23a, the drain terminal of the MOSFET23a, the drain terminal of the MOSFET9a, the source terminal of the MOSFET9a, and the positive pole 1a of the first extraction terminal 1.

Moreover, a DC voltage, for which the battery device 3 and the battery device 5 are connected in parallel, is extracted to the positive pole 2a of the second extraction terminal 2, and an allowable electric current can be expanded in accordance with the parallel connection of the battery device 3 and the battery device 5. One electric current of the second electric current 26 is flowed from the ground 7 to the source terminal of the MOSFET9i, the drain terminal of the MOSFET9*i*, the negative pole of the battery device 5, the positive pole of the battery device 5, the source terminal of the MOSFET10*d*, the drain terminal of the MOSFET10*d*, and the positive pole 2*a* of the second extraction terminal 2. Although an electric current passage is not clearly indicated, the other electric current of the second electric current 26 is flowed from the ground 7 to the source terminal of the MOSFET9*f*, the drain terminal of the MOSFET9*f*, the source terminal of the MOSFET9*e*, the drain terminal of the MOSFET9*e*, the source terminal of the MOSFET9*g*, the drain terminal of the MOSFET9*g*, the negative pole of the battery device 3, the positive pole of the battery device 3, the drain terminal of the MOSFET23*a*, the source terminal of the MOSFET23*a*, the source terminal of the MOSFET23*b*, the drain terminal of the MOSFET23*b*, the source terminal of the MOSFET10*d*, the drain terminal of the MOSFET10*d*, and the positive pole 2*a* of the second extraction terminal 2. In addition, the charging device 13, which is indicated in the power supply device in FIG. 16, is connected to the first extraction terminal 1 which is indicated in the power supply device in FIG. 22, whereby the battery device 3, the battery device 4, and battery device 5 can be charged. In particular, the positive pole of the charging device 13 is connected to the positive pole 1*a* of the first extraction terminal 1, and the negative pole of the charging device 13 is connected to the negative pole 1*b* of the first extraction terminal 1.

In this case, a plurality of battery devices are connected in series in Patent Document 1, so that an electric current, which can be supplied to a load, is limited to an allowable electric current of one battery device. Therefore, when a load state, in which a large electric current is required even at a low voltage, is caused, it is required that a battery device is added in parallel and an allowable electric current is increased, and there has been a problem in that a large size and a high cost of a power supply device are caused in accordance with the addition of the battery device. However, in the power supply device according to Embodiment 6, a DC voltage, for which a plurality of battery devices (in particular, the battery device 3 and battery device 5) are connected in parallel, is extracted, and an allowable electric current can be expanded in accordance with a parallel connection of a plurality of battery devices (in particular, the battery device 3 and the battery device 5). Therefore, a power supply device, by which an allowable output electric current can be expanded as necessary with a small size and a low cost, can be obtained. The above-described effect is similarly exercised even in the following Embodiment 7 through Embodiment 11.

Embodiment 7

Figure 26:
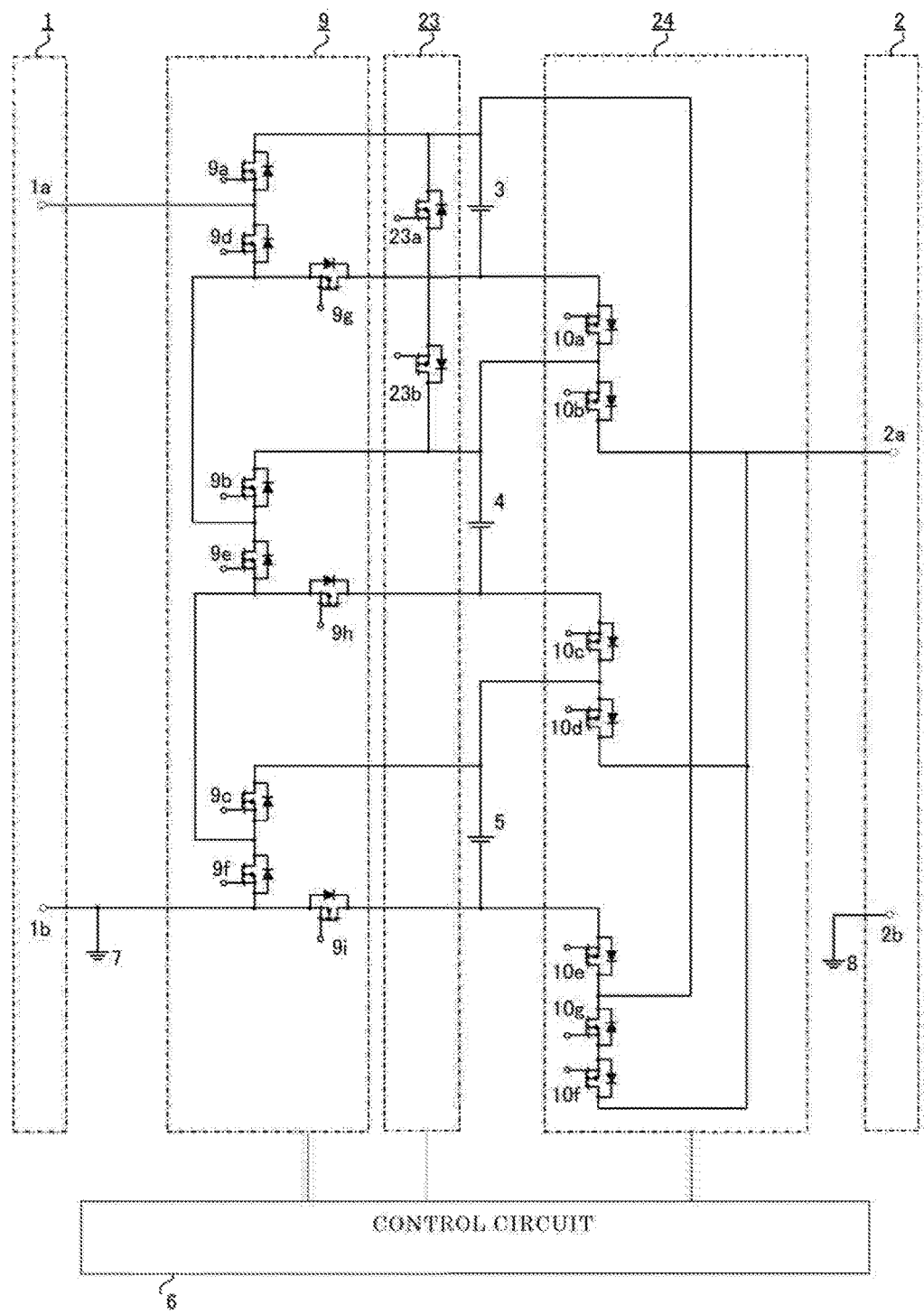
FIG. 26 is a circuit diagram illustrating a configuration of a power supply device according to Embodiment 7.

A circuit diagram of a power supply device according to Embodiment 7 of the present invention is illustrated in FIG. 26. The power supply device according to Embodiment 7, in which a third switch circuit 23 is connected to a battery device 3 and a battery device 4, is different from the power supply device according to Embodiment 6. In particular, in a MOSFET23*a* and a MOSFET23*b*, which are connected in reverse series, a drain terminal of the MOSFET23*a* is connected to a positive pole terminal of the battery device 3, and a drain terminal of the MOSFET23*b* is connected to a positive pole terminal of the battery device 4.

Figure 27:
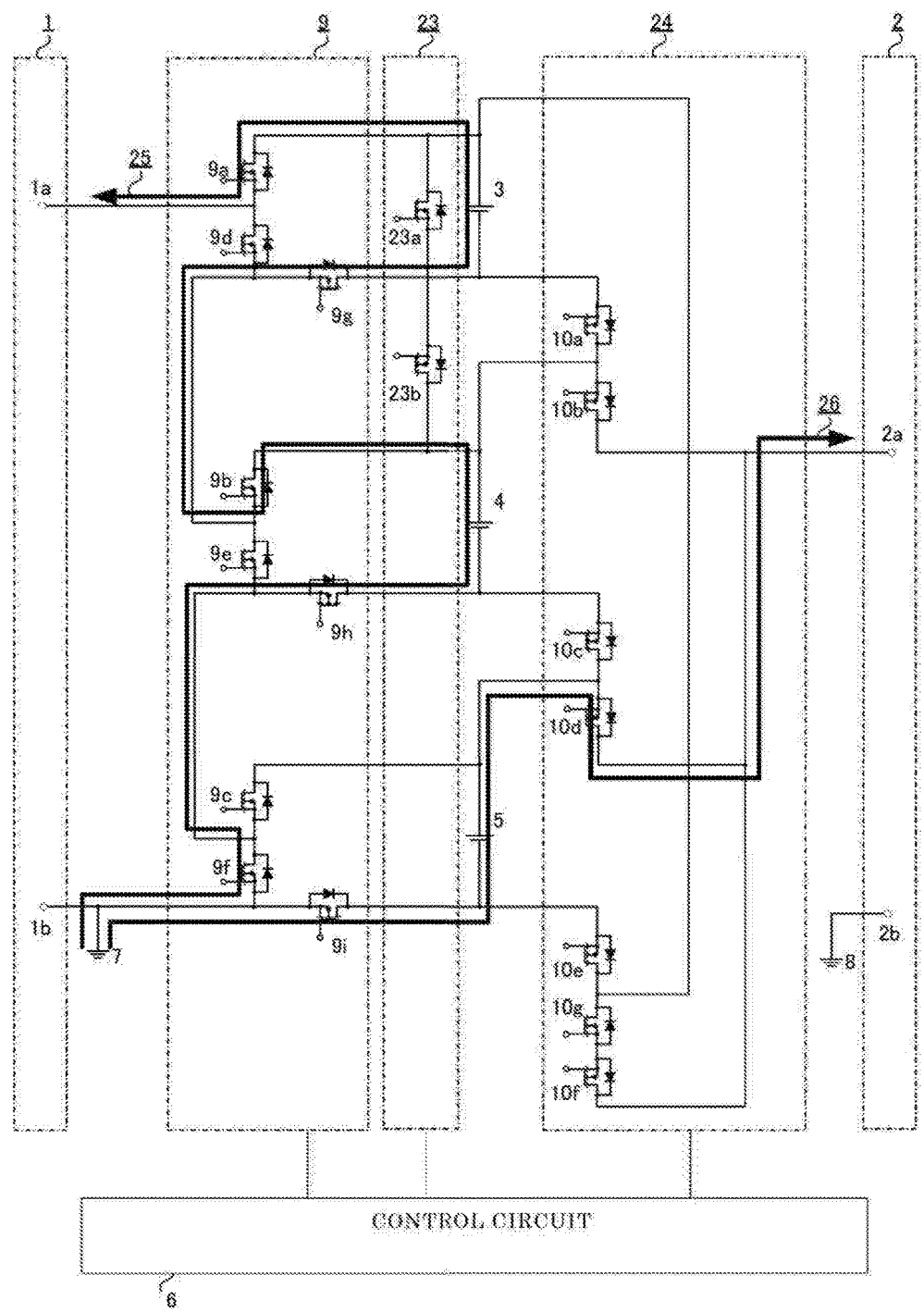
FIG. 27 is a diagram illustrating a circuit operation of the power supply device according to Embodiment 7.

Hereinafter, an operation, in which a voltage is extracted from the battery device 3, the battery device 4, and a battery device 5 to a first extraction terminal 1 and a second extraction terminal 2, will be explained. In a first switch circuit 9, as indicated in FIG. 27, the MOSFET9*a*, a MOSFET9*b*, a MOSFET9*f*, a MOSFET9*g*, a MOSFET9*h*, and a MOSFET9*i* are turned on, and the other MOSFETs are turned off, and the MOSFET23*a* and the MOSFET23*b* are turned off in the third switch circuit 23, whereby a ground 7 is connected to negative pole terminals of the battery device 4 and the battery device 5, and a DC voltage, for which the battery device 3 and the battery device 4 are connected in series, is extracted to a positive pole 1*a* of the first extraction terminal 1. A first electric current 25 is flowed from the ground 7 to a source terminal of the MOSFET9*f*, a drain terminal of the MOSFET9*f*, a source terminal of the MOSFET9*h*, a drain terminal of the MOSFET9*h*, a negative pole of the battery device 4, a positive pole of the battery device 4, a drain terminal of the MOSFET9*b*, a source terminal of the MOSFET9*b*, a source terminal of the MOSFET9*g*, a drain terminal of the MOSFET9*g*, a negative pole of the battery device 3, a positive pole of the battery device 3, a drain terminal of the MOSFET9*a*, a source terminal of the MOSFET9*a*, and the positive pole 1*a* of the first extraction terminal 1.

In this case, in a second switch circuit 24, a MOSFET10*d* is turned on, and the other MOSFETs are turned off, whereby a DC voltage of the battery device 5 is extracted to a positive pole 2*a* of the second extraction terminal 2. A second electric current 26 is flowed from the ground 7 to a source terminal of the MOSFET9*i*, a drain terminal of the MOSFET9*i*, a negative pole of the battery device 5, a positive pole of the battery device 5, a source terminal of the MOSFET10*d*, a drain terminal of the MOSFET10*d*, and the positive pole 2*a* of the second extraction terminal 2. In addition, a MOSFET10*g* is added in order to prevent a short circuit. For example, when the MOSFET10*g* is not included in FIG. 27, a voltage of the battery device 5 is applied to a drain terminal of a MOSFET10*f*, and a voltage, for which the battery device 3, the battery device 4, and battery device 5 are connected in series, is applied to a source terminal of the MOSFET10*f*. Thereby, a short circuit is caused. The short circuit is prevented by the MOSFET10*g*. A short circuit is similarly prevented by a MOSFET10*h* for preventing a short circuit, which is described in the following description.

Figure 28:
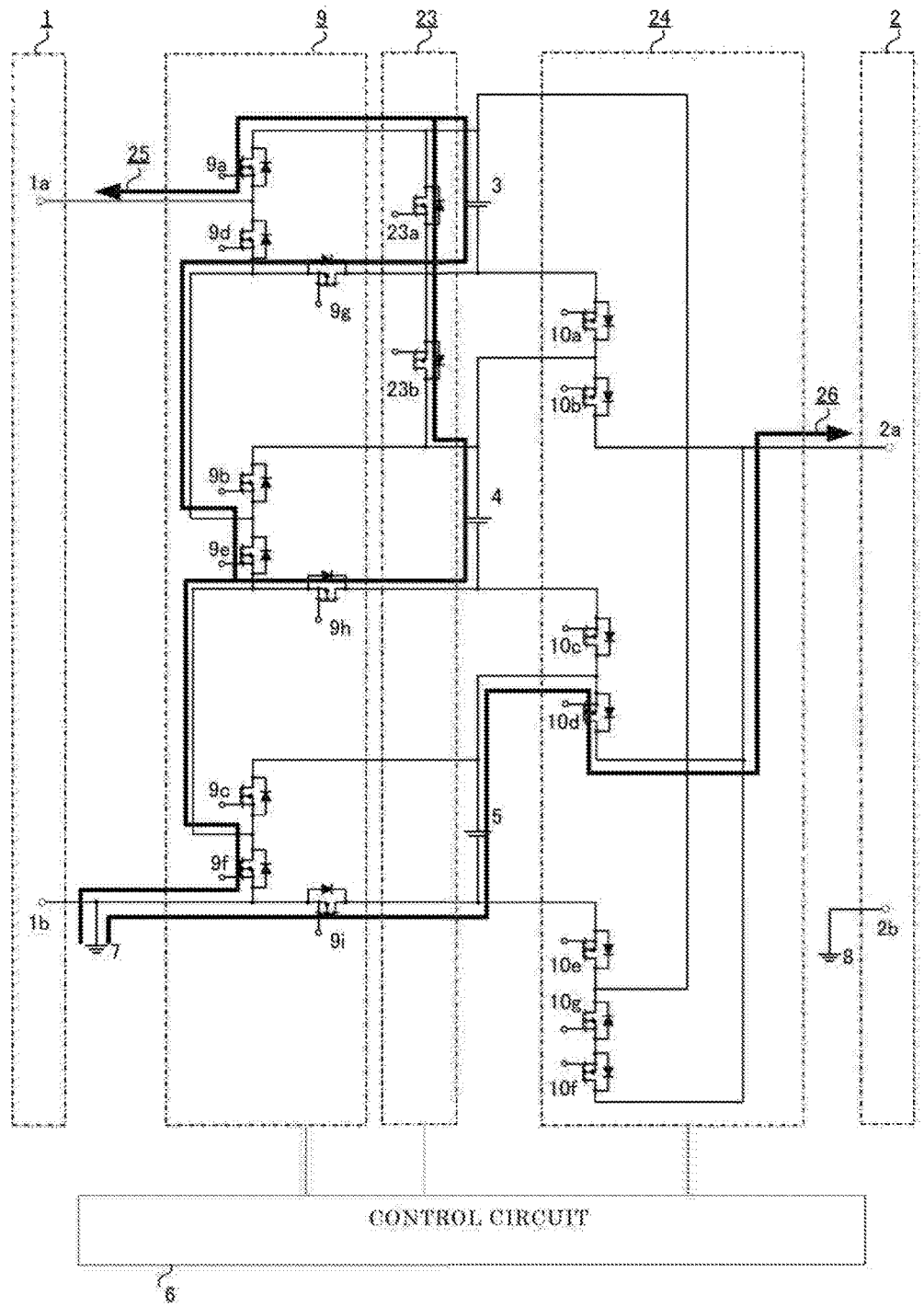
FIG. 28 is a diagram illustrating a circuit operation of the power supply device according to Embodiment 7.

In this case, in a first switch circuit 9, as indicated in FIG. 28, the MOSFET9*a*, and the MOSFET9*e*, the MOSFET9*f*, the MOSFET9*g*, the MOSFET9*h*, and the MOSFET9*i* are turned on, and the other MOSFETs are turned off, and the MOSFET23*a* and the MOSFET23*b* are turned on in the third switch circuit 23, whereby the ground 7 is connected to the negative pole terminals of the battery device 3 and the battery device 4, and the positive pole terminal of the battery device 3 is connected to the positive pole terminal of the battery device 4.

As a result, a DC voltage, for which the battery device 3 and the battery device 4 are connected in parallel, is extracted to the positive pole 1*a* of the first extraction terminal 1. and an allowable electric current can be expanded in accordance with the parallel connection of the battery device 3 and the battery device 4. One electric current of the first electric current 25 is flowed from the ground 7 to the source terminal of the MOSFET9*f*, the drain terminal of the MOSFET9*f*, the source terminal of the MOSFET9*e*, the drain terminal of the MOSFET9*e*, the source terminal of the MOSFET9*g*, the drain terminal of the MOSFET9*g*, the negative pole of the battery device 3, the positive pole of the battery device 3, the drain terminal of the MOSFET9*a*, the source terminal of the MOSFET9*a*, and the positive pole 1*a* of the first extraction terminal 1. The other electric current of the first electric current 25 is flowed from the ground 7 to the source terminal of the MOSFET9*f*, the drain terminal of the MOSFET9f, the source terminal of the MOSFET9h, the drain terminal of the MOSFET9h, the negative pole of the battery device 4, the positive pole of the battery device 4, the drain terminal of the MOSFET23b, the source terminal of the MOSFET23b, the source terminal of the MOSFET23a, the drain terminal of the MOSFET23a, the drain terminal of the MOSFET9a, the source terminal of the MOSFET9a, and the positive pole 1a of the first extraction terminal 1. Moreover, a DC voltage of the battery device 5 is extracted from the positive pole 2a of the second extraction terminal 2.

The second electric current 26 is flowed from the ground 7 to the source terminal of the MOSFET9i, the drain terminal of the MOSFET9i, the negative pole of the battery device 5, the positive pole of the battery device 5, the source terminal of the MOSFET10d, the drain terminal of the MOSFET10d, and the positive pole 2a of the second extraction terminal 2.

In addition, the charging device 13, which is indicated in the power supply device in FIG. 16, is connected to the first extraction terminal 1 of the power supply device in FIG. 26, whereby the battery device 3, the battery device 4, and the battery device 5 can be charged. In particular, the positive pole of the charging device 13 is connected to the positive pole 1a of the positive pole 1a of the first extraction terminal 1, and the negative pole of the charging device 23 is connected to the negative pole 1b of the first extraction terminal 1.

Embodiment 8

Figure 29:
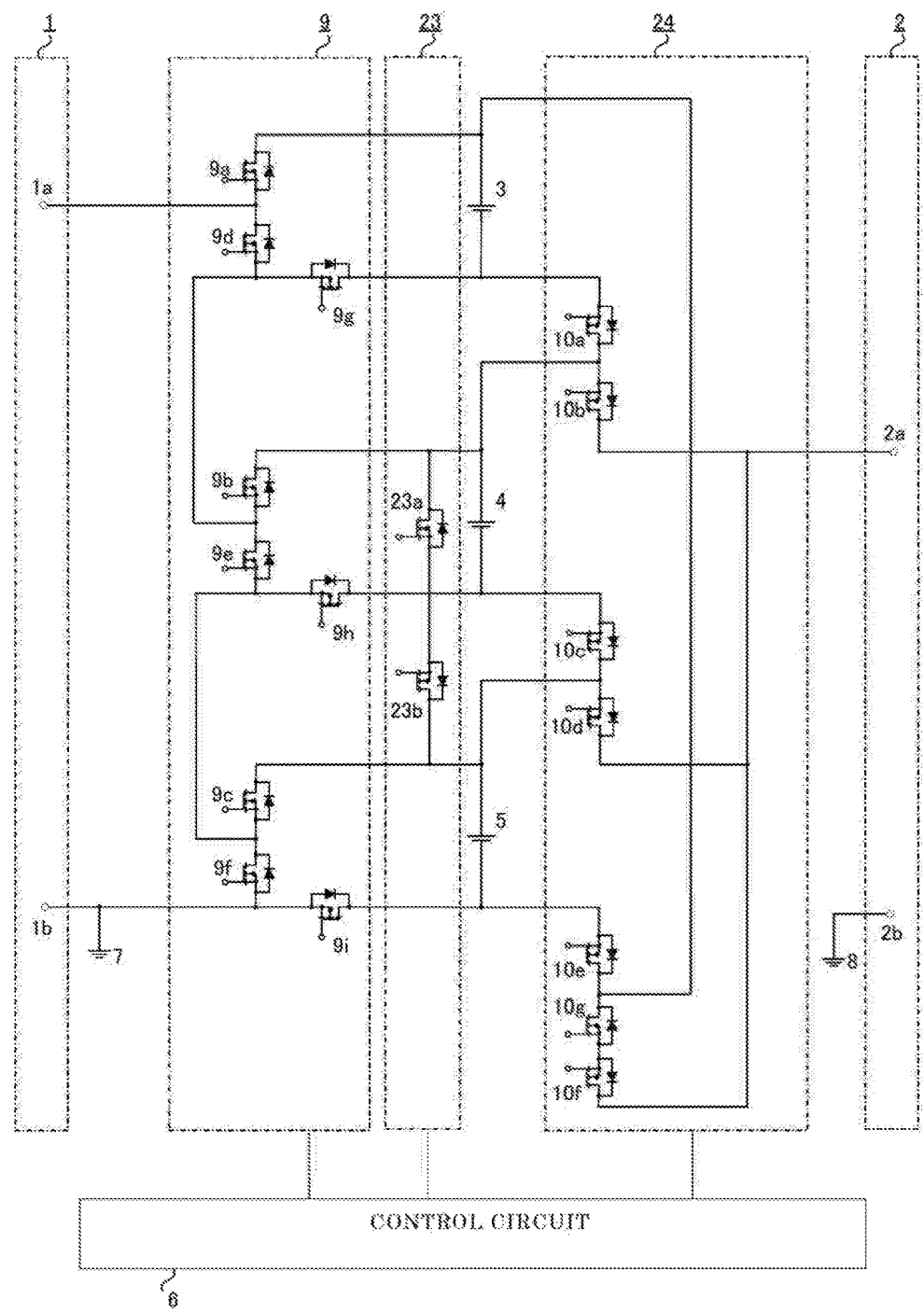
FIG. 29 is a circuit diagram illustrating a configuration of a power supply device according to Embodiment 8.

A circuit diagram of a power supply device according to Embodiment 8 of the present invention is illustrated in FIG. 29. The power supply device according to Embodiment 8, in which a third switch circuit 23 is connected to a battery device 4 and a battery device 5, is different from the power supply device according to Embodiment 6. In particular, a drain terminal of the MOSFET23a is connected to a positive pole terminal of the battery device 4, and a drain terminal of the MOSFET23b is connected to a positive pole terminal of the battery device 5.

Figure 30:
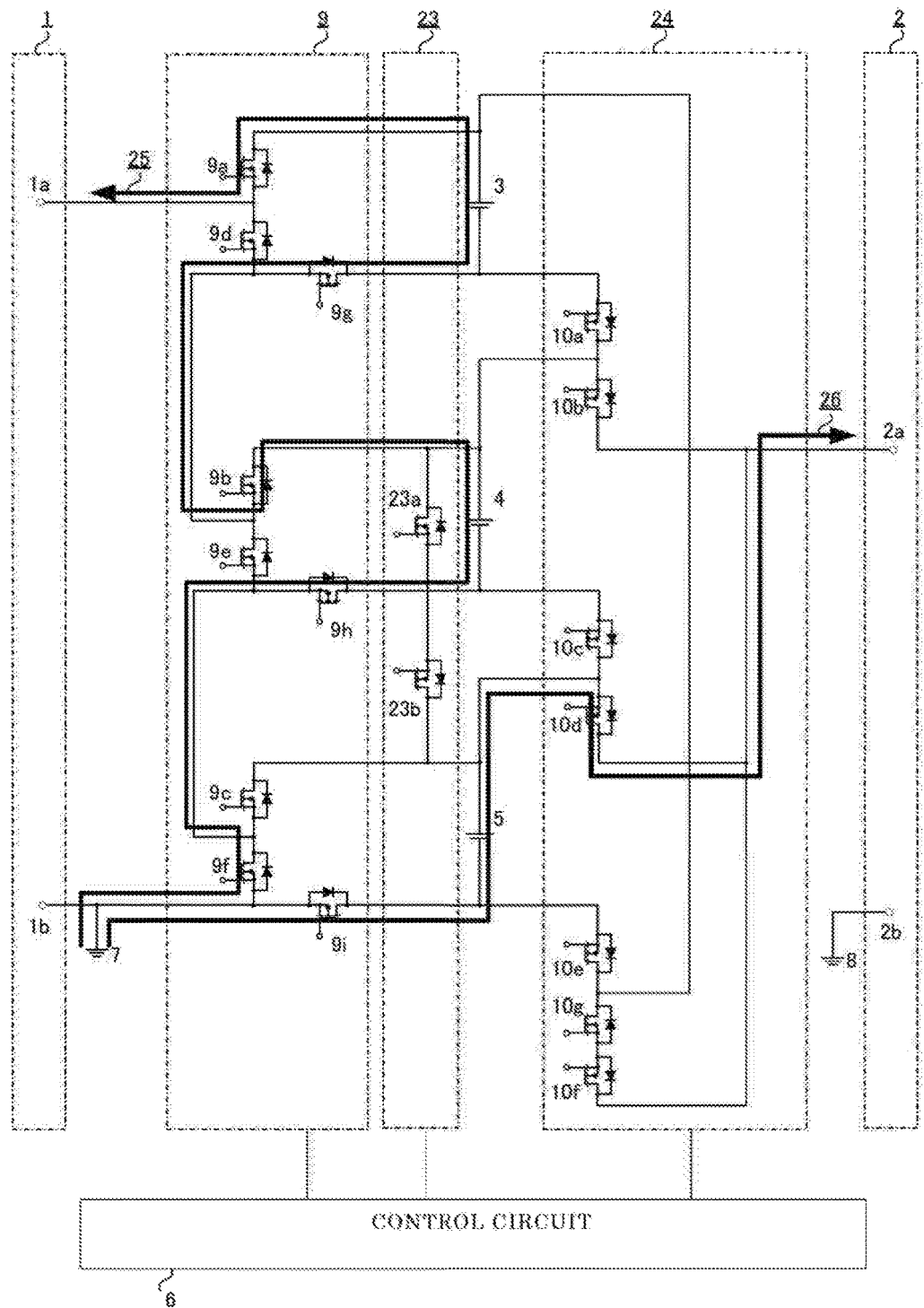
FIG. 30 is a diagram illustrating a circuit operation of the power supply device according to Embodiment 8.

Hereinafter, an operation, in which a voltage is extracted from a battery device 3, the battery device 4, and the battery device 5 to a first extraction terminal 1 and a second extraction terminal 2, will be explained. In a first switch circuit 9, as indicated in FIG. 30, a MOSFET9a, a MOSFET9b, a MOSFET9f, a MOSFET9g, a MOSFET9h, and a MOSFET9i are turned on, and the other MOSFETs are turned off, and the MOSFET23a and the MOSFET23b are turned off in the third switch circuit 23, whereby a ground 7 is connected to negative pole terminals of the battery device 4 and the battery device 5, and a DC voltage, for which the battery device 3 and the battery device 4 are connected in series, is extracted to a positive pole 1a of the first extraction terminal 1. A first electric current 25 is flowed from the ground 7 to a source terminal of the MOSFET9f, a drain terminal of the MOSFET9f, a source terminal of the MOSFET9h, a drain terminal of MOSFET9h, a negative pole of the battery device 4, a positive pole of the battery device 4, a drain terminal of the MOSFET9b, a source terminal of the MOSFET9b, a source terminal of the MOSFET9g, a drain terminal of the MOSFET9g, a negative pole of the battery device 3, a positive pole of the battery device 3, a drain terminal of the MOSFET9a, a source terminal of the MOSFET9a, and the positive pole 1a of the first extraction terminal 1.

In this case, in a second switch circuit 24, a MOSFET10d is turned on, and the other MOSFETs are turned off, whereby a DC voltage of the battery device 5 is extracted to a positive pole 2a of the second extraction terminal 2. A second electric current 26 is flowed from the ground 7 to a source terminal of the MOSFET9i, a drain terminal of the MOSFET9i, a negative pole of the battery device 5, a positive pole of the battery device 5, a source terminal of the MOSFET10d, a drain terminal of the MOSFET10d and the positive pole 2a of the second extraction terminal 2.

Figure 31:
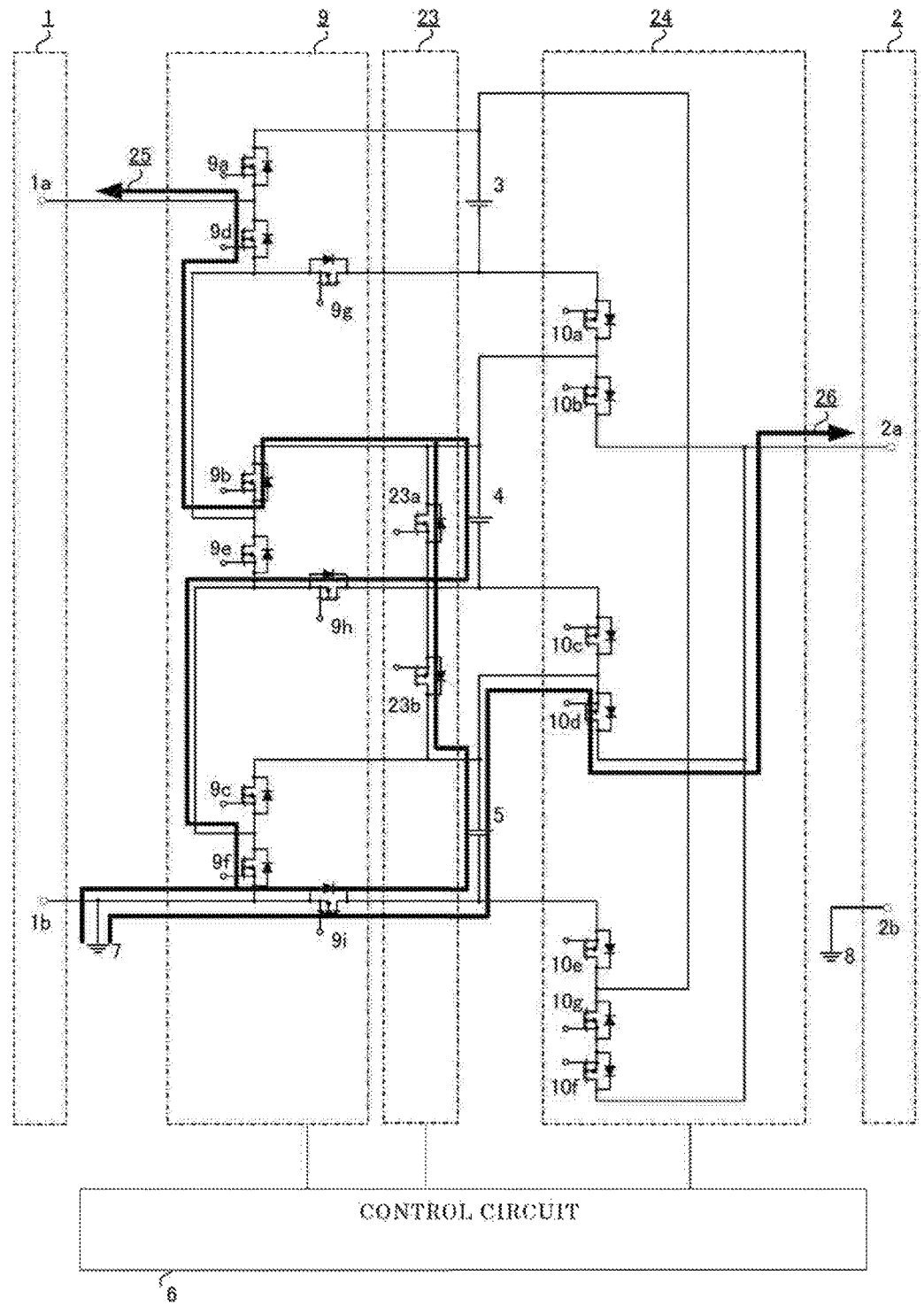
FIG. 31 is a diagram illustrating a circuit operation of the power supply device according to Embodiment 8.

In this case, in the first switch circuit 9, as indicated in FIG. 31, the MOSFET9b, the MOSFET9d, the MOSFET9f, the MOSFET9h, and the MOSFFT9i are turned on, and the other MOSFETs are turned off, and the MOSFET23a and the MOSFET23b are turned on in the third switch circuit 23, whereby the ground 7 is connected to the negative pole terminals of the battery device 4 and the battery device 5, and the positive pole terminal of the battery device 4 is connected to the positive pole terminal of the battery device 5.

As a result, a DC voltage, for which the battery device 4 and the battery device 5 are connected in parallel, is extracted to the positive pole 1a of the first extraction terminal 1, and an allowable electric current can be expanded in accordance with the parallel connection of the battery device 4 and the battery device 5. One electric current of the first electric current 25 is flowed from the ground 7 to the source terminal of the MOSFET9f, the drain terminal of the MOSFET9f, the source terminal of the MOSFET9h, the drain terminal of the MOSFET9h, the negative pole of the battery device 4, the positive pole of the battery device 4, the drain terminal of the MOSFET9b, the source terminal of the MOSFET9b, the source terminal of the MOSFET9d, the drain terminal of the MOSFET9d, and the positive pole 1a of the first extraction terminal 1. The other electric current of the first electric current 25 is flowed from the ground 7 to the source terminal of the MOSFET9i, the drain terminal of the MOSFET9i, the negative pole of the battery device 5, the positive pole of the battery device 5, the drain terminal of the MOSFET23b, the source terminal of the MOSFET23b, the source terminal of the MOSFET23a, the drain terminal of the MOSFET23a, the drain terminal of the MOSFET9b, the source terminal of the MOSFET9b, the source terminal of the MOSFET9d, the drain terminal of the MOSFET9d, and the positive pole 1a of the first extraction terminal 1. Moreover, a DC voltage, for which the battery device 3 and the battery device 5 are connected in parallel, is extracted to the positive pole 2a of the second extraction terminal 2, and an allowable electric current can be expanded in accordance with the parallel connection of the battery device 3 and the battery device 5.

Moreover, a DC voltage, for which the battery device 4 and the battery device 5 are connected in parallel, is extracted to the positive pole 2a of the second extraction terminal 2, and an allowable electric current can be expanded in accordance with the parallel connection of the battery device 4 and the battery device 5. One electric current of the second electric current 26 is flowed from the ground 7 to the source terminal of the MOSFET9i, the drain terminal of the MOSFFT9i, the negative pole of the battery device 5, the positive pole of the battery device 5, the source terminal of the MOSFET19d, the drain terminal of the MOSFET10d, and the positive pole 2a of the second extract ion terminal 2. Although an electric current passage is not clearly indicated, the other electric current of the second electric current 26 is flowed from the ground 7 to the source terminal of the MOSFET9f, the drain terminal of the MOSFET9f, the source terminal of the MOSFET9h, the drain terminal of the MOSFET9h, the negative pole of the battery device 4, the positive pole of the battery device 4, the drain terminal of the MOSFET23a, the source terminal of the MOSFET23a, the source terminal of the MOSFET23b, the drain terminal of the MOSFET23b, the source terminal of the MOSFET10d, the drain terminal of the MOSFET10d, and the positive pole 2a of the second extraction terminal 2.

Embodiment 9

Figure 32:
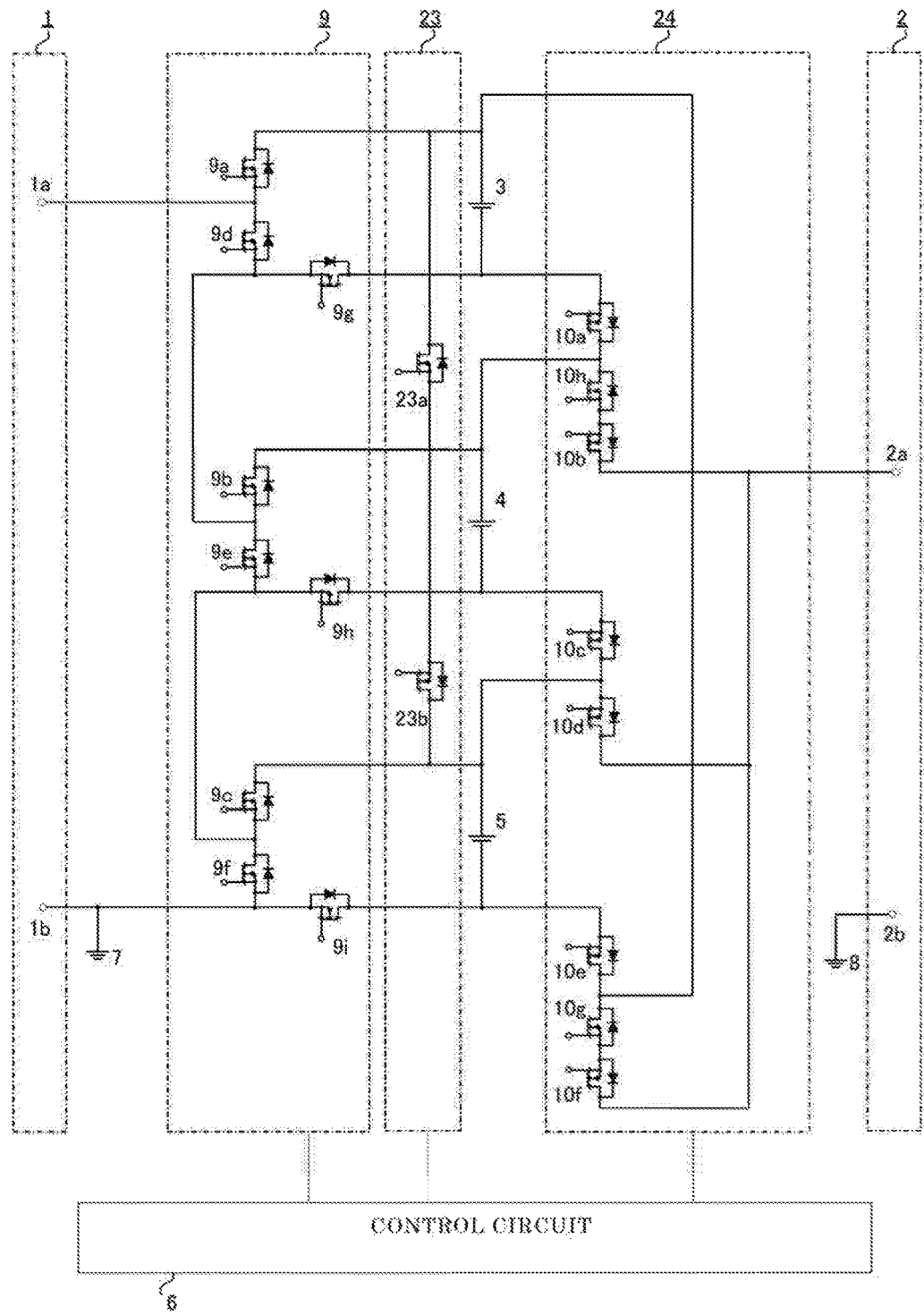
FIG. 32 is a circuit diagram illustrating a configuration of a power supply device according to Embodiment 9.

A circuit diagram of a power supply device according to Embodiment 9 of the present invention is illustrated in FIG. 32. The power supply device according to Embodiment 9, in which a MOSFET10h, by which a short circuit is prevented, is added in a second switch circuit 24, is different from the power supply device according to Embodiment 6. In particular, a drain terminal of the MOSFET10h is connected to a drain terminal of the MOSFET10a and a positive pole terminal of a battery device 4, and a source terminal of the MOSFET10h is connected to source terminal of a MOSFET10b.

Figure 33:
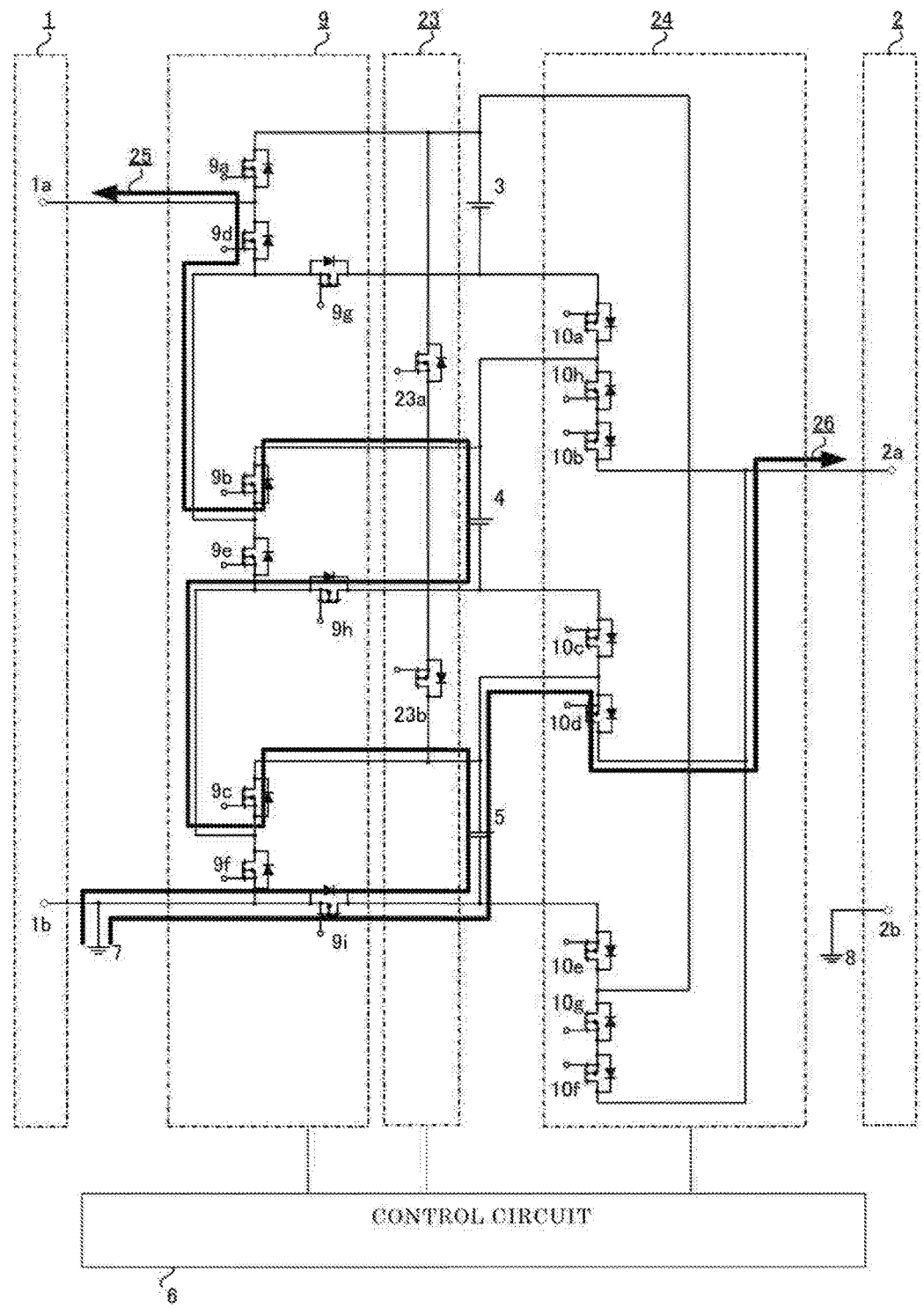
FIG. 33 is a diagram illustrating a circuit operation of the power supply device according to Embodiment 9.

Hereinafter, an operation, in which a voltage is extracted from a battery device 3, the battery device 4, and a battery device 5 to a first extraction terminal 1 and a second extraction terminal 2, will be explained. In a first switch circuit 9, as indicated in FIG. 33, a MOSFET9b, a MOSFET9c, a MOSFET9d, a MOSFET9h, and a MOSFET9i are turned on, and the other MOSFETs are turned off, and a MOSFET23a and a MOSFET23b are turned off in a third switch circuit 23, whereby a ground 7 is connected to a negative pole terminal of the battery device 5, and a DC voltage, for which the battery device 4 and the battery device 5 are connected in series, is extracted to a positive pole 1a of t first extraction terminal 1. A first electric current 25 is flowed from the ground 7 to a source terminal of the MOSFET9i, a drain terminal of the MOSFET9i, a negative pole of the battery device 5, a positive pole of the battery device 5, a drain terminal of the MOSFET9c, a source terminal of the MOSFET9c, a source terminal of the MOSFET9h, a drain terminal of the MOSFET9h, a negative pole of the battery device 4, a positive pole of the battery device 4 a drain terminal of the MOSFET9b, a source terminal of the MOSFET9b, a source terminal of the MOSFET9d, a drain terminal of the MOSFET9d, and the positive pole 1a of the first extraction terminal 1.

In this case, in the second switch circuit 24, a MOSFET10d is turned on, and the other MOSFETs are turned off, whereby a DC voltage of the battery device 5 is extracted to a positive pole 2a of the second extraction terminal 2. A second electric current 26 is flowed from the ground 7 to a source terminal of the MOSFET9i, a drain terminal of the MOSFET9i, the negative pole of the battery device 5, the positive pole of the battery device 5, a source terminal of the MOSFET10d a drain terminal of the MOSFET10d, and the positive pole 2a of the second extraction terminal 2.

Figure 34:
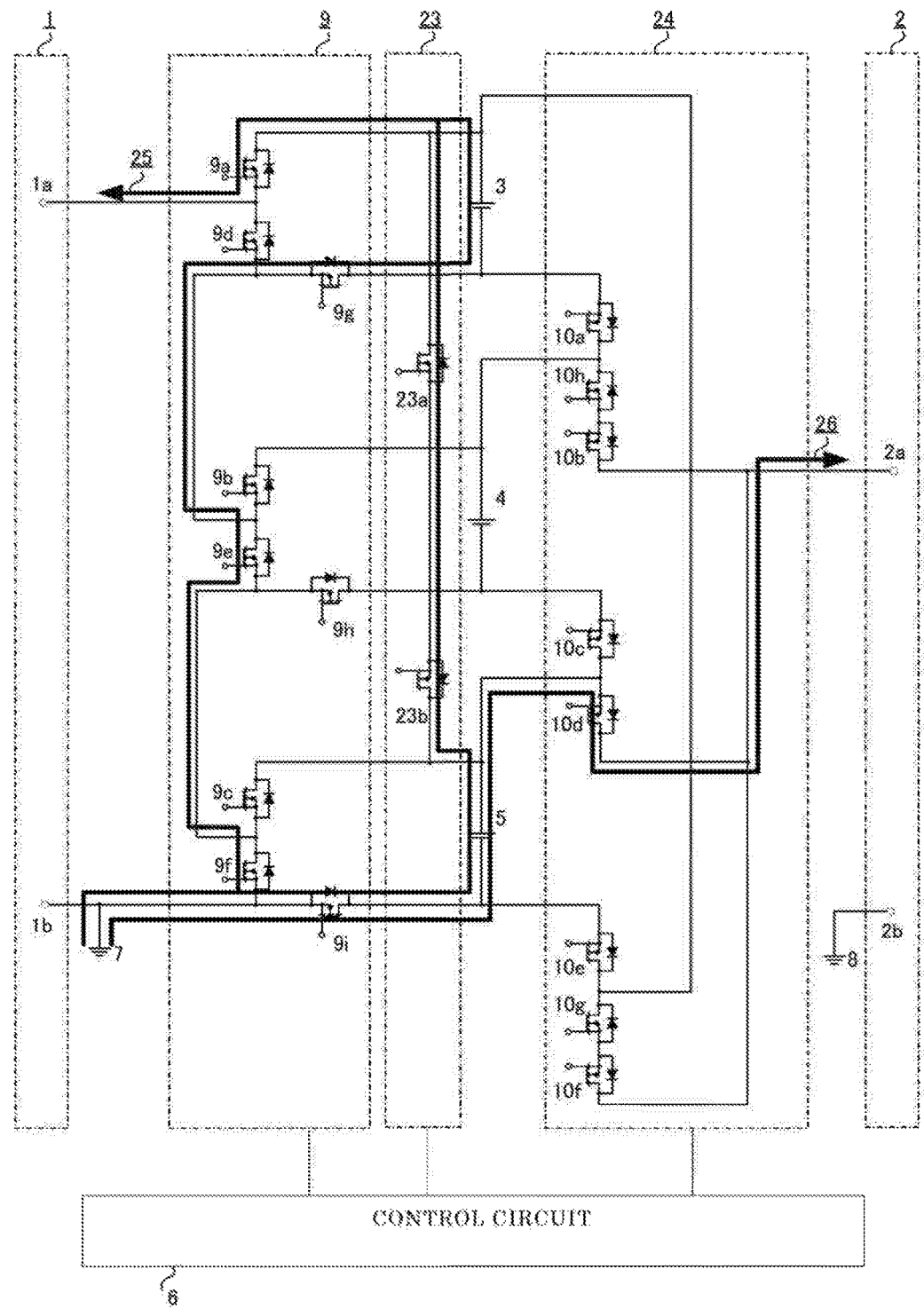
FIG. 34 is a diagram illustrating a circuit operation of the power supply device according to Embodiment 9.

In this case, in the first switch circuit 9, as indicated in FIG. 34, the MOSFET9a, the MOSFET9e, the MOSFET9f, the MOSFET9g, and the MOSFET9i are turned on, and the other MOSFETs are turned off, and the MOSFET23a and the MOSFET23b are turned on in the third switch circuit 23, whereby the ground 7 is connected to the negative pole terminals of the battery device 3 and the battery device 5, and the positive pole terminal of the battery device 3 is connected to the positive pole terminal of the battery device 5.

As a result, a DC voltage, for which the battery device 2 and the battery device 5 are connected in parallel, is extracted to the positive pole 1a of the first extraction terminal 1, and an allowable electric current can be expanded in accordance with the parallel connection of the battery device 3 and the battery device 5. One electric current of the first electric current 25 is flowed from the ground 7 to the source terminal of the MOSFET9f, the drain terminal of the MOSFET9f, the source terminal of the MOSFET9e, the drain terminal of the MOSFET9e, the source terminal of the MOSFET9g, the drain terminal of the MOSFET9g, the negative pole of the battery device 3, the positive pole of the battery device 3, the drain terminal of the MOSFET9a, the source terminal of the MOSFET9a, and the positive pole 1a of the first extraction terminal 1. The other electric current of the first electric current 25 is flowed from the ground 7 to the source terminal of the MOSFET9i, the drain terminal of the MOSFET9i, the negative pole of the battery device 5, the positive pole of the battery device 5, the drain terminal of the MOSFET23b, the source terminal of the MOSFET23b, the source terminal of the MOSFET23a, the drain terminal of the MOSFET23a, the drain terminal of the MOSFET9a, the source terminal of the MOSFET9a, and the positive pole 1a of the first extraction terminal 1.

Moreover, a DC voltage, for which the battery device 3 and the battery device 5 are connected in parallel, is extracted to the positive pole 2a of the second extraction terminal 2, and an allowable electric current can be expanded in accordance with the parallel connection of the battery device 3 and the battery device 5. One electric current of the second electric current 26 is flowed from the ground 7 to the source terminal of the MOSFET9i, the drain terminal of the MOSFET9i, the negative pole of the battery device 5, the positive pole of the battery device 5, the source terminal of the MOSFET10d, the drain terminal of the MOSFET10d, and the positive pole 2a of the second extraction terminal 2. Although an electric current passage is not clearly indicated, the other electric current of the second electric current 26 is flowed from the ground 7 to the source terminal of the MOSFET9f, the drain terminal of the MOSFET9f, the source terminal of the MOSFET9e, the drain terminal of the MOSFET9e, the source terminal of the MOSFET9g, the drain terminal of the MOSFET9g, the negative pole of the battery device 3, the positive pole of the battery device 3, the drain terminal of the MOSFET23a, the source terminal of the MOSFET23a, the source terminal of the MOSFET23b, the drain terminal of the MOSFET23b, the source terminal of the MOSFET10d, the drain terminal of the MOSFET10d, and the positive pole 2a of the second extraction terminal 2.

Embodiment 10

Figure 35:
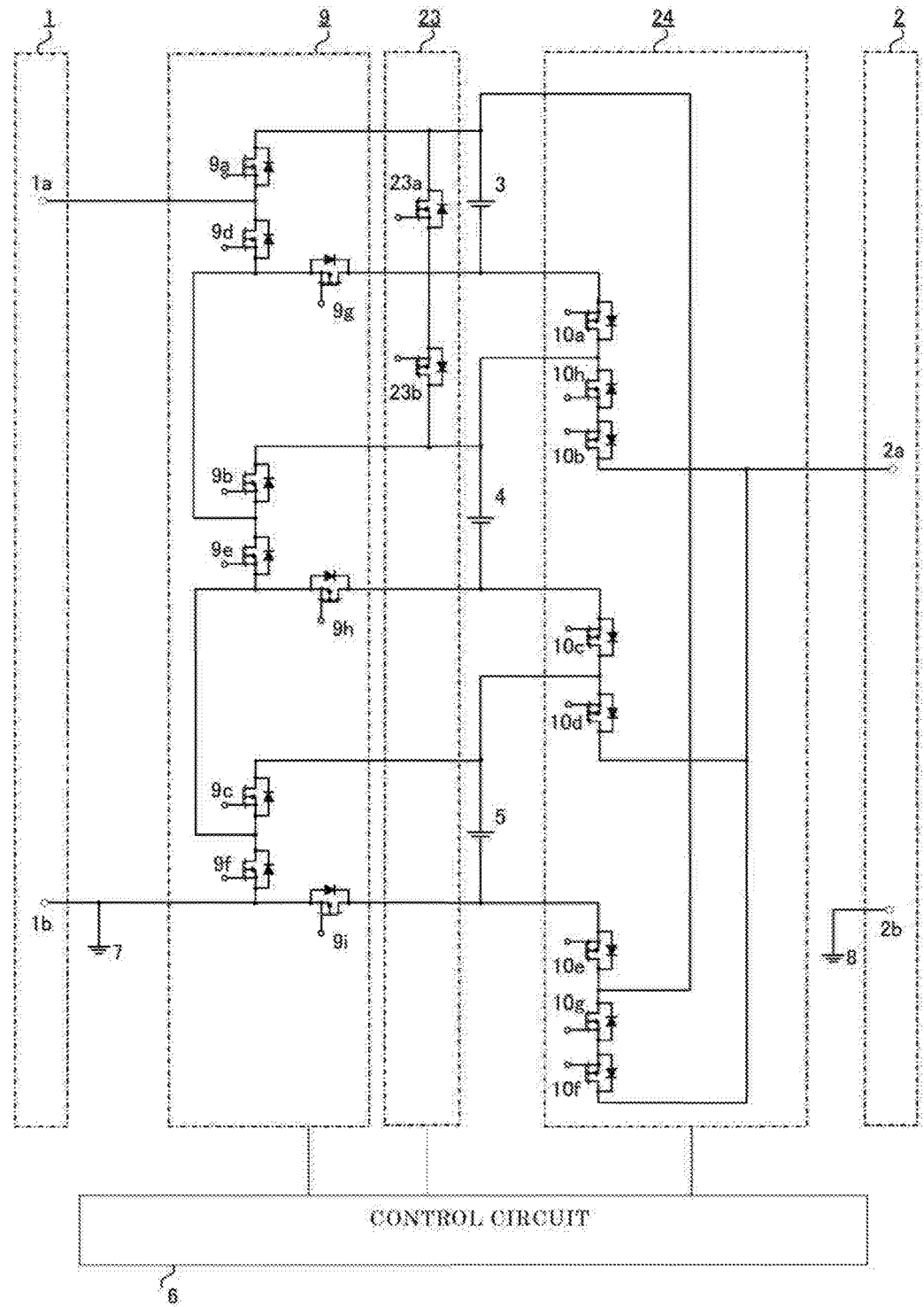
FIG. 35 is a circuit diagram illustrating a configuration of a power supply device according to Embodiment 10.

A circuit diagram of a power supply device according to Embodiment 10 of the present invention is illustrated in FIG. 35. The power supply device according to Embodiment 10, in which a MOSFET10h is added in a second switch circuit 24, is different from the power supply device according to Embodiment 7. In particular, a drain terminal of the MOSFET10h is connected to a drain terminal of a MOSFET10a and a positive pole terminal of a battery device 4, and a source terminal of the MOSFET10h is connected to a source terminal of a MOSFET10b.

Figure 36:
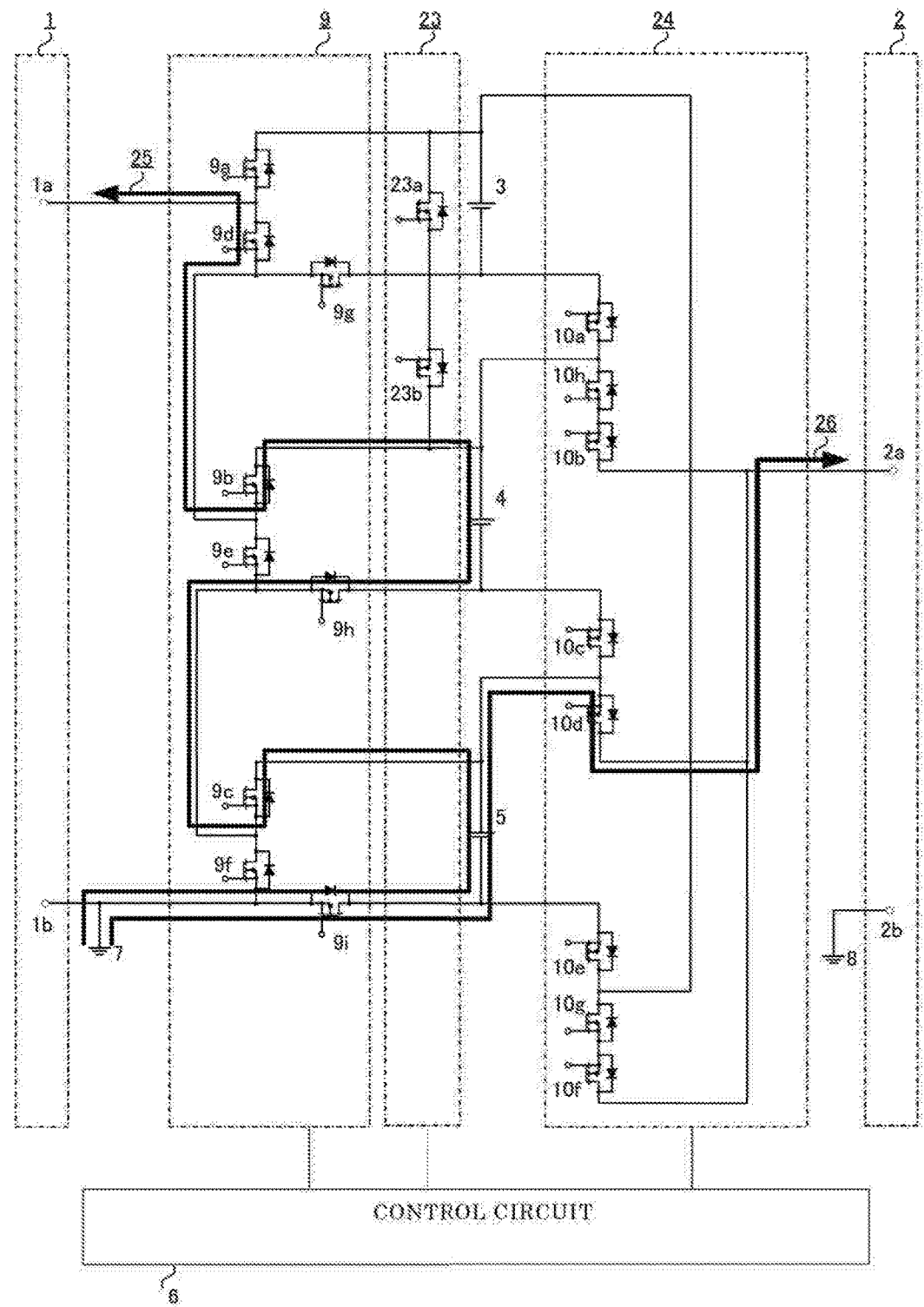
FIG. 36 is a diagram illustrating a circuit operation of the power supply device according to Embodiment 10.

Hereinafter, an operation, in which a voltage is extracted from a battery device 3, the battery device 4, and a battery device 5 to a first extraction terminal 1 and a second extraction terminal 2, will be explained. In a first switch circuit 9, as indicated in FIG. 36, a MOSFET9b, a MOSFET9c, a MOSFET9d, a MOSFET9h, and a MOSFET9i are turned on, and the other MOSFETs are turned off, and a MOSFET23a and a MOSFET23b are turned off in a third switch circuit 23, whereby a ground 7 is connected to a negative pole terminal of the battery device 5, and a DC voltage, for which the battery device 4 and the battery device 5 are connected in series, is extracted to a positive pole 1*a* of the first extraction terminal 1. A first electric current 25 is flowed from the ground 7 to a source terminal of the MOSFET9*i*, a drain terminal of the MOSFET9*i*, a negative pole of the battery device 5, a positive pole of the battery device 5, a drain terminal of the MOSFET9*c*, a source terminal of the MOSFET9*c*, a source terminal of the MOSFET9*h*, a drain terminal of the MOSFET9*h*, a negative pole of the battery device 4, a positive pole of the battery device 4 a drain terminal of the MOSFET9*b*, a source terminal of the MOSFET9*b*, a source terminal of the MOSFET9*d*, a drain terminal of the MOSFET9*d*, and the positive pole 1*a* of the first extraction terminal 1.

In this case, in the second switch circuit 24, a MOSFET10*d* is turned on, and the other MOSFETs are turned off, whereby a DC voltage of the battery device 5 is extracted to a positive pole 2*a* of the second extraction terminal 2. A second electric current 26 is flowed from the ground 7 to a source terminal of the MOSFET9*i*, a drain terminal of the MOSFET9*i*, the negative pole of the battery device 5, the positive pole of the battery device 5, a source terminal of the MOSFET10*d*, a drain terminal of the MOSFET10*d*, and the positive pole 2*a* of the second extraction terminal 2.

Figure 37:
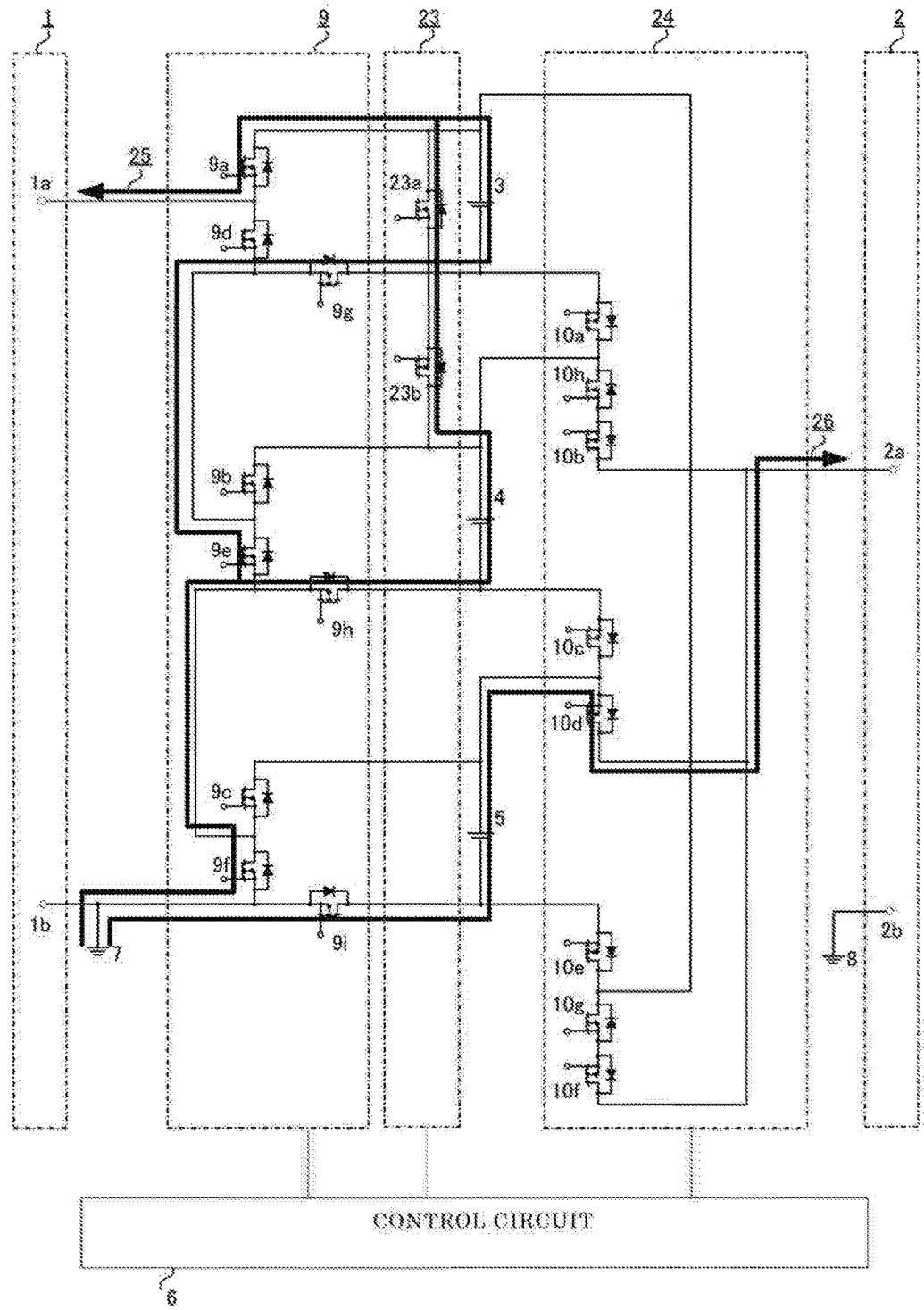
FIG. 37 is a diagram illustrating a circuit operation of the power supply device according to Embodiment 10.

In this case, in a first switch circuit 9, as indicated in FIG. 37, the MOSFET9*a*, the MOSFET9*e*, the MOSFET9*f*, the MOSFET9*g*, the MOSFET9*h*, and the MOSFET9*i* are turned on, and the other MOSFETs are turned off, and the MOSFET23*a* and the MOSFET23*b* are turned on in the third switch circuit 23, whereby the ground 7 is connected to the negative pole terminals of the battery device 3, the battery device 4, and the battery device 5, and the positive pole terminal of the battery device 3 is connected to the positive pole terminal of the battery device 4.

As a result, a DC voltage, for which, the battery device 3 and the battery device 4 are connected in parallel, is extracted to the positive pole 1*a* of the first extraction terminal 1, and an allowable electric current can be expanded in accordance with the parallel connection of the battery device 3 and the battery device 4. One electric current of the first electric current 25 is flowed from the ground 7 to the source terminal of the MOSFET9*f*, the drain terminal of the MOSFET9*f*, the source terminal of the MOSFET9*e*, the drain terminal of the MOSFET9*e*, the source terminal of the MOSFET9*g*, the drain terminal of the MOSFET9*g*, the negative pole of the battery device 3, the positive pole of the battery device 3, the drain terminal of the MOSFET9*a*, the source terminal of the MOSFET9*a*, and the positive pole 1*a* of the first extraction terminal 1. The other electric current of the first electric current 25 is flowed from the ground 7 to the source terminal of the MOSFET9*f*, the drain germinal of the MOSFET9*f*, the source terminal of the MOSFET9*h*, the drain terminal of the MOSFET9*h*, the negative pole of the battery device 4, the positive pole of the battery device 4, the drain terminal of the MOSFET23*b*, the source terminal of the MOSFET23*b*, the source terminal of the MOSFET23*a*, the drain terminal of the MOSFET23*a*, the drain terminal of the MOSFET9*a*, the source terminal of the MOSFET9*a*, and the positive pole 1*a* of the first extraction terminal 1.

Moreover, a DC voltage of the battery device 5 extracted from the positive pole 2*a* of the second extraction terminal 2. The second electric current 26 is flowed from the ground 7 to the source terminal of the MOSFET9*i*, the drain terminal of the MOSFET9*i*, the negative pole of the battery device 5, the positive pole of the battery device 5, the source terminal of the MOSFET10*d*, the drain terminal of the MOSFET10*d*, and the positive pole 2*a* of the second extraction terminal 2.

Embodiment 11

Figure 38:
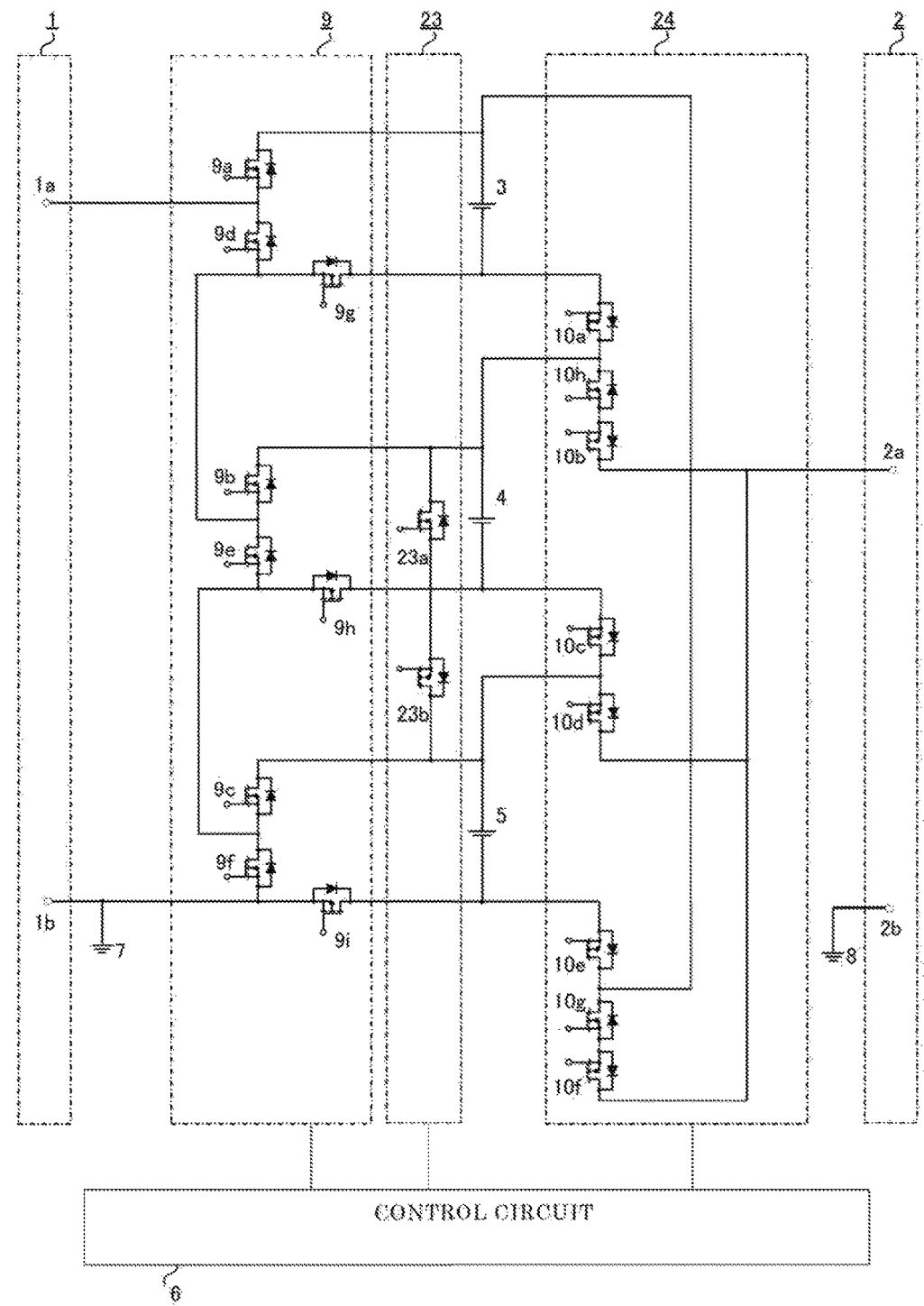
FIG. 38 is a circuit diagram illustrating a configuration of a power supply device according to Embodiment 11.

A circuit diagram of a power supply device according to Embodiment 11 of the present invention is illustrated in FIG. 38. The power supply device according to Embodiment 11, in which a MOSFET10*h*, by which a short circuit is prevented, is added in a second switch circuit 24, is different from the power supply device according to Embodiment 8. In particular, a drain terminal of the MOSFET10*h* is connected to a drain terminal of the MOSFET10*a* and a positive pole terminal of a battery device 4, and a source terminal of the MOSFET10*h* is connected to a source terminal of a MOSFET10*b*.

Figure 39:
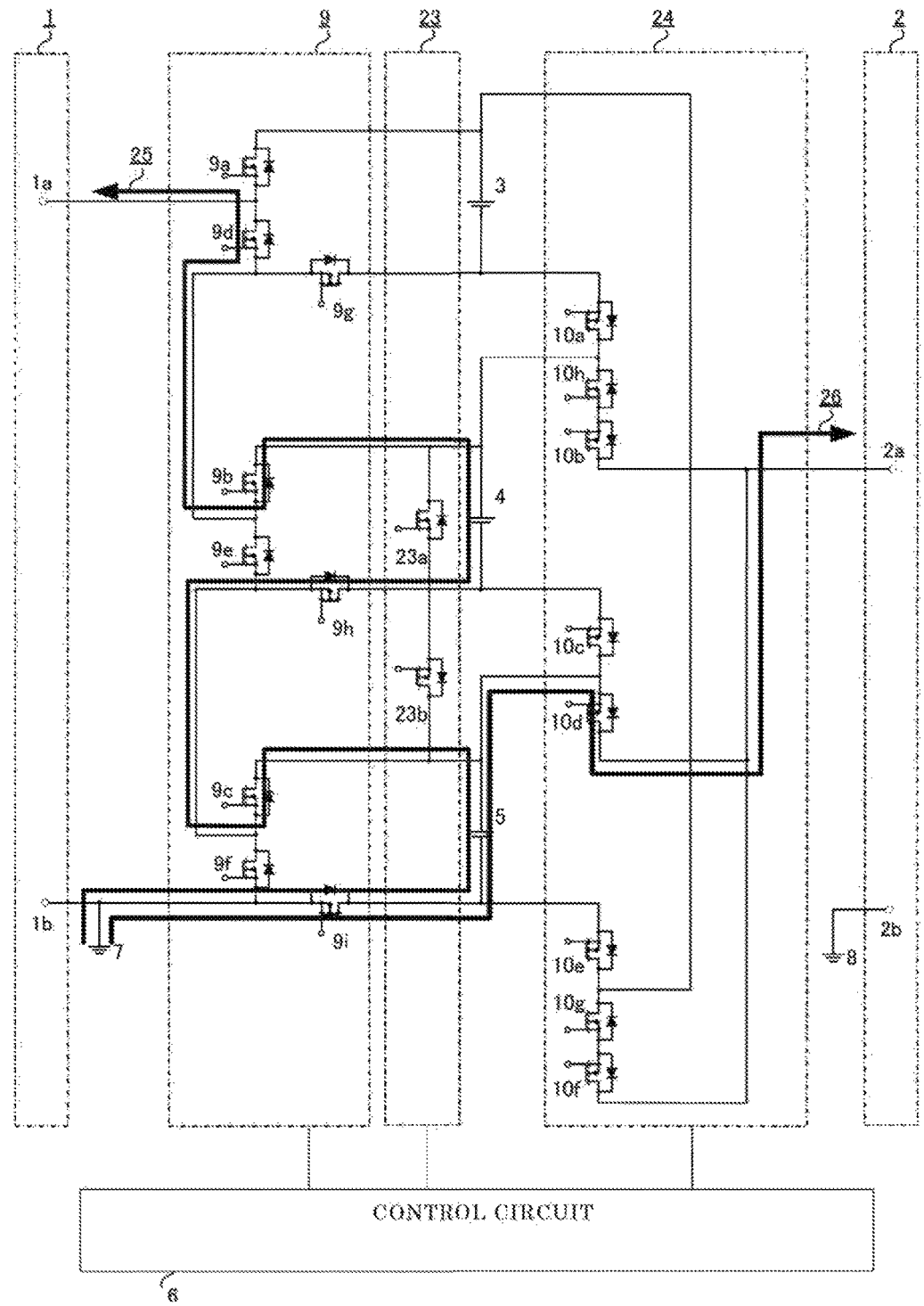
FIG. 39 is a diagram illustrating a circuit operation of the power supply device according to Embodiment 11.

Hereinafter, an operation, in which a voltage is extracted from a battery device 3, the battery device 4, and a battery device 5 to a first extraction terminal 1 and a second extraction terminal 2, will be explained. In a first switch circuit 9, as indicated in FIG. 39, a MOSFET9*b*, a MOSFET9*c*, a MOSFFT9*d*, a MOSFET9*h*, and a MOSFET9*i* are turned on, and the other MOSFETs are turned off, and a MOSFET23*a* and a MOSFET23*b* are turned off in a third switch circuit 23, whereby a ground 7 is connected to a negative pole terminal of the battery device 5, and a DC voltage, for which the battery device 4 and the battery device 5 are connected in series, is extracted to a positive pole 1*a* of the first extraction terminal 1. A first electric current 25 is flowed from the ground 7 to a source terminal of the MOSFET9*i*, a drain terminal of the MOSFET9*i*, a negative pole of the battery device 5, a positive pole of the battery device 5, a drain terminal of the MOSFET9*c*, a source terminal of the MOSFET9*c*, a source terminal of the MOSFET9*h*, a drain terminal of the MOSFET9*h*, a negative pole of the battery device 4, a positive pole of the battery device 4 a drain terminal of the MOSFET9*b*, a source terminal of the MOSFET9*b*, a source terminal of the MOSFET9*d*, a drain terminal of the MOSFET9*d*, and the positive pole 1*a* of the first extraction terminal 1.

In this case, in the second switch circuit 24, a MOSFET10*d* is turned on, and the other MOSFETs are turned off, whereby a DC voltage of the battery device 5 is extracted to a positive pole 2*a* of the second extraction terminal 2. A second electric current 26 is flowed from the ground 7 to a source terminal of the MOSFET9*i*, a drain terminal of the MOSFET9*i*, the negative pole of the battery device 5, the positive pole of the battery device 5, a source terminal of the MOSFET10*d*, a drain terminal of the MOSFET10*d*, and the positive pole 2*a* of the second extraction terminal 2.

Figure 40:
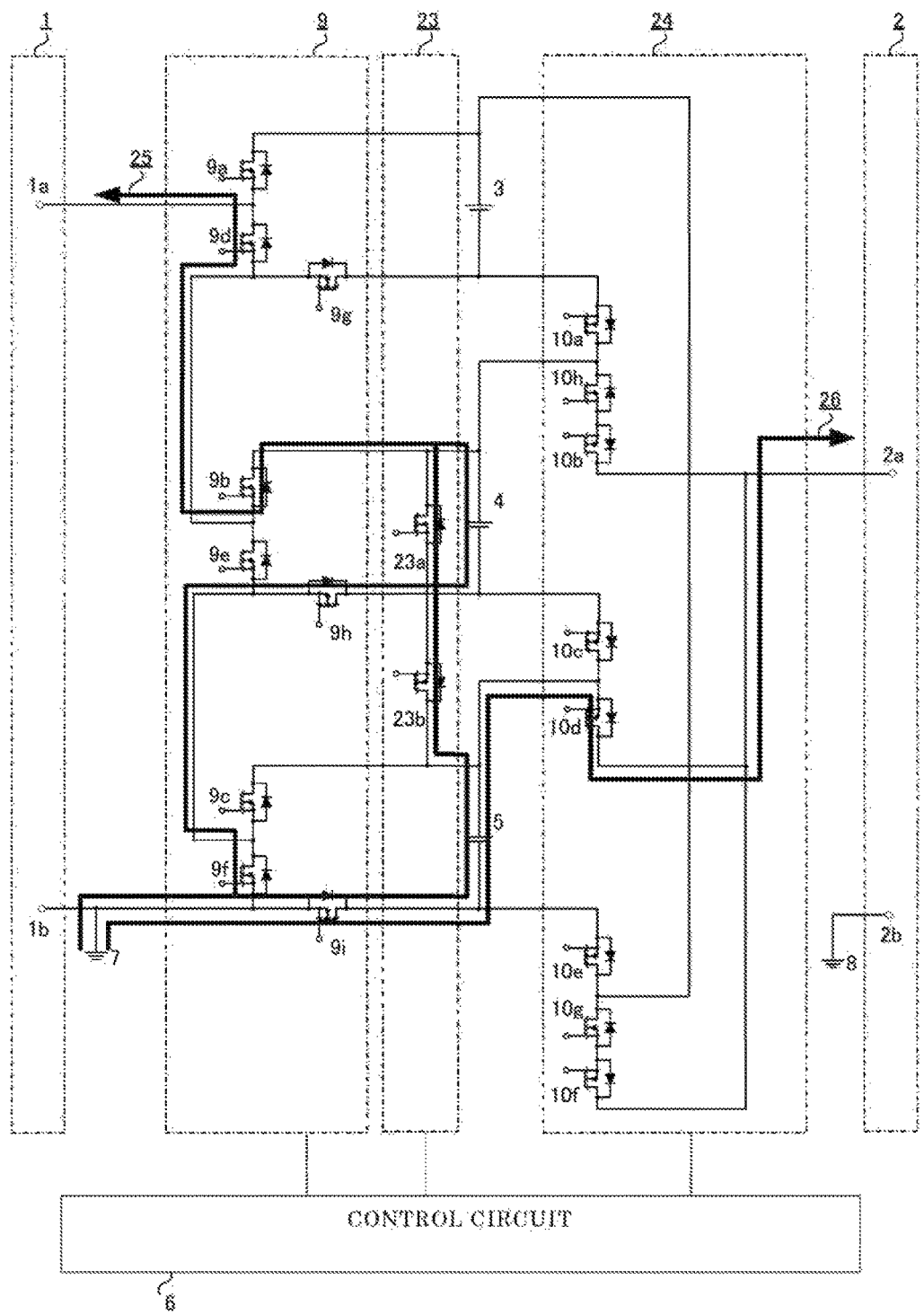
FIG. 40 is a diagram illustrating a circuit operation of the power supply device according to Embodiment 11.

In this case, in the first switch circuit 9, as indicated in FIG. 40, the MOSFET9*b*, the MOSFET9*d*, the MOSFET9*f*, the MOSFET9*h*, and the MOSFET9*i* are turned on, and the other MOSFETs are turned off, and the MOSFET23*a* and the MOSFET23*b* are turned on in the third switch circuit 23, whereby the ground 7 is connected to the negative pole terminals of the battery device 4 and the battery device 5, and the positive pole terminal of the battery device 4 is connected to the positive pole terminal of the battery device 5.

As a result, a DC voltage, for which the battery device 4 and the battery device 5 are connected in parallel, is extracted to the positive pole 1*a* of the first extraction terminal 1, and an allowable electric current can be expanded in accordance with the parallel connection of the battery device 4 and the battery device 5. One electric current of the first electric current 25 is flowed from the ground 7 to the source terminal of the MOSFET9f, the drain terminal of the MOSFET9f, the source terminal of the MOSFET9h, the drain terminal of the MOSFET9h, the negative pole of the battery device 4, the positive pole of the battery device 4, the drain terminal of the MOSFET9b, the source terminal of the MOSFET9b, the source terminal of the MOSFET9d, the drain terminal of the MOSFET9d, and the positive pole 1a of the first extraction terminal 1. The other electric current of the first electric current 25 is flowed from the ground 7 to the source terminal of the MOSFET9i, the drain terminal of she MOSFET9i, the negative pole of the battery device 5, the positive pole of the battery device 5, the drain terminal of the MOSFET23b, the source terminal of the MOSFET23b, the source terminal of the MOSFET23a, the drain terminal of the MOSFET23a, the drain terminal of the MOSFET9b, the source terminal of the MOSFET9b, the source terminal of the MOSFET9d, the drain terminal of the MOSFET9d, and the positive pole 1a of the first extraction terminal 1.

Moreover, a DC voltage, for which the battery device 4 and the battery device 5 are connected in parallel, is extracted to the positive pole 2a of the second extraction terminal 2, and an allowable electric current can be expanded in accordance with the parallel connection of the battery device 4 and the battery device 5. One electric current of the second electric current 26 is flowed from the ground 7 to the source terminal of the MOSFET9i, the drain terminal of the MOSFET9i, the negative pole of the battery device 5, the positive pole of the battery device 5, the source terminal of the MOSFET10d, the drain terminal of the MOSFET10d, and the positive pole 2a of the second extraction terminal 2. Although an electric current passage is not clearly indicated, the other electric current of the second electric current 26 is flowed from the ground 7 to the source terminal of the MOSFET9f, the drain terminal of the MOSFET9f, the source terminal of the MOSFET9h, the drain terminal of the MOSFET9h, the negative pole of the battery device 4, the positive pole of the battery device 4, the drain terminal of the MOSFET23a, the source terminal of the MOSFET23a, the source terminal of the MOSFET23b, the drain terminal of the MOSFET23b, the source terminal of the MOSFET10d, the drain terminal of the MOSFET10d, and the positive pole 2a of the second extraction terminal 2.

In addition, in Embodiment 6 through Embodiment 11 of the present invention, although the power supply device is explained by using a MOSFET (a field-effect transistor) as a switch, a similar effect is obtained even when a bipolar transistor, an insulation-type bipolar transistor (IGBT), a silicon carbide transistor, or a silicon carbide MOSFET is used. Moreover, although the second switch circuit and the third second switch circuit are explained by using MOSFETs which are connected in reverse series, it is needless to say that the other two-way characteristic switch can be used.

Moreover, the smoothing reactor 11 and the smoothing capacitor 12, which are indicated in FIG. 8, can be added in FIG. 22, FIG. 26, FIG. 29, FIG. 32, FIG. 35, or FIG. 38. In particular, the smoothing reactor 11 is connected between a connection point of the source terminal of the MOSFET9a and the drain terminal of the MOSFET9d and the positive pole 1a of the first extraction terminal 1, and the smoothing capacitor 12 is connected between the positive pole 1a of the first extraction terminal 1 and the negative pole 1b. In addition, the smoothing reactor 11 may be provided at an electric current passage between a required battery device, which is connected to the negative pole 1b, and the positive pole 1a of the first extraction terminal 1.

In addition, in the scope of the present invention, it is possible that each of embodiments is freely combined, or each of embodiments is suitably modified or omitted.

DESCRIPTION OF THE SYMBOLS

"1" is a first extraction terminal; "1a," a positive pole; "1b," a negative pole; "2" a second extraction terminal; "2a," a positive pole; "2b, " a negative pole; "3,4, and 5," battery devices; "6," a control circuit; "7," a ground; "8," a ground; "9," a first switch circuit, "9a, 9b, 9c, 9d, 9e, 9f, 9g, 9h, and 9i, " MOSFETs; "10 and 24," second switch circuits; "10a, 10b, 10c, 10d, 10e, 10f, 10g, and 10h, " MOSFETs; "11," a smoothing reactor; "12," a smoothing capacitor; "13," a charging device; "14," an electric generator, "15," an inverter; "15g" a smoothing capacitor; "16," a first load; "17," a DC/DC convertor; "17a and 17e " smoothing capacitors: "17d, " a smoothing reactor; "18," a low-voltage battery device; "19," a low-voltage electrical component; "20" a second load; "21," a third load; "22," a high-voltage electrical component; "23," a third switch circuit; "23a and 23b, " MOSFETs; "25" a first electric current; "26," a second electric current.

What is claimed is:

1. A power supply device comprising:
a plurality of battery devices which include positive pole terminals and negative pole terminals;
a first switch circuit which includes a plurality of switches;
a first circuit for connecting to the plurality of battery devices, which is configured between a first terminal positive pole and a terminal negative pole, in a state where at least one battery device in the plurality of battery devices and any switch in the plurality of switches in the first switch circuit are included;
a second switch circuit which includes a plurality of switches;
a second circuit for connecting to the plurality of battery devices, which is configured between a second terminal positive pole and a terminal negative pole, in a state where at least one battery device in the plurality of battery devices and any switch in the plurality of switches in the second switch circuit are included;
a control circuit which controls each of open/close operations of the plurality of switches of the first switch circuit and the second switch circuit; wherein the plurality of switches of the first switch circuit are provided such that the switches are corresponding to each of the battery devices in the plurality of battery devices, and are composed of switches for connecting negative pole terminal, by which a negative pole terminal of the corresponded battery device is connected to the first circuit for connecting battery device, first switches for connecting positive pole terminal, by which a positive pole terminal of the corresponded battery device is connected to the first circuit for connecting battery device, and switches for bypassing, by which the corresponded battery device is bypassed; and
the plurality of switches of the second switch circuit are provided such that the switches are corresponding to each of the battery devices in the plurality of battery devices, and are composed of second switches for connecting positive pole terminal, by which a positive pole terminal of the corresponded battery device is connected to the second circuit for connecting battery device, and switches for connecting, by which a negative pole terminal of the corresponded battery device is connected to a positive pole terminal of the other battery device; and open/close operations of the plurality of switches of the first switch circuit are controlled by the control circuit, and one or a plurality of required battery devices is connected between the first terminal positive pole and the terminal negative pole; and open/close operations of the plurality of switches of the second switch circuit are controlled by the control circuit, and one or a plurality of required battery devices is connected between the second terminal positive pole and the terminal negative pole.

2. A power supply device as recited in claim 1, wherein a smoothing capacitor is connected between the first terminal positive pole of the first circuit for connecting battery device and the terminal negative pole, and a smoothing reactor is provided at an electric current passage of a connected battery device in the first circuit for connecting battery device.

3. A power supply device as recited in claim 1, wherein a charging device, which is used as a variable power supply device by which a DC voltage can be varied, is connected between the first terminal positive pole and the terminal negative pole.

4. A power supply device as recited in claim 2, wherein a charging device, which is used as a variable power supply device by which a DC voltage can be varied, is connected between the first terminal positive pole and the terminal negative pole.

5. A power supply device as recited in claim 1, wherein a third switch circuit, which is provided such that the third switch circuit is corresponding to battery devices in the plurality of battery devices, and includes switches for connecting, by which the positive pole terminals of the corresponded battery devices are connected each other, is included; and the control circuit controls open/close operations of the switches for connecting of the third switch circuit, and a plurality of required battery devices is connected in parallel between the first terminal positive pole and the terminal negative pole.

6. A power supply device as recited in claim 5, wherein the open/close operations of the switches for connecting of the third switch circuit are controlled by the control circuit, and a plurality of required battery devices is connected in parallel between the first terminal positive pole and the terminal negative pole, and between the second terminal positive pole and the terminal negative pole.

7. A power supply device as recited in claim 5, wherein a smoothing capacitor is connected between the first terminal positive pole of the first circuit for connecting battery device and the terminal negative pole, and a smoothing reactor is provided at an electric current passage of a connected battery device in the first circuit for connecting battery device.

8. A power supply device as recited in claim 6, wherein a smoothing capacitor is connected between the first terminal positive pole of the first circuit for connecting battery device and the terminal negative pole, and a smoothing reactor is provided at an electric current passage of a connected battery device in the first circuit for connecting battery device.

9. A power supply device as recited in claim 5, wherein a charging device, which is used as a variable power supply device by which a DC voltage can be varied, is connected between the first terminal positive pole and the terminal negative pole.

10. A power supply device as recited in claim 6, wherein a charging device, which is used as a variable power supply device by which a DC voltage can be varied, is connected between the first terminal positive pole and the terminal negative pole.

11. A power supply device as recited in claim 1, wherein the control circuit controls to turn on the switches for connecting negative pole terminal and the first switches for connecting positive pole terminal of the first switch circuit which is corresponding to the battery devices which are connected between the first terminal positive pole and the terminal negative pole, and controls to turn off the switches for bypassing of the first switch circuit which is corresponding to the battery devices, and controls to turn off the switches for connecting negative pole terminal and the first switches for connecting positive pole terminal of the first switch circuit which is corresponding to the battery devices which are not connected between the first terminal positive pole and the terminal negative pole, and controls to turn on the switches for bypassing of the first switch circuit which is corresponding to the battery devices.

12. A power supply device as recited in claim 11, wherein the control circuit controls to turn on the corresponded second switch for connecting positive pole terminal of the second switch circuit and the switch for connecting, with respect to the battery devices, which are connected between the second terminal positive pole and the terminal negative pole, in which the positive pole terminal is connected to the second terminal positive pole via the second switch circuit, and controls so as to turn off the corresponded second switch for connecting positive pole terminal of the second switch circuit and the switch for connecting, with respect to the battery devices which are connected to the terminal negative pole, and controls to turn off the corresponded second switches for connecting positive pole terminal of the second switch circuit, with respect to the other battery devices, and controls to turn on the switches for connecting which are corresponding to the battery devices.

13. A power supply device as recited in claim 5, wherein the control circuit controls to turn on the switch for connecting negative pole terminal and the first switch for connecting positive pole terminal of the first switch circuit which is corresponding to one battery device, in the battery devices which are connected between the first terminal positive pole and the terminal negative pole, and controls to turn off the switch for bypassing of the first switch circuit which is corresponding to the battery device, and controls to turn on the switch for connecting negative pole terminal and the switch for bypassing of the first switch circuit which is corresponding to the other battery device, and controls to turn off the first switch for connecting positive pole terminal of the first switch circuit which is corresponding to the battery device, and controls to turn on the switches for connecting of the third switch circuit.

* * * * *